United States Patent
Morimoto

(10) Patent No.: US 6,958,614 B2
(45) Date of Patent: *Oct. 25, 2005

(54) CAPACITANCE TYPE SENSOR AND METHOD FOR MANUFACTURING SAME

(75) Inventor: Hideo Morimoto, Yamatokooriyama (JP)

(73) Assignee: Nitta Corporation, Osaka (JP)

( * ) Notice: Subject to any disclaimer, the term of this patent is extended or adjusted under 35 U.S.C. 154(b) by 14 days.

This patent is subject to a terminal disclaimer.

(21) Appl. No.: 10/446,554

(22) Filed: May 28, 2003

(65) Prior Publication Data

US 2003/0222660 A1 Dec. 4, 2003

(30) Foreign Application Priority Data

| May 29, 2002 | (JP) | ......................... | 2002-155251 |
| Oct. 16, 2002 | (JP) | ......................... | 2002-301709 |
| May 6, 2003 | (JP) | ......................... | 2003-127980 |

(51) Int. Cl.$^7$ ............................ G01R 27/26; G01D 7/00
(52) U.S. Cl. .................. 324/661; 324/662; 73/862.043
(58) Field of Search ................ 324/658, 659, 324/660, 661, 662, 686; 73/864.043, 780, 514.32

(56) References Cited

U.S. PATENT DOCUMENTS 6,158,291 A * 12/2000 Okada .................... 73/862.043
6,159,761 A * 12/2000 Okada .......................... 438/53
6,373,265 B1 * 4/2002 Morimoto et al. .......... 324/686
6,530,283 B2 * 3/2003 Okada et al. ................. 73/780

FOREIGN PATENT DOCUMENTS

WO    WO 02/073148 A1    9/2002    ............. G01L/1/14

* cited by examiner

*Primary Examiner*—Anjan Deb
*Assistant Examiner*—Jeff Natalini
(74) *Attorney, Agent, or Firm*—Osha Liang LLP

(57) ABSTRACT

In a capacitance type sensor of the present invention, a capacitance element is constituted between a displacement electrode and a capacitance element electrode. A return-switch movable electrode is arranged above and spaced from the displacement electrode, to be placed in contact with the displaying electrode due to a displacement of a direction button. When the direction button is operated, the return-switch movable electrode is first displaced into contact with the displacement electrode. Then, the both make a displacement while keeping a contact state. When the displacement electrode is displaced to change the spacing to the capacitance element electrode, changed is the capacitance value of the capacitance element. Based on this change, a force is recognized. Herein, in the course of a transit from a state the displacement electrode and the return-switch electrode are not in contact to a state of their contact, the output signal varies necessarily beyond a threshold voltage.

9 Claims, 40 Drawing Sheets

*(Prior Art)*

*(Prior Art)*

US 6,958,614 B2

CAPACITANCE TYPE SENSOR AND METHOD FOR MANUFACTURING SAME

CROSS-REFERENCE TO RELATED APPLICATIONS

This application is based upon and claims priority of Japanese Patent Application Nos.: (1) 2002-155251 filed on May 29, 2002; (2) 2002-301709 filed on Oct. 16, 2002; and (3) 2003-127980 filed on May 6, 2003.

BACKGROUND OF THE INVENTION

1. Field of the Invention

The present invention relates to a capacitance type sensor suited for use in detecting a force and to a method for manufacturing same.

2. Description of Related Art

The capacitance type sensor generally is used as a device for detecting a force by converting a magnitude and direction of a force applied by an operator into an electric signal. Particularly, the recent utilization is as a two-dimensional or three-dimensional sensor that can detect an applied force on a directional-component basis. For example, there is an input device of cellular phone incorporating, as what is called a joystick, a capacitance type sensor to input the operation in multi-dimensional directions.

Meanwhile, the capacitance type sensor is allowed to input, as a magnitude of a force applied by the operator, an operation amount having a predetermined dynamic range. Particularly, the capacitance type force sensor, having a capacitance element formed by two opposed electrodes and for detecting a force based on a capacitance value change resulting from an electrode spacing change, is in practical application in a variety of fields because of its merit by virtue of simple structure and possible cost reduction.

Particularly, it is possible to consider a structure as shown, e.g. in FIGS. 39 and 40, for the use as a joystick on a cellular phone. In this capacitance type sensor 701, capacitance elements are constituted respectively between two kinds of opposed electrodes, i.e., fixed capacitance element electrodes E701–E705 and a displacement electrode 712 for displacement. An insulating film 713 is formed between the displacement electrode 712 and the capacitance element electrodes E701–E705. Meanwhile, as shown in FIG. 39, the capacitance type sensor 701 further possesses a substrate 720, a detection button 730 for the person to operate on the upper surface of the displacement electrode and externally apply a force thereon, a reference electrode (common electrode) E700 formed on the substrate 720, and a supporting member 760 fixingly supporting the detection button 730 and displacement electrode 712 on the substrate 720.

On the substrate 720, there are formed a capacitance element electrode E705 circular about an origin O, fan-shaped capacitance element electrodes E701–E704 outer thereof, and a reference electrode E700 further outer thereof and annular about the origin O, as shown in FIG. 40, Incidentally, signals including a clock signal are always inputted to the capacitance element electrodes E701–E705.

Now explanation is made on a method to detect a force by the capacitance type sensor 701. At first, in the case the detection button 730 undergoes an external force in Z-axis negative direction, the detection button 730 and the displacement electrode 712 displace together in Z-axis negative direction, to thereby change the spacing between the displacement electrode 712 and the capacitance element electrodes E701–E705. By the change in the electrode spacing, varied is the capacitance value of the capacitance element. Although the capacitance element electrodes E701–E705 are always inputted by signals as above, deviation in signal phase possibly takes place depending upon the change in capacitance value. Consequently, by utilizing such signal phase deviation, the force externally applied to the detection button 730 can be obtained based on the component in the X-axis, Y-axis or Z-axis direction.

According to the capacitance type sensor 701, the signal to the capacitance element electrodes E701–E705 is always inputted, i.e., not only upon operating the detection button 730 but also in the absence of operation. This results in wasteful consumption of power. As a method for reducing consumption power, there is a method that, when the detection button 730 is not operated for a predetermined time, a sleep mode is entered wherein signal input to the capacitance element electrodes E701–E705 is not allowed for power reduction to a possible low level whereas, when resuming the operation, the sleep mode is automatically canceled to resume the usual mode.

In order for automatic switching over between the usual mode and the sleep mode, it is a general practice to use an input device having a switch function of between on and off, together with a microcomputer control system. The output signal from the input device is a signal in a Hi-level at around a power voltage or in a Lo-level at around ground potential. The output signal, upon switching over, is turned from Lo-level to Hi-level or from Hi-level to Lo-level. Accordingly, in the input device, in the course of a transit from a non-operating state to an operating state, the output signal varies necessarily beyond a threshold voltage, a halt of the power voltage. By monitoring the output signal, it is possible to securely detect an operation and correctly cancel the sleep mode. However, in the capacitance type sensor 701, there is a possibility that the output signal does not change beyond the threshold voltage depending upon a magnitude of a force applied to the detection button 730. Unless the output signal changes beyond the threshold voltage, it is impossible to securely detect an operation to the operation button 730 even when monitoring the output signal of the capacitance type sensor 701, resulting in a problem that the sleep mode is not to be properly canceled. Namely, there is a fear for the capacitance type sensor 701 not to properly effect a switching between the sleep mode and the usual mode, making it difficult to realize the reduction of consumption power.

By the mechanical nature of the displacement electrode 712 and under the influence of the mechanism supporting the displacement electrode 712, the displacement electrode 712 once deformed is not ready to restore fully the original position even when the force is released away, possibly suffering from some deviation at around the operation. Such deviation disadvantageously emerges as hysteresis on the output signal or the sensor. In the capacitance type sensor 701, there is always application of a voltage to the capacitance element constituted between the capacitance element electrodes E701–E705 and the displacement electrode 712 regardless of a presence or absence of operation to the detection button 730. Consequently, the charge stored on the capacitance elements is not negligible in amount even while the detection button 730 is not operated. The storage amount of charge on the capacitance elements is varied by operating the detection button 730. Because the amount even before operation is not negligible in, magnitude, there is no sudden change in the course of a transit from an non-operating state to an operating state. Thus, where the change of charge amount is slight at around the operation, it is impossible to neglect a change of electrode spacing due to a positional deviation of the displacement electrode 712, increasing the hysteresis on the output signal.

Besides, the capacitance type sensor 701 can be suitably utilized as a device (force sensor) to recognize a force magnitude when the operator pushes down the detection button 730. However, it is not suited for the utilization as a device having a switch function for changing-over between different two states (e.g. on-state and off-state). Accordingly, where the capacitance type sensor 701 is built in an apparatus as a device having a switch function toward each direction, there is a difficulty in using the capacitance type sensor 701 as it is, requiring to separately provide a switch function corresponding to the directions, Meanwhile, for manufacturing a capacitance type sensor 701, capacitance element electrodes E701–E705 and reference electrode E700 are arranged on a substrate 720 for example by printing and etching. After that, these electrodes E701–E705, E700 are covered by an insulating film 713, over which is provided a displacement electrode 712 of conductive rubber or the like. Then, a detection button 730 is set up and further the entire is fixed by a supporting member 760. Thus, a comparatively troublesome process is needed. Such a troublesome process is similarly required for the conventional other capacitance type sensors, besides the foregoing capacitance type sensor 701.

SUMMARY OF THE INVENTION

It is an object of the present invention to provide a capacitance type sensor capable of reducing power consumption by switching to a sleep mode when used with a microcomputer control system.

Another object of the invention is to provide a capacitance type sensor capable of reducing the hysteresis on the output signal.

Another object of the invention is to provide a capacitance type sensor for utilization on any of the device for recognizing a force magnitude in each direction and the device having a switch function.

Another object of the invention is to provide a method for efficiently manufacturing a capacitance type sensor while omitting troublesome processes.

According to a first aspect of the present invention, there is provided a capacitance type sensor comprising: a conductive member; a capacitance element electrode constituting a capacitance element with the conductive member; and one or a plurality of movable electrodes arranged opposite to the capacitance element electrode with respect to and at a distance from the conductive member, the one or a plurality of movable electrodes being capable of, by being applied a force thereto, being displaced to be brought into contact with the conductive member and then displacing the conductive member, and by being capable of recognizing a force applied to the movable electrode on the basis of a detection, using a signal input to the capacitance element electrode, of a change in capacitance value of the capacitance element caused by a change in distance between the conductive member and the capacitance element electrode.

With this structure, by an external force the movable electrode is first displaced into contact with conductive member, followed by a displacement of those while keeping the contact state. When the spacing between the conductive member and the capacitance element electrode is changed by the displacement of the conductive member, changed is the capacitance value of the capacitance element constituted between those. Based on the change of capacitance value, the force applied is recognized. Herein, in the case the difference of the potentials respectively held on the movable electrode and the conductive member is increased greater than an absolute value of a predetermined threshold voltage, the output signal necessarily varies beyond the threshold voltage in the course of a transition from a state of no contact between the both into a state of their contact. By monitoring the output signal, it is possible to securely detect an operation to the capacitance type sensor. Due to this, when the detective member is not operated for a predetermined time, switching can be made to the sleep mode. When the operation is resumed, the sleep mode can be securely canceled. Accordingly, consumption power reduction can be realized by suitable switching over between the sleep and usual modes.

By a structure the movable electrode is kept at a ground potential and wherein, when the conductive member and the movable electrode are not in contact, the conductive member can be maintained in an insulated state without electrical connection to anywhere. Due to this, no voltage is applied to the capacitance element constituted between the conductive member and the capacitance element electrode. At this time, the charge stored on the capacitance element is negligibly small in amount, to stabilize the output voltage at constant level. Meanwhile, when the detective member is operated to place the conductive member and movable electrode into contact, the conductive member has a ground potential, thus applying a voltage to the capacitance element. Accordingly, in the course of a transit from a state the movable electrode and the conductive member are not in contact to a state of their contact, the amount of the charge stored on the capacitance element suddenly changes to greatly vary the output signal correspondingly. Herein, even in the case the conductive member and/or the movable electrode somewhat deviate in position at around the operation, unless there is no contact between the conductive member and the movable electrode, the output signals (from the capacitance element electrodes) of capacitance type sensor corresponding to the capacitance elements are nearly the same in amount. This can reduce the hysteresis on the output signal of capacitance type sensor corresponding to the capacitance element.

Furthermore, by a structure that the conductive element is held in an insulated state and the movable electrode held at the ground potential and the movable electrode held at a potential different from the ground potential are properly arranged, the foregoing two effects are obtained at the same time as described in detail later.

According to a second aspect of the invention, there is provided a capacitance type sensor comprising: a substrate; a detective member being opposite to the substrate; a conductive member disposed between the substrate and the detective member, and displaceable in a same direction as the detective member as the detective member is displaced in a direction vertical to the substrate; a capacitance element electrode formed on the substrate and constituting a capacitance element with the conductive member; one or a plurality of fixed electrodes formed on the substrate; and one or a plurality of movable electrodes disposed between the detective member and the conductive member at a distance from the conductive member, and electrically connected to the fixed electrode, the one or a plurality of movable electrodes being capable of being brought into contact with the conductive member and then displacing the conductive member as the detective member is displaced, and by being capable of recognizing the displacement of the detective member on the basis of a detection, using a signal input to the capacitance element electrode, of a change in capacitance value of the capacitance element caused by a change in distance between the conductive member and the capacitance element electrode.

With this structure, when a force is externally applied to the detective member, the movable electrode is first displaced into contact with the conductive member, followed by a displacement of those while keeping the contact state, similarly to the capacitance type sensor of the first aspect. When the spacing between the conductive member and the capacitance element electrode is changed by the displacement of the conductive member, changed is the capacitance value of the capacitance element constituted between those. Based on the capacitance value change, the force applied is recognized. Herein, by electrically connecting the movable electrode with the fixed electrode and providing a structure, as in the capacitance type sensor in the third aspect, to ground the conductive member and hold the fixed electrode at a potential different from the ground potential, or a structure, as in the capacitance type sensor in the fourth aspect, to hold the conductive member at a potential different from the ground potential and ground the fixed electrode, the difference between the potentials respectively held by the movable electrode and the conductive member is made greater than the absolute value of a predetermined threshold voltage. Due to this, in the course of a transit from a state the movable electrode and the conductive member are not in contact to a state of their contact, the output signal is switched from a Hi-level at around the potential the movable electrode or conductive member is held to a Lo-level at around the ground potential, or from the Lo-level to a Hi-level, i.e., varying is necessarily beyond the threshold voltage. By monitoring the output signal, it is possible to securely detect an operation to the capacitance type sensor. Due to this, when the detective member is not operated for a predetermined time, switching can be made to a sleep mode. When the operation is resumed, the sleep mode can be securely canceled. Therefore, by properly switching between the sleep and usual modes, it is possible to obtain the effect of realizing the reduction of consumption power, similarly to the capacitance type sensor of the first aspect.

Incidentally, "to recognize a displacement of the detective member" is nearly equivalent in meaning to "to recognize a force externally applied to the detective member". This is true for the capacitance type sensor of the third to sixth aspect.

According to a third aspect of the invention, there is provided a capacitance type sensor comprising: a substrate; a detective member being opposite to the substrate; a conductive member disposed between the substrate and the detective member, and displaceable in a same direction as the detective member as the detective member is displaced in a direction vertical to the substrate; a capacitance element electrode formed on the substrate and constituting a capacitance element with the conductive member; a reference electrode formed on the substrate and electrically connected to the conductive member and grounded; a fixed electrode formed on the substrate and kept at a different potential from a ground potential; and a movable electrode disposed between the detective member and the conductive member at a distance from the conductive member, and electrically connected to the fixed electrode, the movable electrode being capable of being brought into contact with the conductive member and then displacing the conductive member as the detective member is displaced, and by being capable of recognizing the displacement of the detective member on the basis of a detection, using a signal input to the capacitance element electrode, of a change in capacitance value of the capacitance element caused by a change in distance between the conductive member and the capacitance element electrode.

With this structure, when a force is externally applied to the detective member, the movable electrode is first displaced into contact with the conductive member, followed by a displacement of those while keeping the contact state, similarly to the capacitance type sensor of the first aspect. When the spacing between the conductive member and the capacitance element electrode is changed by the displacement of the conductive member, changed is the capacitance value of the capacitance element constituted between those. Based on the capacitance value change, the force applied is recognized. Herein, by holding the conductive member at a ground potential through the reference electrode and the movable electrode at a potential different from the ground potential through the fixed electrode, in the course of a transit from a state the movable electrode and the conductive member are not in contact to a state of their contact, the output signal can be switched from a Hi-level at around the potential the fixed electrode is held to a Lo-level at around the ground potential, or from the Lo-level to a Hi-level, necessarily varying beyond the threshold voltage. By monitoring the output signal, it is possible to properly carry out switching between the sleep mode and the usual mode. It is possible to obtain the effect of realizing the reduction of consumption power, similarly to the capacitance type sensor of the first and second aspects.

Incidentally, "potential different from the ground potential" means "potential same in the sign (positive or negative) as a predetermined threshold voltage and having an absolute value greater than the absolute value thereof". This is true for the capacitance type sensor of the fourth and sixth aspects.

According to a fourth aspect of the invention, there is provided a capacitance type sensor comprising: a substrate; a detective member being opposite to the substrate; a conductive member disposed between the substrate and the detective member, and displaceable in a same direction as the detective member as the detective member is displaced in a direction vertical to the substrate; a capacitance element electrode formed on the substrate and constituting a capacitance element with the conductive member; a reference electrode formed on the substrate and electrically connected to the conductive member, and kept at a different potential from a ground potential; a fixed electrode formed on the substrate and grounded; and a movable electrode disposed between the detective member and the conductive member at a distance from the conductive member, and electrically connected to the fixed electrode, the movable electrode being capable of being brought into contact with the conductive member and then displacing the conductive member as the detective member is displaced, and by being capable of recognizing the displacement of the detective member on the basis of a detection, using a signal input to the capacitance element electrode, of a change in capacitance value of the capacitance element caused by a change in distance between the conductive member and the capacitance element electrode.

With this structure, when a force is externally applied to the detective member, the movable electrode is first displaced into contact with the conductive member, followed by a displacement of those while keeping the contact state, similarly to the capacitance type sensor of the first aspect. When the spacing between the conductive member and the capacitance element electrode is changed by the displacement of the conductive member, changed is the capacitance value of the capacitance element constituted between those. Based on the capacitance value change, the force applied is recognized. Herein, by holding the conductive member at a potential different from the ground potential through the reference electrode and the movable electrode at the ground potential through the fixed electrode, in the course of a transit from a state the movable electrode and the conductive member are not in contact to a state of their contact, the output signal is switched from a Hi-level at around the potential the conductive member is held to a Lo-level at around the ground potential, or from the Lo-level to a Hi-level, i.e., necessarily varying beyond the threshold voltage. By monitoring the output signal, it is possible to properly carry out switching between the sleep mode and the usual mode. It is possible to obtain the effect of realizing the reduction of consumption power, similarly to the capacitance type sensor of the first to third aspect.

According to a fifth aspect of the invention, there is provided a capacitance type sensor comprising: a substrate; a detective member being opposite to the substrate; a conductive member disposed between the substrate and the detective member, and displaceable in a same direction as the detective member as the detective member is displaced in a direction vertical to the substrate, the conductive member being maintained in an insulated state; a capacitance element electrode formed on the substrate and constituting a capacitance element with the conductive member; a fixed electrode formed on the substrate and grounded; and a movable electrode disposed between the detective member and the conductive member at a distance from the conductive member, and electrically connected to the fixed electrode, the movable electrode being capable of being brought into contact with the conductive member and then displacing the conductive member as the detective member is displaced, and by being capable of recognizing the displacement of the detective member on the basis of a detection, using a signal input to the capacitance element electrode, of a change in capacitance value of the capacitance element caused by a change in distance between the conductive member and the capacitance element electrode.

With this structure, when the conductive member and the movable electrode are not in contact, the conductive member is kept in an insulated state without electrical connection to anywhere. Thus, no voltage is applied to the capacitance element constituted between the conductive member and the capacitance element electrode. At this time, the charge stored on the capacitance element is negligibly small in amount, to stabilize the output signal at a constant level. Meanwhile, when the detective member is operated to place the conductive member and the movable electrode into contact, the conductive member has a ground potential. Thus, a voltage is applied to the capacitance element. Accordingly, in the course of a transit from a state the movable electrode and the conductive member are not in contact to a state of their contact, the amount of the charge stored on the capacitance element abruptly changes, to greatly vary the output signal correspondingly. Herein, even in the case the conductive member and/or the movable electrode somewhat deviate in position at around the operation, unless there is no contact between the conductive member and the movable electrode, the output signals (from the capacitance element electrodes) of capacitance type sensor corresponding to the capacitance elements are almost the same. This can reduce the hysteresis on the output signal of capacitance type sensor corresponding to the capacitance element.

According to a sixth aspect of the invention, there is provided a capacitance type sensor comprising: a substrate; a detective member being opposite to the substrate; a conductive member disposed between the substrate and the detective member, and displaceable in a same direction as the detective member as the detective member is displaced in a direction vertical to the substrate, the conductive member being maintained in an insulated state; a capacitance element electrode formed on the substrate and constituting a capacitance element with the conductive member; a first fixed electrode formed on the substrate; a second fixed electrode formed on the substrate; a first movable electrode disposed between the detective member and the conductive member at a distance from the conductive member, and electrically connected to the first fixed electrode; and a second movable electrode disposed between the detective member and the conductive member at a distance from the conductive member, and electrically connected to the second fixed electrode, the first fixed electrode being grounded and the second fixed electrode being kept at a different potential from a ground potential, the first and second movable electrodes being capable of being brought into contact with the conductive member and then displacing the conductive member as the detective member is displaced, and by being capable of recognizing the displacement of the detective member on the basis of a detection, using a signal input to the capacitance element electrode, of a change in capacitance value of the capacitance element caused by a change in distance between the conductive member and the capacitance element electrode.

With this structure, when a force is externally applied to the detective member, the first and second movable electrodes are first displaced into contact with the conductive member, followed by a displacement of the movable electrodes and conductive member while keeping the contact state. When the spacing between the conductive member and the capacitance element electrode is changed by the displacement of the conductive member, changed is the capacitance value of the capacitance element constituted between those. Based on the capacitance value change, the force applied is recognized. Herein, by holding the first movable electrode at a ground potential through the first fixed electrode and the second movable electrode at a potential different from the ground potential through the second fixed electrode, in the course of a transit from a state the first and second movable electrodes and the conductive member are not in contact to a state of their contact, the output signal is switched from a Hi-level at around the potential the second fixed electrode is held to a Lo-level at around the ground potential, or from the Lo-level to a Hi-level, i.e., varying is necessarily beyond the threshold voltage. By monitoring the output signal, it is possible to properly carry out switching between the sleep and usual modes. It is possible to obtain the effect of realizing the reduction of consumption power, similarly to the capacitance type sensor of the first to fourth aspect.

Furthermore, with the above structure, when the first and second movable electrodes and the conductive member are not in contact, the conductive member is maintained in an insulated state without electrical connection to anywhere. No voltage is applied to the capacitance element constituted between the conductive member and the capacitance element electrode. At this time, the charge stored on the relevant capacitance element is negligibly small in amount, to stabilize the output signal at a constant level. Meanwhile, when the detective member is operated to place the conductive member and the first movable electrode into contact, the conductive member has a ground potential thus applying a voltage to the capacitance element. Accordingly, in the course of a transit from a state the first and second movable electrodes and the conductive member are not in contact to a state of their contact, the amount of the charge stored on the capacitance element suddenly changes to greatly vary the output signal correspondingly. Due to this, it is possible to obtain the effect the hysteresis can be reduced on the output signal of capacitance type sensor corresponding to the capacitance element, similarly to the capacitance type sensor of the fifth aspect.

Namely, the capacitance type sensor of the sixth aspect can realize both of consumption power reduction and output-signal hysteresis reduction.

In the capacitance type sensor of the invention, the movable electrode and the conductive member are formed of a conductive film, the conductive member being formed with a hole.

With this structure, because the movable electrode and the conductive member are formed by a conductive film, they are readily deformed by the application of a comparatively small force. For example, utilization is possible in measuring a pressure. Meanwhile, because of the provision of a hole in the conductive member, almost no pressure difference takes place between two spaces defined through the conductive member, i.e., between the space of between the conductive member and the movable electrode and the space of between the conductive member and the capacitance element electrode. Accordingly, it is possible to prevent the conductive member from displacing, and the capacitance value from varying, under the influence of a pressure other than the pressure to be measured.

The capacitance type sensor of the invention may be provided with a mechanism for deforming into concavo-convex the movable electrode and the conductive member in a region not opposed to the capacitance element electrode so as to apply a tensile force thereto.

With this structure, by deforming the movable electrode and conductive member formed by a conductive film in a region giving no effect upon detecting a capacitance value into concavo-convex and providing it with a moderate tensile force, favorable measuring accuracy can be exhibited without encountering film deflection and measuring accuracy lowering.

According to a seventh aspect of the invention, there is provided a capacitance type sensor comprising: a detective member; a substrate being opposite to the detective member; a conductive member disposed between the detective member and the substrate, and displaceable in a same direction as the detective member as the detective member is displaced in a direction vertical to the substrate; a capacitance element electrode formed on the substrate and constituting a capacitance element with the conductive member; one or a plurality of movable electrodes disposed between the detective member and the conductive member at a distance from the conductive member, the one or a plurality of movable electrodes being capable of being brought into contact with the conductive member and then displacing the conductive member as the detective member is displaced; a switch substrate; a first switch electrode formed on the switch substrate; and a second switch electrode kept at a ground or constant potential and disposed at a distance from the first switch electrode, the second switch electrode being capable of being brought into contact with the first switch electrode as the detective member is displaced, and by being capable of recognizing the displacement of the detective member on the basis of a detection, using a signal input to the capacitance element electrode, of a change in capacitance value of the capacitance element caused by a change in distance between the conductive member and the capacitance element electrode, and recognizing a judgment as to whether or not the first and the second switch electrodes are in contact with each other by using a signal input to the first switch electrode.

With this structure, when a force is externally applied to the detective member, the movable electrode is first displaced into contact with the conductive member, followed by a displacement of those while keeping the contact state, similarly to the capacitance type sensor of the first aspect. Where the spacing between the conductive member and the capacitance element electrode is changed by displacing the conductive member, changed is the capacitance value of the capacitance element constituted between those. Based on the capacitance value change, the force applied is recognized. Herein, by providing for example a structure the conductive member is grounded and the movable electrode is kept at a potential different from the ground potential, or a structure the conductive member is kept at a potential different from the ground potential and the movable electrode is grounded, it is possible to obtain the effect of realizing the reduction of consumption power, similarly to the foregoing.

Meanwhile, by keeping the movable electrode at the ground potential and providing a structure the conductive member, when the conductive member and movable member are not in contact, is kept in an insulated state without electrical connection to anywhere, it is possible to reduce the hysteresis on the output signal of capacitance type sensor corresponding to the capacitance element similarly to the above. Furthermore, by keeping the conductive member in an insulated state and providing a structure in which the movable electrode held at the ground potential and the movable electrode held at a potential different from the ground potential are properly arranged, the foregoing two effect can be obtained at the same time.

Meanwhile, as described above, by detecting a capacitance value change of the capacitance element resulting from a spacing change between the conductive member and the capacitance element electrode, it is possible to recognize a magnitude of the force externally applied to the detective member, and to recognize a presence or absence of a contact between the first and second switch electrodes. This can be utilized as a switch function. Accordingly, the capacitance type sensor of the invention can be utilized as a device having a function to output as a signal (analog signal) a displacement of the detective member (magnitude of the force externally applied to the detective member) and/or a device having a switch function. Thus, the capacitance type sensor possesses a function as a composite device utilizable as any of the devices, eliminating the necessity of re-manufacturing according to the both of applications.

According to an eighth aspect of the invention, there is provided, a method for manufacturing a capacitance type sensor comprising a conductive member and a capacitance element electrode constituting a capacitance element with the conductive member, and capable of recognizing a force applied to the conductive member on the basis of a detection, using a signal input to the capacitance element electrode, of a change in capacitance value of the capacitance element caused by a change in distance between the conductive member and the capacitance element electrode, the method for manufacturing a capacitance type sensor being characterized by comprising: an insert molding process for insert-molding, with an insulating material, a part of a lead wire of a leadframe and a range of the leadframe including the capacitance element electrode, the leadframe being formed by integrally forming with a frame the capacitance element electrode and the lead wire thereof in a predetermined pattern; a cutting process for cutting the lead wire of the capacitance element electrode off the frame; and a conductive member arranging process for arranging, to a mold product obtained by the insert molding process, the conductive member at a distance from the capacitance element electrode.

With this structure, by applying a lead frame or insert-molding process generally used in IC (integrated circuit) fabrication in the manufacture of a capacitance type sensor, a capacitance type sensor can be efficiently manufactured while omitting troublesome process.

With the method for manufacturing a capacitance type sensor of the invention, in the insert molding process, insert-molding is carried out to form, in the mold product, a step for supporting the conductive member.

With this structure, in the course of carrying out an insert-molding process, formed is a step for supporting the conductive member. Accordingly, during a conductive member arranging process, it is possible to omit a labor and time required for especially setting up a member for supporting the conductive member. Thus, mass production is to be realized based on a more efficient manufacturing method.

According to an eighth aspect of the invention, there is provided a method for manufacturing a capacitance type sensor according to the first aspect, comprising: an insert molding process for insert-molding, with an insulating material, a part of each lead wire of a leadframe and a range of the leadframe including the capacitance element electrode, the leadframe being formed by integrally forming with a frame the capacitance element electrode, the lead wire thereof, and a lead wire of the movable electrode in a predetermined pattern; a cutting process for cutting the lead wire of the capacitance element electrode off the frame; a conductive member arranging process for arranging, to a mold product obtained by the insert molding process, the conductive member at a distance from the capacitance element electrode; and a movable electrode arranging process for arranging, to the mold product, the movable electrode to be in contact with the lead wire of the movable electrode and at a distance from the conductive member.

With this structure, by applying a lead frame and insert-molding process generally used in IC assembly and arranging the movable electrode being spaced from the conductive member, it is possible to efficiently manufacture a capacitance type sensor providing the effect that the hysteresis of output signal is relatively small and consumption power is reduced.

In a method for manufacturing a capacitance type sensor of the invention, in the insert molding process, insert-molding is carried out to form, in the mold product, a step for supporting the conductive member and a step for supporting the movable electrode.

With the above structure, in the course of carrying out an insert-molding process, formed is a step for supporting the conductive member and movable electrode. It is possible to omit a labor and time required for especially setting up a member for supporting those in the conductive member arranging process and the movable electrode arranging process. Thus, mass production is to be realized based on a more efficient manufacturing method.

DESCRIPTION OF THE PREFERRED EMBODIMENTS

Figure 1:
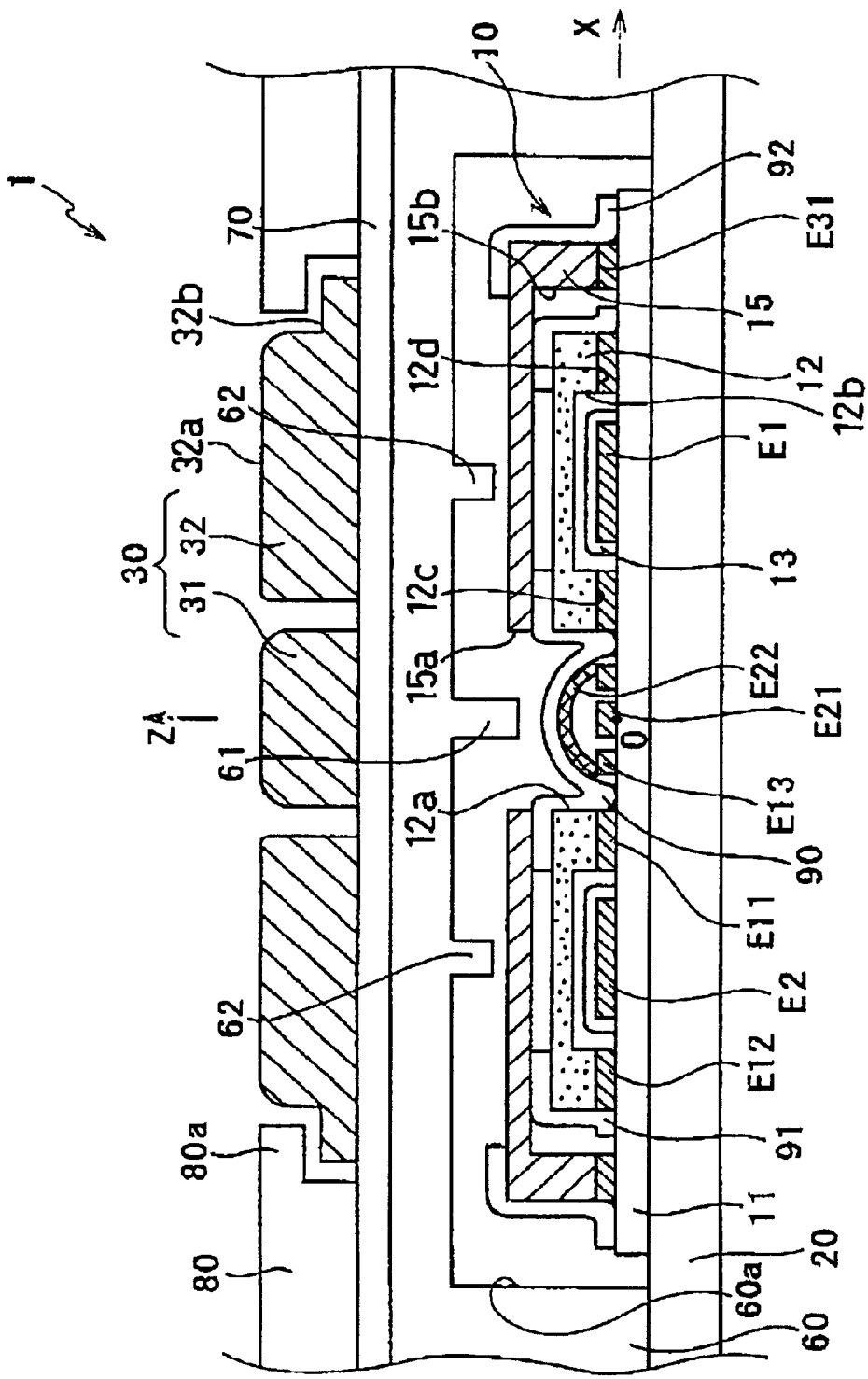
FIG. 1 is a sectional view showing a capacitance type sensor according to a first embodiment of the present invention.

Preferred embodiments of the present invention will be described below while referring to the drawings.

Figure 2:
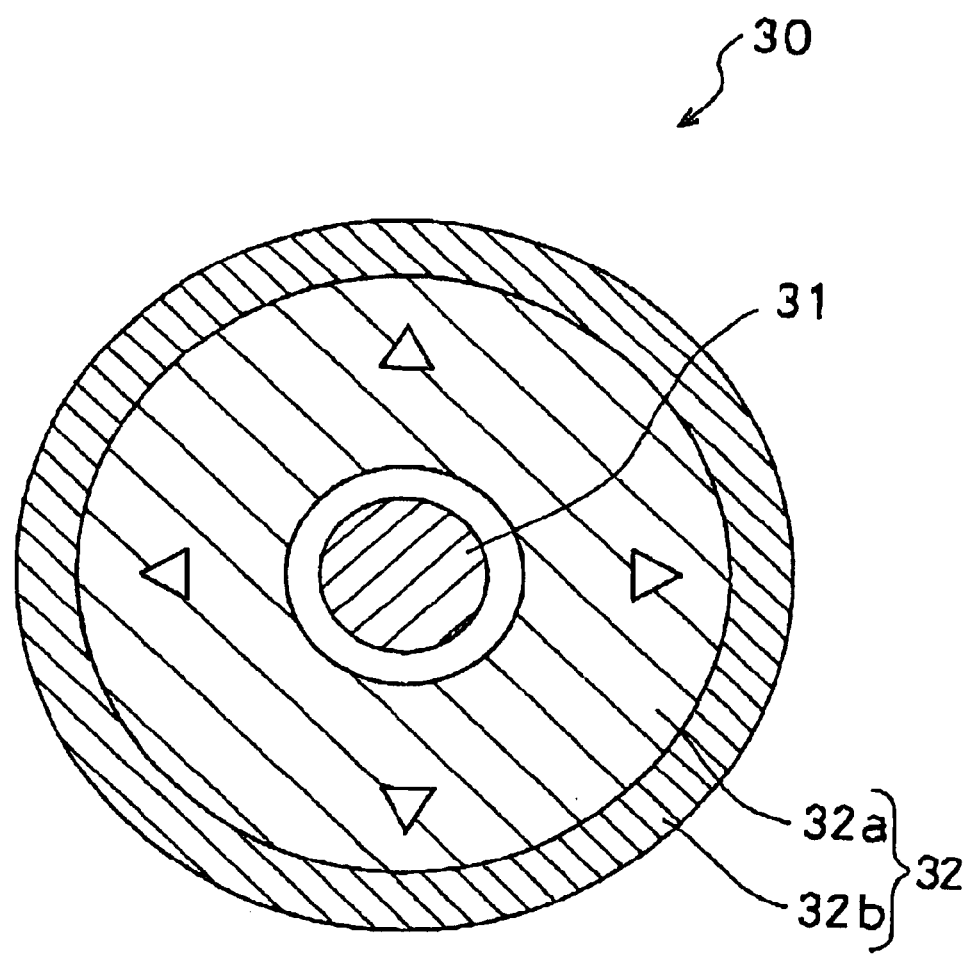
FIG. 2 is a top view showing a detection button of the capacitance type sensor of FIG. 1.
Figure 3:
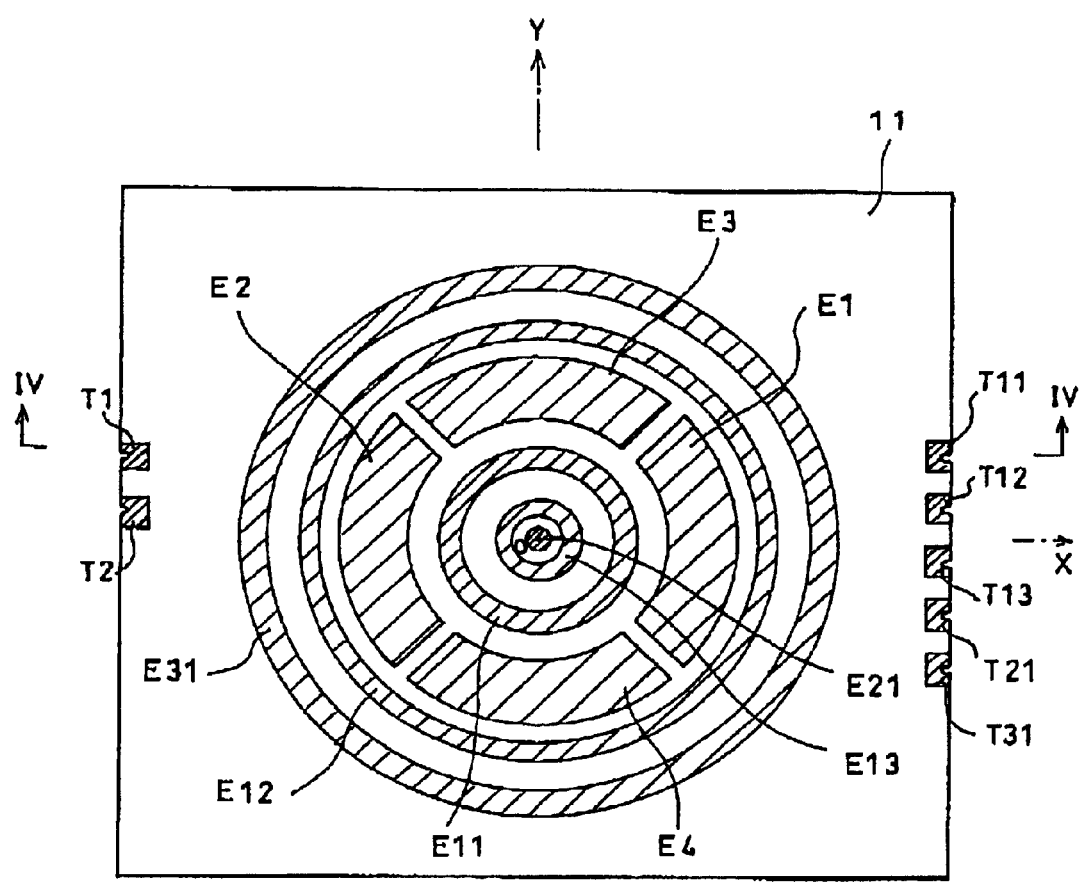
FIG. 3 is an arrangement view showing the electrodes formed on an FPC of the capacitance type sensor of FIG. 1.

Now explanation is made on the structure of a capacitance type sensor 1 according to a first embodiment of the present invention, with reference to FIGS. 1 to 3.

FIG. 1 is a cross-sectional view of the capacitance type sensor 1 according to the present embodiment. The capacitance type sensor 1 includes a substrate 20, a detection button 30 for detecting a force externally applied, a supporting member 60 fixingly supporting the detection button 30 on the substrate 20, a resin sheet 70 disposed between the detection button 30 and the supporting member 60, a sensor unit 10 arranged between a recess 60a formed generally rectangular in an underside of the supporting member 60 and the substrate 20, and a cover case 80 formed for example of a resin covering around the detection button 30 on an upper surface of the resin sheet 70.

The substrate 20 is a usual printed circuit substrate for an electronic circuit, which in this embodiment employs a glass epoxy substrate. The substrate 20 may use a film-formed substrate, such as a polyimide film. Because the film-formed substrate is flexible, it is preferably used on a support substrate having sufficient rigidity. Incidentally, this embodiment has a microcomputer 5 (see FIG. 12) and electronic circuit (sensor circuit), hereinafter referred, on the substrate 20.

The sensor unit 10 has a flexible printed-circuit substrate (hereinafter, referred to as "FPC") 11, capacitance element electrodes E1–E4 (only E1 and E2 shown in FIG. 1) formed on the FPC 11, reference electrodes E11–E13 formed also on the FPC 11, a determining-switch fixed electrode E21 formed nearly at a center on the FPC 11, a return-switch (wakeup-switch) fixed electrode E31 formed outer on the FPC 11, a displacement electrode 12 arranged over the reference electrodes E11 and E12, a determining-switch movable electrode E22 in a dome form arranged to contact the reference electrode E13 while spaced from the determining-switch fixed electrode E21, and a return-switch movable electrode 15 arranged on the return-switch fixed electrode E31 in a position above the displacement electrode 12.

Herein, definition is made on an XYZ three-dimensional coordinate system, for the convenience of explanation. The arrangement of parts will be described, with reference to that coordinate system. In FIG. 1, definition is given as: an origin O is at a center of the determining-button fixed electrode E21 of the sensor unit 10, an X axis extends in a horizontal rightward direction, a Z axis extends in an vertical upward direction and a Y axis extends in a depthwise direction vertical to the page. Namely, the FPC 11 has a surface defining an XY plane, while the Z axis passes through the respective centers of the determining-button fixed electrode E21 on the FPC 11 and the detection button 30.

The supporting member 60, formed of an elastic material, e.g. silicone rubber, is arranged in contact with the substrate 20, at the region other than the recess 60a formed in its underside. In the bottom of the recess 60a in the supporting member 60, projections 61, 62 are formed respectively corresponding to the determining-switch fixed electrode E21 and the capacitance element electrodes E1–E4 of the sensor unit 10.

FIG. 2 shows a top view of the detection button 30 of the capacitance type sensor 1 of FIG. 1 while FIG. 3 shows the arrangement of a plurality of electrodes formed on the FPC 11 of the capacitance type sensor 1 of FIG. 1. The detection button 30 of FIG. 2 is structured with a circular central button 31 having a diameter somewhat greater than the outer diameter of the reference electrode E13 shown in FIG. 3, and an annular direction button 32 arranged outer of the central button 31.

The direction button 32 is structured with an upper stage 32a having a smaller diameter serving as a receive-force part and a lower stage 32b having a greater diameter protruding outward from the lower end of the upper stage 32a. The outer diameter of the upper stage 32a is nearly equal to the outer diameter of the reference electrode E12 shown in FIG. 3 while the outer diameter of the lower stage 32b is nearly equal to the inner diameter of the return-switch fixed electrode E31 shown in FIG. 3. On the top surface of the upper stage 32a of the direction button 32, it can be seen that arrows are formed in operating directions (cursor-moving directions) correspondingly to the capacitance element electrodes E1–E4 of FIG. 3, i.e., correspondingly to the respective positive and negative directions of X and Y axes. Meanwhile, the upper stage 32a and the lower stage 32b have respective heights as shown in FIG. 1. The upper stage 32a has a height nearly equal to the central button 31 whereas the lower stage 32b is formed in a height to be play-fit in the underside of a retainer 80a provided on the cover case 80.

As was shown in FIG. 1, the central button 31 is fixed, by bonding, on an upper surface of the resin sheet 70 over the supporting member 60, correspondingly to the determining-button fixed electrode E21, the determining-button movable electrode E22 and the reference electrode E13. Meanwhile, the direction button 32 is arranged correspondingly to the capacitance element electrodes E1–E4, by virtue of a fall-preventing mechanism that the lower stage 32b is retained by the stop 80a forming a part of the cover case 80. Namely, the direction button 32 at its lower stage 32b is play-fit in a space lower of the stop 80a, thus being prevented from falling out of the cover case 80.

Note that the substrate 20, the supporting member 60, the resin sheet 70 and the cover case 80 are mutually fixed not to separate one from another by tightening, with corresponding nuts (not shown), the fixing screws (not shown) inserted in the through-holes (not shown) formed respectively.

Now explanation is made on the structure of the sensor unit 10 of the present embodiment, with reference to FIGS. 3 to 6.

The sensor unit 10 is integrated with a multiplicity of electrodes on the upper surface of the generally rectangular FPC 11, including the capacitance element electrodes E1–E4, the reference electrodes E11–E13 and the return-switch fixed electrode E31, as shown in FIG. 3, and the displacement electrode 12 arranged above the reference electrodes E11, E12 as shown in FIG. 1. This is fixed by adhesive such that the underside of the FPC 11 where no electrodes are provided is in contact with the substrate 20 and it is arranged within the recess 60a of the supporting member 60.

On the FPC 11, provided are a determining-button fixed electrode E21 circular about the origin O, an annular reference electrode E13 arranged outer of the determining-button fixed electrode E21, an annular reference electrode E11 arranged outer of the annular reference electrode E13, capacitance element electrodes E1–E4 generally in a fan shape arranged outer of the reference electrode E11, annular reference electrode E12 arranged outer of the capacitance element electrodes E1–E4, and annular return-switch fixed electrode E31 arranged outer of the reference electrode E12.

The capacitance element electrodes E1 and E2 are arranged in linear symmetry about the Y axis while being spaced in the X-axial direction, respectively corresponding to the positive and negative directions in the X axis. These are used to detect an X-axial component of an external force. The capacitance element electrodes E3 and E4 are arranged in linear symmetry about the X axis while being spaced in the Y-axial direction, respectively corresponding to the positive and negative directions in the Y axis. These are used to detect a Y-axial component of an external force. Meanwhile, the determining-switch fixed electrode E21 is utilized, together with the determining-switch movable electrode E22, for input determining operation.

Figure 5:
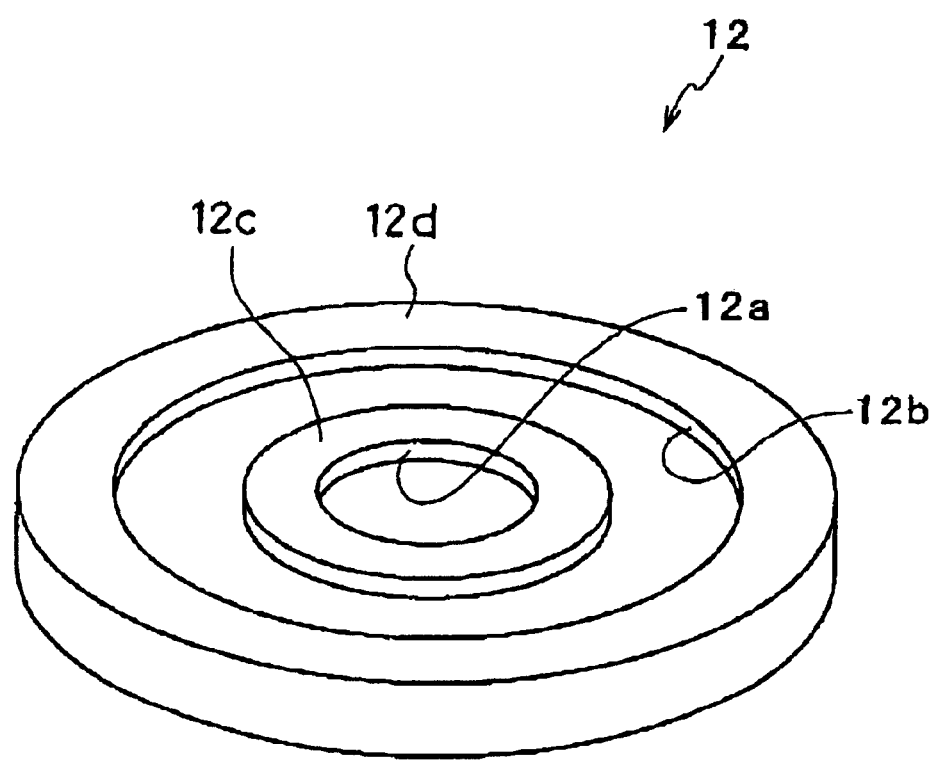
FIG. 5 is a schematic structural view showing a displacement electrode of the capacitance type sensor of FIG. 1.

FIG. 5 shows the displacement electrode 12 of sensor unit 10 in a vertically inverted state from the arrangement of FIG. 1, in order for easy understanding of its backside structure. The displacement electrode 12 is formed by a metal-make disk member, having an outer diameter nearly equal to the outer diameter of the reference electrode E12, as shown in FIG. 1. The displacement electrode 12 is formed, in a center, with a through-hole 12a having an outer diameter nearly equal to the inner diameter of the reference electrode E11, Furthermore, in the backside (upper surface in FIG. 5) of the displacement electrode 12, formed is an annular groove 12b having an inner diameter nearly equal to the outer diameter of the reference electrode E11 and an outer diameter nearly equal to the inner diameter of the reference electrode E12. The through-hole 12a and groove 12b of the displacement electrode 12 are formed by conducting an etching on one sheet of metal. By such working, a convex part 12c is formed on a side close to the through-hole 12a while a convex part 12d is formed on a side close to the outer periphery, on the backside of the displacement electrode 12.

The displacement electrode 12 is arranged with the axis of the through-hole 12a placed correspondingly to the Z axis and the backside positioned on a side close to the FPC 11, as shown in FIG. 1. At this time, the convex part 12c surface of displacement electrode 12 formed close to the through-hole 12a is in close contact with the surface of the reference electrode E11 on the FPC 11 while the convex part 12d surface of displacement electrode 12 formed close to the outer periphery is in close contact with the surface of the reference electrode E12 on the FPC 11. At this time, at between the capacitance element electrodes E1–E4 on the FPC 11 and the groove 12b bottom surface of the displacement electrode 12, a gap is formed having a spacing nearly equal to the depth of the groove 12b. In this embodiment, because the capacitance element electrodes E1–E4 at surfaces are covered by an insulating film (resist film) 13, the gap between the capacitance element electrodes E1–E4 and the groove 12b bottom surface of the displacement electrode 12 is somewhat narrower than the depth of the groove 12b.

Note that, in this embodiment, by forming an insulating film 13 on the surface of the capacitance element electrodes E1–E4, the capacitance element electrodes E1–E4 formed of copper or the like are not exposed to air and hence prevented against oxidation.

Figure 6:
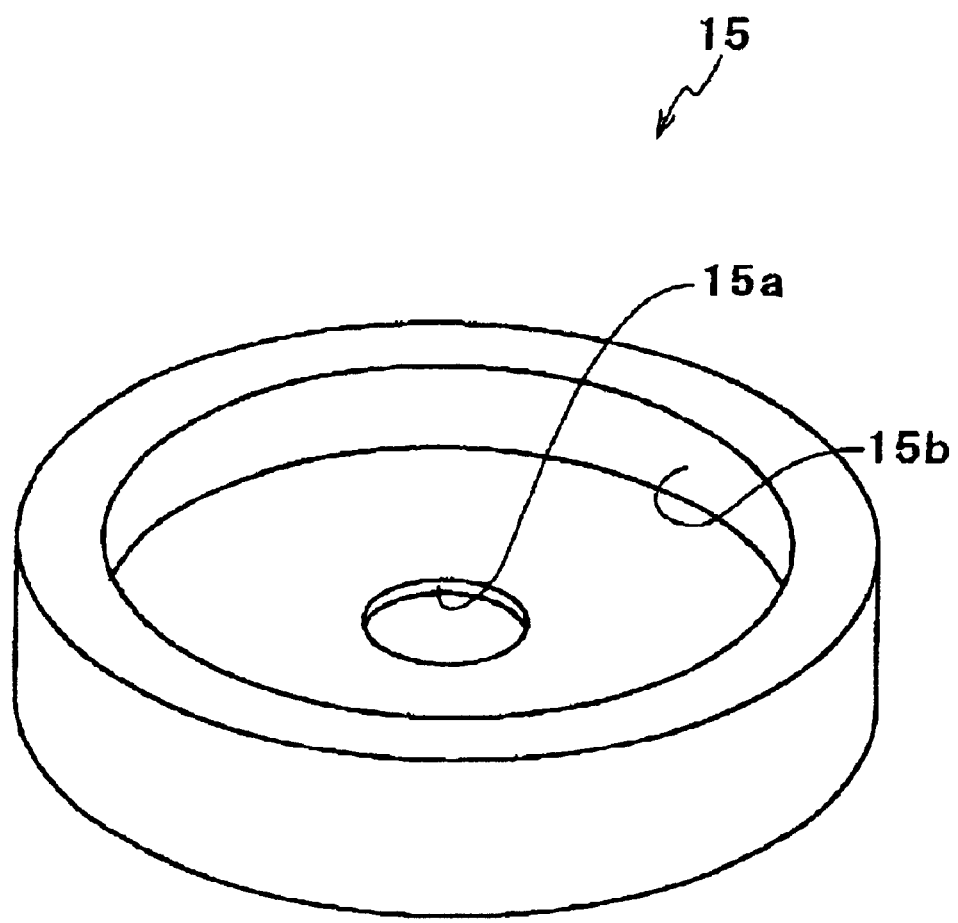
FIG. 6 is a schematic structural view showing a return-switch movable electrode of the capacitance type sensor of FIG. 1.

FIG. 6 shows the return-switch movable electrode 15 of sensor unit 10 in a vertically inverted state from the arrangement of FIG. 1, in order for easy understanding of its backside structure. The return-switch movable electrode 15 is formed by a metal-made disk member, having an outer diameter nearly equal to the outer diameter of the return-switch fixed electrode E31, as shown in FIG. 1. In the backside (upper surface in FIG. 6) of the return-switch movable electrode 15, formed is a recess 15b having an outer diameter nearly equal to the inner diameter of the return-switch fixed electrode E31. Furthermore, in a center of the return-switch movable electrode 15, i.e., in a center of the recess 15b, formed is a through-hole 15a having an outer diameter nearly equal to the inner diameter of the reference electrode E11.

The return-switch movable electrode 15 thus structured is arranged with the axis of the through-hole 15a placed correspondingly to the Z axis and the backside is on a side close to the FPC 11, as shown in FIG. 1. In this case, the return-switch movable electrode 15 at its convex outer of the recess 15b in the backside is placed in close contact with the surface of the return-switch fixed electrode E31.

As can be seen in FIG. 1, the recess 15b of the return-switch movable electrode 15 is formed in a depth greater than the thickness of the displacement electrode 12. Consequently, a gap with a predetermined spacing (spacing nearly equal to a difference between the depth of the recess 15b of the return-switch movable electrode 15 and the thickness of the displacement electrode 12) is formed between the upper surface of the displacement electrode 12 and the bottom surface of the recess 15b of the return-switch movable electrode 15.

Explanation is further made on the operation of the determining-switch movable electrode E22 in the case the central button 31 is operated, with reference to FIG. 1. In the case the central button 31 is pushed down, the projection 61 contacts the determining-switch movable electrode E22. Then, the determining-switch movable electrode E22 elastically deforms with a click feeling, and goes into contact the determining-switch fixed electrode 21. By a contact between the determining-switch movable electrode E22 and the determining-switch fixed electrode E21, the determining-switch fixed electrode E21 and the reference electrode E13 come into an electric contact through the determining-switch movable electrode E22. By detecting a presence or absence of an electrical connection between the both, utilization as a switch is made possible.

The displacement electrode 12 and the determining-switch movable electrode E22, after being arranged as in FIG. 1, are fixed on the FPC by resin sheets 90, 91. The resin sheet 90 is a thin-film member generally circular adhered on the upper surface of displacement electrode 12 close to the through-hole 12a to the entire upper surface of the determining-switch movable electrode E22. The resin sheet 91 is an annular member adhered on the upper surface of displacement electrode 12 close to the outer periphery. These resin sheets 90, 91 are previously applied with an adhesive so that the displacement electrode 12 and determining-switch movable electrode E22 can be fixed by pressurization on the FPC 11.

In the case the return-switch movable electrode 15 is arranged above the displacement electrode 12, the resin sheets 90, 91 are laid between the upper surface of displacement electrode 12 and the bottom surface of the recess 15b of the return-switch movable electrode 15. More specifically, the resin sheet 90 is laid on the upper surface of displacement electrode 12 close to an end adjacent the through-hole 12a, while the resin sheet 91 is laid on the upper surface of the displacement electrode 12 close to the outer periphery. A gap is formed in the other region than the above. In this embodiment, the spacing between the upper surface of displacement electrode 12 and the bottom surface of the recess 15b of return-switch movable electrode 15 is nearly equal to the thickness of the resin sheets 90, 91.

The return-switch movable electrode 15, after arranged as above, is fixed onto the FPC 11 by an annular resin sheet 92 adhered in a vicinity of the outer periphery of the upper surface.

Meanwhile, the FPC 11 shown in FIG. 3 has five cutouts formed in an X-axis positive direction end and two cutouts formed in an X-axis negative direction end. At around the cutouts, seven terminals T1, T2, T11–T13, T21 and T31 are respectively provided that are structured by electrodes for use as connection lands. The capacitance element electrodes E1–E4, reference electrodes E11 E13, determining-switch fixed electrode E21 and return-switch fixed electrode E31 are each connected to any of the terminals T1, T2, T11–T13, T21 and T31 (see FIG. 7) through a lead wire (not shown). Furthermore, the terminals T1, T2, T11–T13, T21 and T31 are connected to a microcomputer 5 (see FIG. 12) and the like provided on the substrate 20 as described later. Accordingly, the capacitance element electrodes E1–E4, the reference electrodes E11–E13, the determining-switch fixed electrode E21 and return-switch fixed electrode E31 can be controlled by the microcomputer 5.

Figure 4:
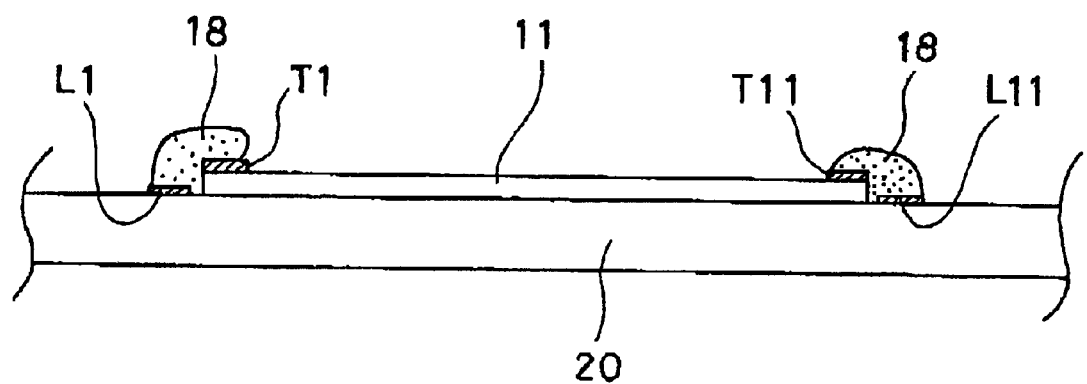
FIG. 4 is a cross sectional view on line IV—IV in FIG. 3, showing a state the FPC is arranged on the substrate.

FIG. 4 shows a state in which the FPC 11 is arranged on the substrate 20. Herein, described are connection electrodes L1, L11 for use as pole-connection lands arranged correspondingly to the terminals T1, T11, in the area close to outer edges the FPC 11 is arranged on the substrate 20. In the same way, connection electrodes (not shown) similar to the connection electrodes L1, L11 are arranged correspondingly to the other terminals T2, T12, T13, T21 and T31 on the FPC 11.

The FPC 11 arranged with the sensor unit 10 is set up on the substrate 20. Then, in the case a conductive solder 18 is interposed between the terminals T1, T11 and the corresponding connection electrodes L1, L11, the both can be electrically and mechanically connected together. As for the other terminals T2, T12, T13, T21 and T31 on the FPC 11, by interposing a solder between them and the connection electrodes (not shown) provided correspondingly similarly to the terminals T1, T11 shown in FIG. 4, the both can be electrically and mechanically connected together.

Figure 7:
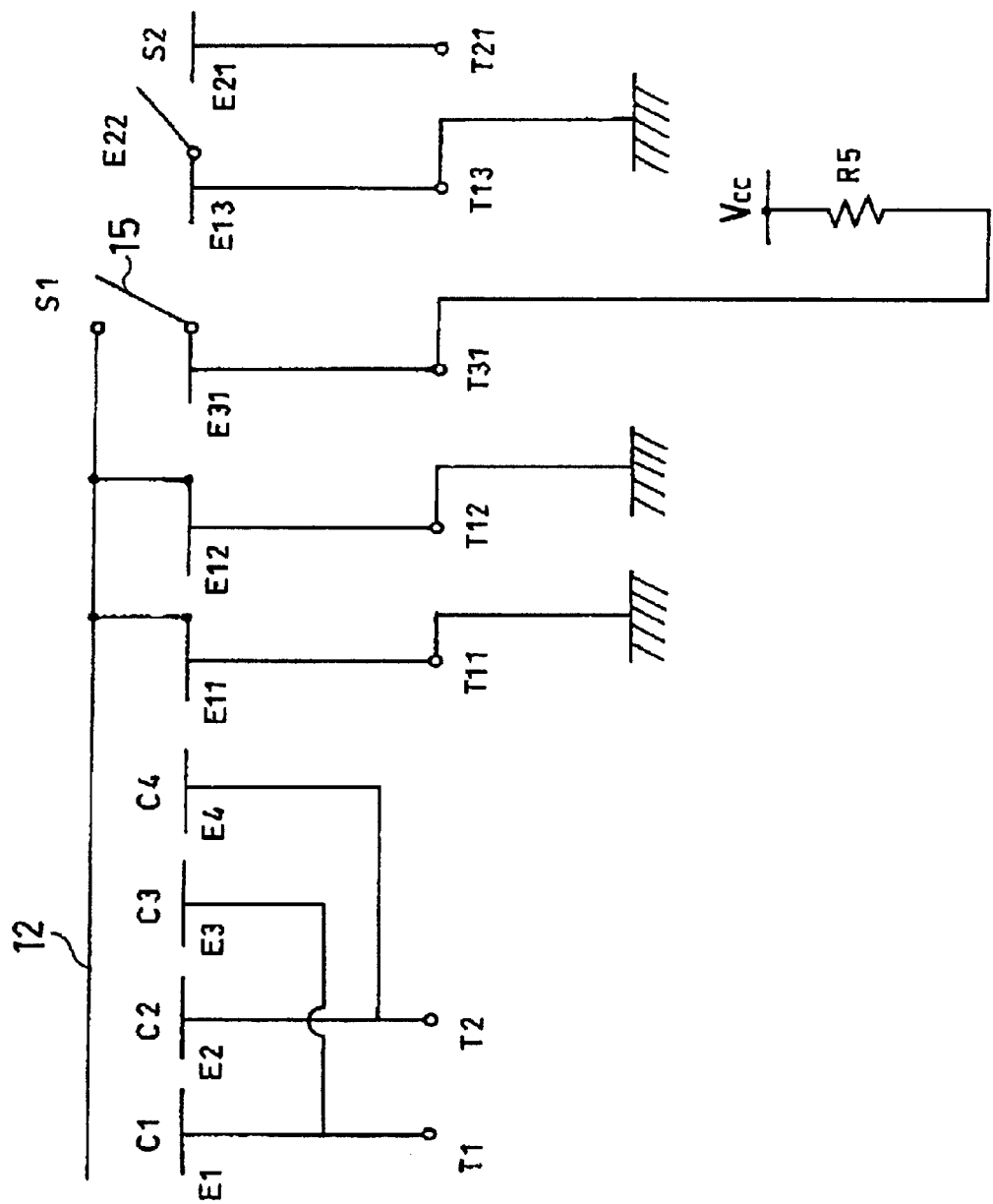
FIG. 7 is a circuit diagram showing an equivalent circuit on the capacitance type sensor of FIG. 1.

Now explanation is made on the circuit configuration of the capacitance type sensor 1 of the present embodiment, with reference to FIG. 7.

In the capacitance type sensor 1 of this embodiment, there are provided between the displacement electrode 12 for displacement as a common electrode shown in FIG. 1 and, fixed and discrete capacitance element electrodes E1–E4, variable capacitance elements C1–C4 whose capacitance values are variable depending upon a displacement of the displacement electrode 12. The spacing between the displacement electrode 12 and the capacitance element electrodes E1–E4 is narrowed when the direction button 32 is pushed down, and returns to the original state when the application force is released away. Consequently, the capacitance elements C1–C4 can be considered as a variable capacitance element configured to change a capacitance value depending upon a displacement of the displacement electrode 12. Meanwhile, the capacitance element electrodes E1, E3 are connected to the terminal T1 while the capacitance element electrodes E2, E4 are connected to the terminal T2. Thus, a delay circuit is formed including the capacitance elements C1–C4.

Meanwhile, the reference electrodes E11, E12 are to contact the displacement electrode 12, and grounded through the terminals T1, T12. Thus, the displacement electrode 12 is resultingly held at a ground potential through the reference electrodes E11, E12 and terminals T11, T12.

From the fact that the return-switch movable electrode 15 contacted with the return-switch fixed electrode E31 is to assume either a state contacted with the displacement electrode 12 (ON) or a state not contacted therewith (OFF), a return switch S1 is formed between the displacement electrode 12 and the return-switch fixed electrode E31. The return-switch fixed electrode E31 has, at the other end, a terminal T31 held at a power voltage Vcc of a constant voltage value through a pull-up resistance element R5.

From the fact that the reference electrode E13 is grounded through a terminal T13 wherein the determining-switch movable electrode E22 contacted with the reference electrode E13 is to assume either a state contacted with the determining-switch fixed electrode E21 (ON) or a state not contacted therewith (OFF), a determining switch S2 is formed cooperatively with the determining-switch fixed electrode E21.

The capacitance type sensor 1 of this embodiment can selectively take either a mode that a force applied to the detection button 30 is to be detected (hereinafter, referred to as "usual mode") or a mode that consumption power is reduced to a possible low extent (hereinafter, referred to as "sleep mode"). In the case no operation is made to the detection button 30 in a lapse of a predetermined time in the usual mode, automatic switching is made from the usual mode to the sleep mode. Meanwhile, when the detection button 30 is operated in the sleep mode, the sleep mode is canceled and the usual mode is automatically restored from the sleep mode.

Figure 8:
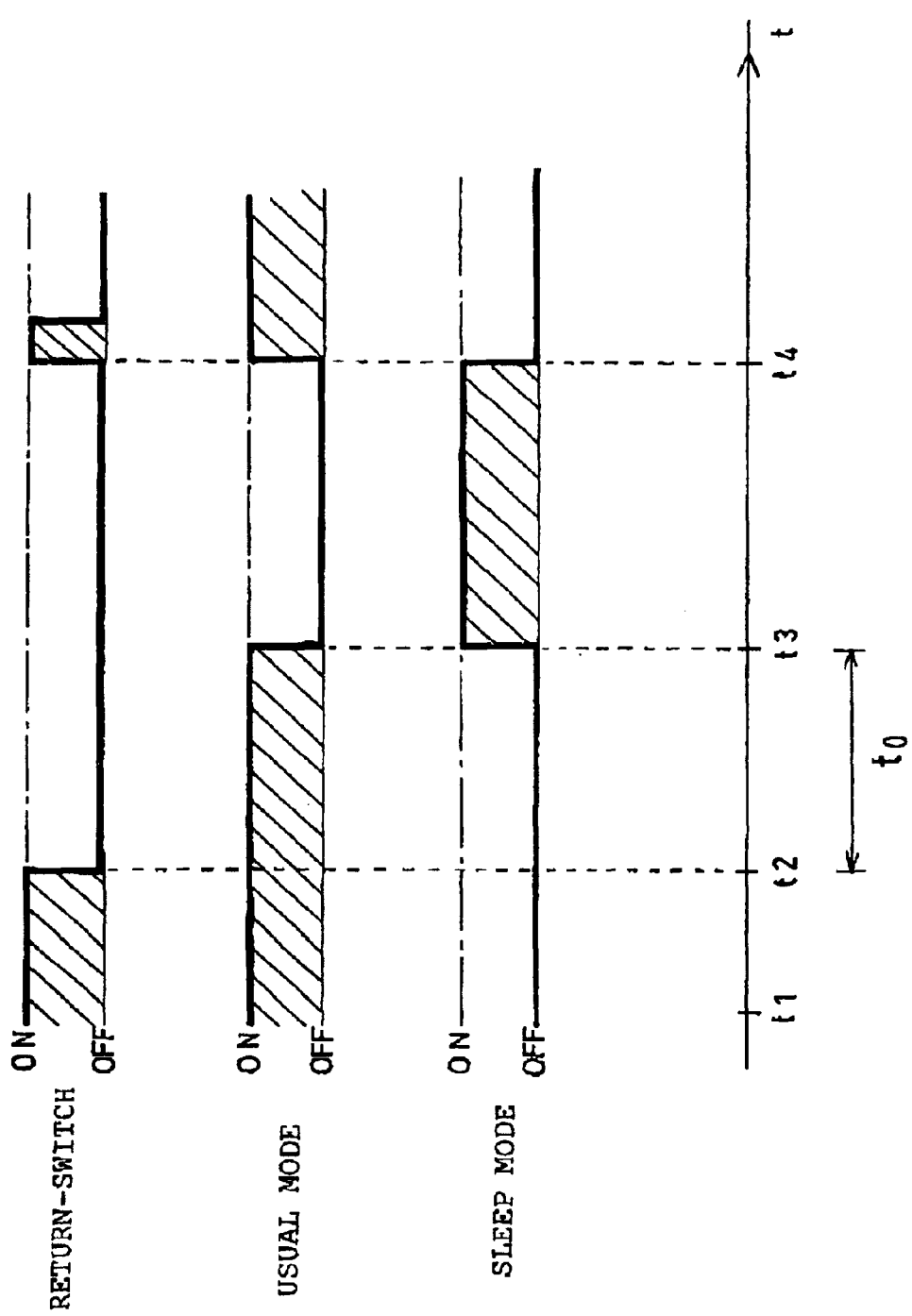
FIG. 8 is an explanatory chart showing one example of mode switching in the capacitance type sensor of FIG. 1.

Now explanation is made on one example of mode switching on the capacitance type sensor 1, with reference to FIG. 8. Note that, in FIG. 8, the states (ON or OFF) of normal mode, sleep mode and return switch are depicted in a way corresponding each other with respect to the lapse of time, wherein the detection button 30 is assumably operated at time t1.

First explained is the case that operation is made to the direction button 32 of detection button 30. In this case, because the direction button 32 is operated, the return-switch movable electrode 15 contacts the displacement electrode 12 so that the return switch 1S is on and the capacitance type sensor 1 is in the usual mode (usual mode on and sleep mode off). Until the time t2 is reached, the direction button 32 is continuously operated. When the operation to the direction button 32 is ceased at time t2, the return-witch movable electrode 15 and the displacement electrode 12 are separated and the return-switch S1 is switched from on to off. In the duration before time t3 that a predetermined time t0 elapsed from time t2, it is assumed that the state of no operation to the detection button 30 is kept in the usual mode. In this embodiment, setting is provided such that, in the case the state of no operation to the detection button 30 continues for a predetermined time t0 in the usual mode, switching is automatically made from the usual mode to the sleep mode.

When time t3 is reached, switching is made from the usual mode to the sleep mode. Namely, the usual mode is switched from on to off while the sleep mode is switched from off to on. Before operating the detection button 30, the sleep mode is maintained on. Thereafter, when the direction button 30 is again operated at time t4, the return-switch movable electrode 15 contacts the displaying electrode 12 so that the return switch S1 switches from OFF to ON and simultaneously the sleep mode is switched to the usual mode. Namely, the sleep mode is switched from on to off while the usual mode is switched from off to on.

In this manner, when the return switch S1 is switched from off to on, the voltage on the return-switch fixed electrode E31 necessarily varies beyond a threshold voltage in nearly a half of the power voltage. By monitoring the voltage change obtained from the output signal at the terminal T31 connected to the return-switch fixed electrode E31 by a microcomputer 5 described later, it is possible to securely detect an operation to the direction button 32.

Although the above is the explanation on the case the direction button 32 of detection button 30 is operated, mode switching is similarly made upon operating the central button 31.

Figure 9:
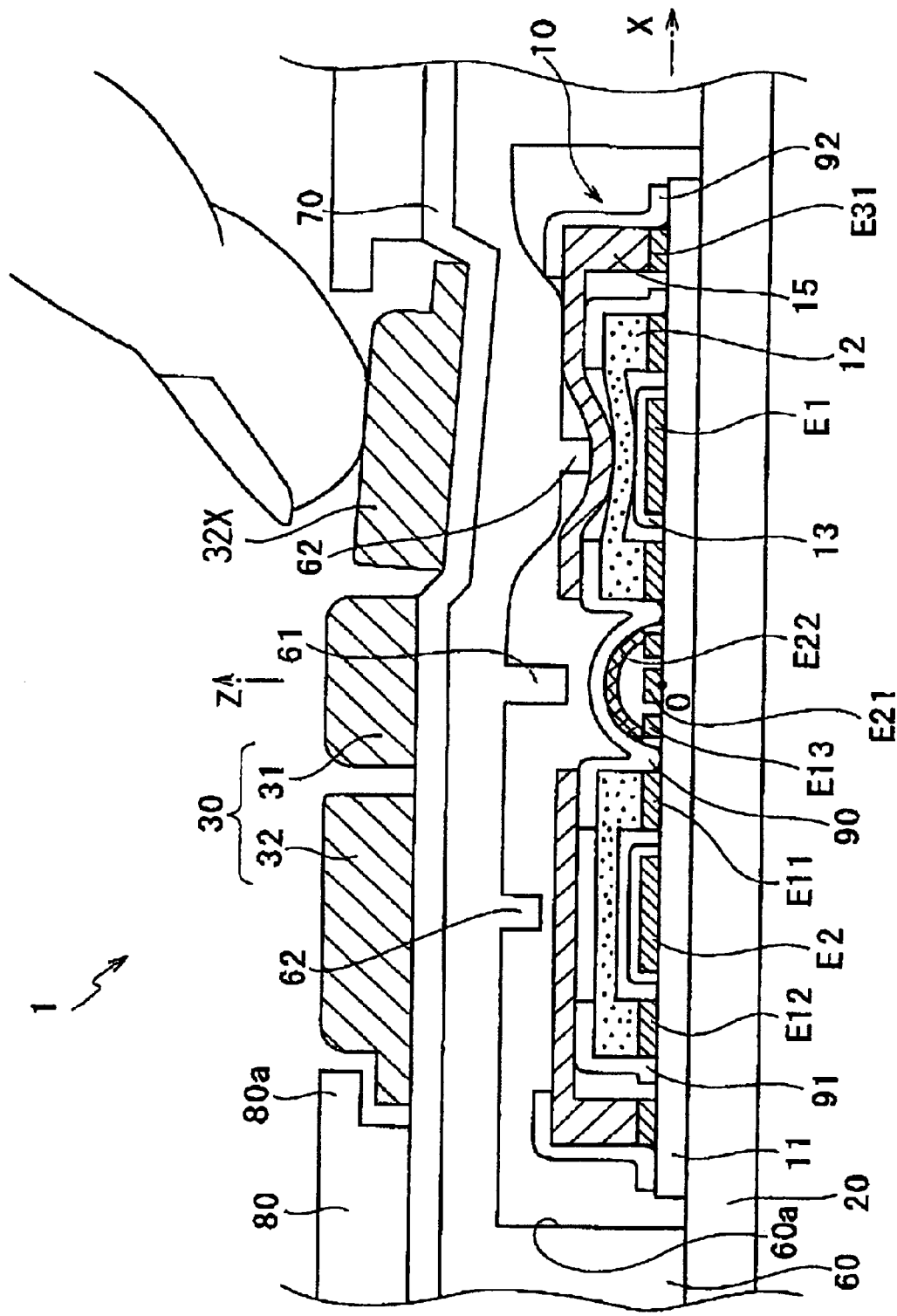
FIG. 9 is a cross sectional view showing a state that operated is a direction button at its X-axis positive direction part of the capacitance type sensor of FIG. 1.
Figure 10:
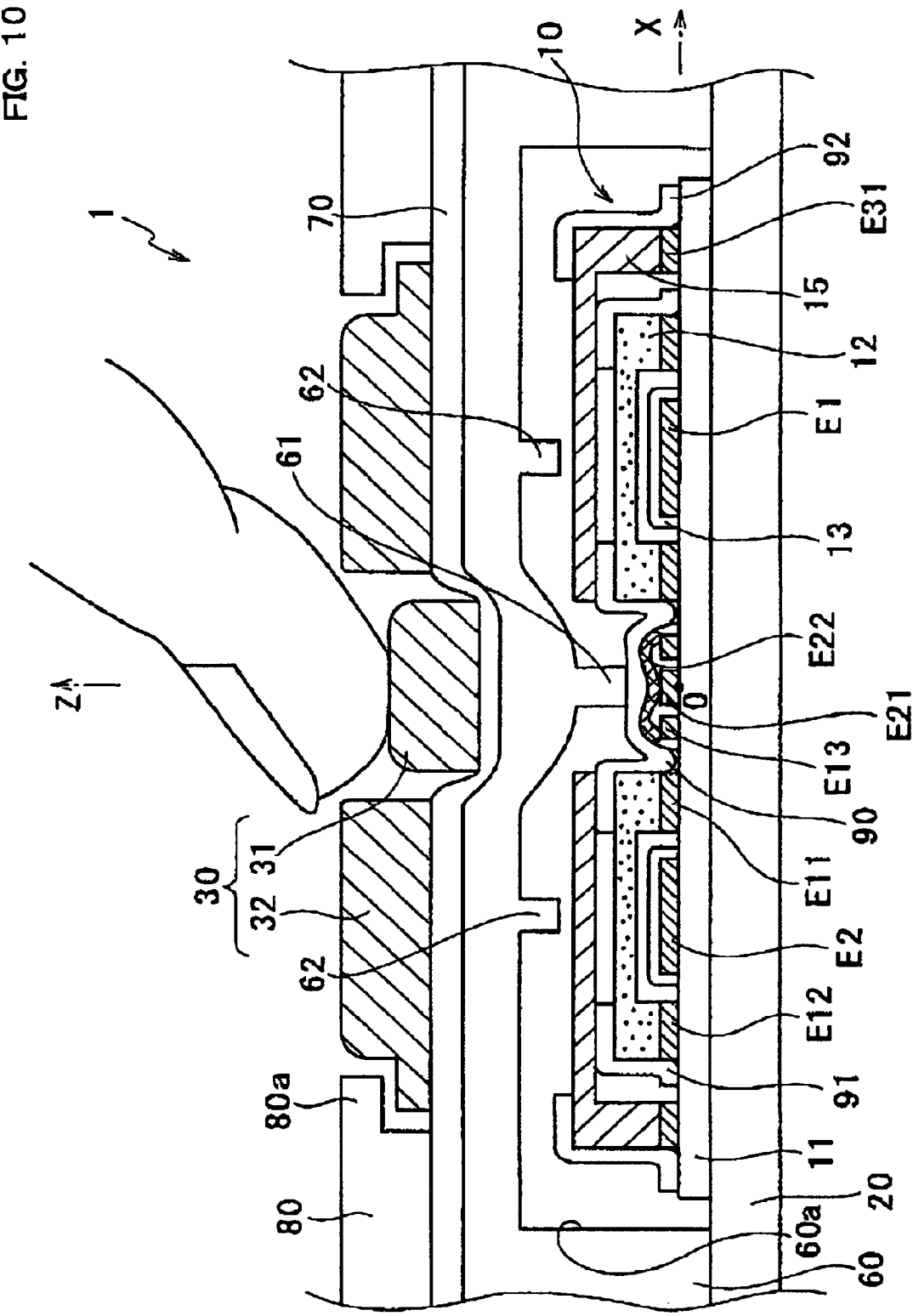
FIG. 10 is a cross sectional view showing a state that operated is a central button of the capacitance type sensor of FIG. 1.

Now explanation is made on the operation of the capacitance type sensor 1, with reference to FIGS. 9 and 10. FIG. 9 is a cross-sectional view showing a state that an X-axis positive direction part 32X of direction button 32 is operated in the capacitance type sensor 1 shown in FIG. 1. FIG. 10 is a cross-sectional view showing a state that a central button 31 is operated in the capacitance type sensor 1 shown in FIG. 1.

First considered is the case that a pushdown force in a Z-axis negative direction is applied to the X-axis positive direction part 32X of direction button 32 as shown in FIG. 9. In this case, by pushing down the X-axis positive direction part 32X, the resin sheet 70 and supporting member 60 arranged therebelow elastically deform and deflect, thereby downwardly displacing the projection 62 of supporting member 60 in a part toward the positive of X axis. Thus, the projection 62 at its tip abuts against the return-switch movable electrode 15, and a force in a Z-axis negative direction is applied to the return-switch movable electrode 15 at around the part thereof abutted against by the projection 62.

By this force, an elastic deformation and deflection are caused in the relevant region of return-switch movable electrode 15 and its vicinity. When pushed down a predetermined height, that part goes into contact the displacement electrode 12. This turns the return switch S1 from off to on.

Thereafter, in the case the X-axis positive direction part of the direction button 32 is further pushed down, the return-switch movable electrode 15 and displacement electrode 12 at around the relevant region displace down furthermore while the return switch S1 keeps on. This displacement reduces the spacing between the displacement electrode 12 at around the relevant region and the capacitance element electrode E1.

Incidentally, it is generally known that the capacitance value of a capacitance element is inversely proportional to the spacing between the electrodes configuring the capacitance element. Consequently, in the case the spacing between the displacement electrode 12 and the capacitance element electrode E1 is decreased by the above operation, increased is the capacitance value of a capacitance element C1 constituted between the displacement electrode 12 and the capacitance element electrode E1. When operating the X-axis positive direction part 32X of direction button 32, changed is a capacitance value only in the capacitance element C1 among the capacitance elements C1–C4.

Meanwhile, because at this time there is almost no change in the spacing between the displacement electrode 12 and each of the capacitance element electrodes E2–E4, the capacitance elements C2–C4 do not change in capacitance value. Incidentally, in the case the X-axis positive direction part 32X in the direction button 32 is operated, there is a possibility that the capacitance value of the capacitance element C2–C4 changes depending upon a positional relationship between that part 32X and the projection 62 of supporting member 60. However, the amount of that change is small as compared to the change amount of capacitance value of the capacitance element C1.

Now consideration is made on the case that the central button 31 is operated as shown in FIG. 10, i.e., a push force toward the substrate 20 is applied to the central button 31 (force in the Z-axis negative direction).

When the central button 31 is pushed down, the resin sheet 70 and supporting member 60 arranged therebelow elastically deform and deflect to displace down the projection 61 corresponding to the determining-switch fixed electrode E21 of the supporting member 60. When the projection 61 at its tip abuts against the resin sheet 90 on the surface of the determining-switch movable electrode E22, the determining-switch movable electrode E22 at around its summit is applied by a force in the Z-axis negative direction.

When the force in the Z-axis negative direction is less than a predetermined value, there is almost no displacement of the determining-switch movable electrode E22. However, when the force reaches a predetermined value, the determining-switch movable electrode E22 at around the summit abruptly goes into an elastic deformation with buckling. The determining-switch movable electrode E22 becomes a recessed state into contact with the determining-switch fixed electrode E21, thereby turning the determining switch S2 from off to on. At this time, a clear click feeling is conveyed to the operator.

Now explanation is made on one example of a method of deriving an output signal representative of a magnitude and direction of an external force onto the direction button 32 of detection button 30, with reference to FIGS. 11–14.

Figure 11:
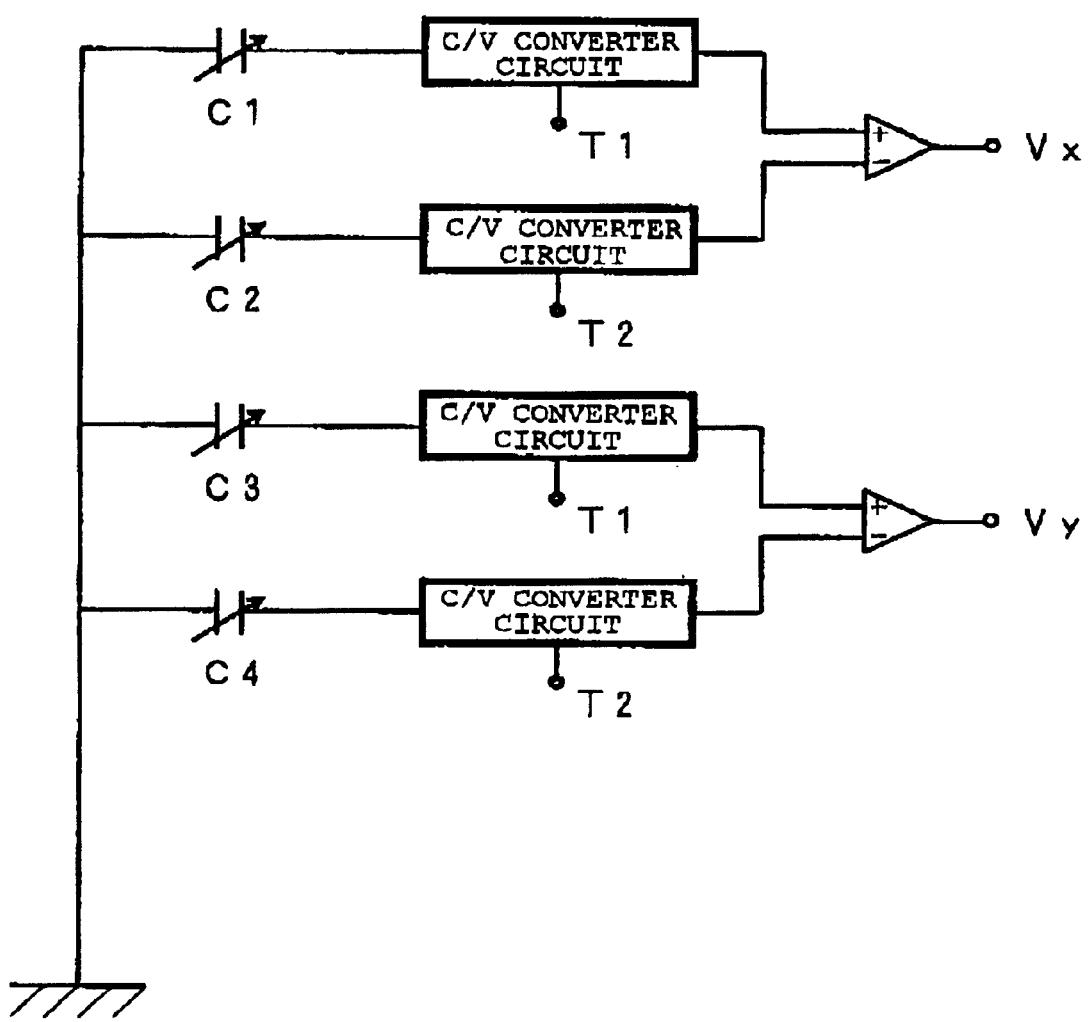
FIG. 11 is an explanatory view showing one example on a method of deriving an output signal in the capacitance type sensor of FIG. 1.

FIG. 11 is an explanatory diagram showing one example of a method of deriving output signals Vx, Vy from the capacitance type sensor 1. The output signals Vx, Vy are respectively in X-axial direction and Y-axial direction. Namely, the output signal Vx is to be derived based on a capacitance value of a capacitance element C1 constituted between the capacitance element electrode E1 positioned in the X-axis positive direction and the displacement electrode 12, and a capacitance value of a capacitance element C2 constituted between the capacitance element electrode E2 positioned in the X-axis negative direction and the displacement electrode 12. The output signal Vy is to be derived based on a capacitance value of a capacitance element C3 constituted between the capacitance element electrode E3 positioned in the Y-axis positive direction and the displacement electrode 12, and a capacitance value of a capacitance element C4 constituted between the capacitance element electrode E4 positioned in the Y-axis negative direction and the displacement electrode 12.

Each of the capacitance elements C1–C4 has one end grounded through the displacement electrode 12, as shown in FIG. 7. The other, output end is formed with a C/V converter circuit connected to any of terminals T1, T2. The C/V converter circuit comprises an exclusive-OR circuit and the like, to carry out an exclusive logic operation. Here, signal phase deviation is to be read out. The result derived by the C/V converter circuit is outputted as output signals Vx, Vy.

Figure 12:
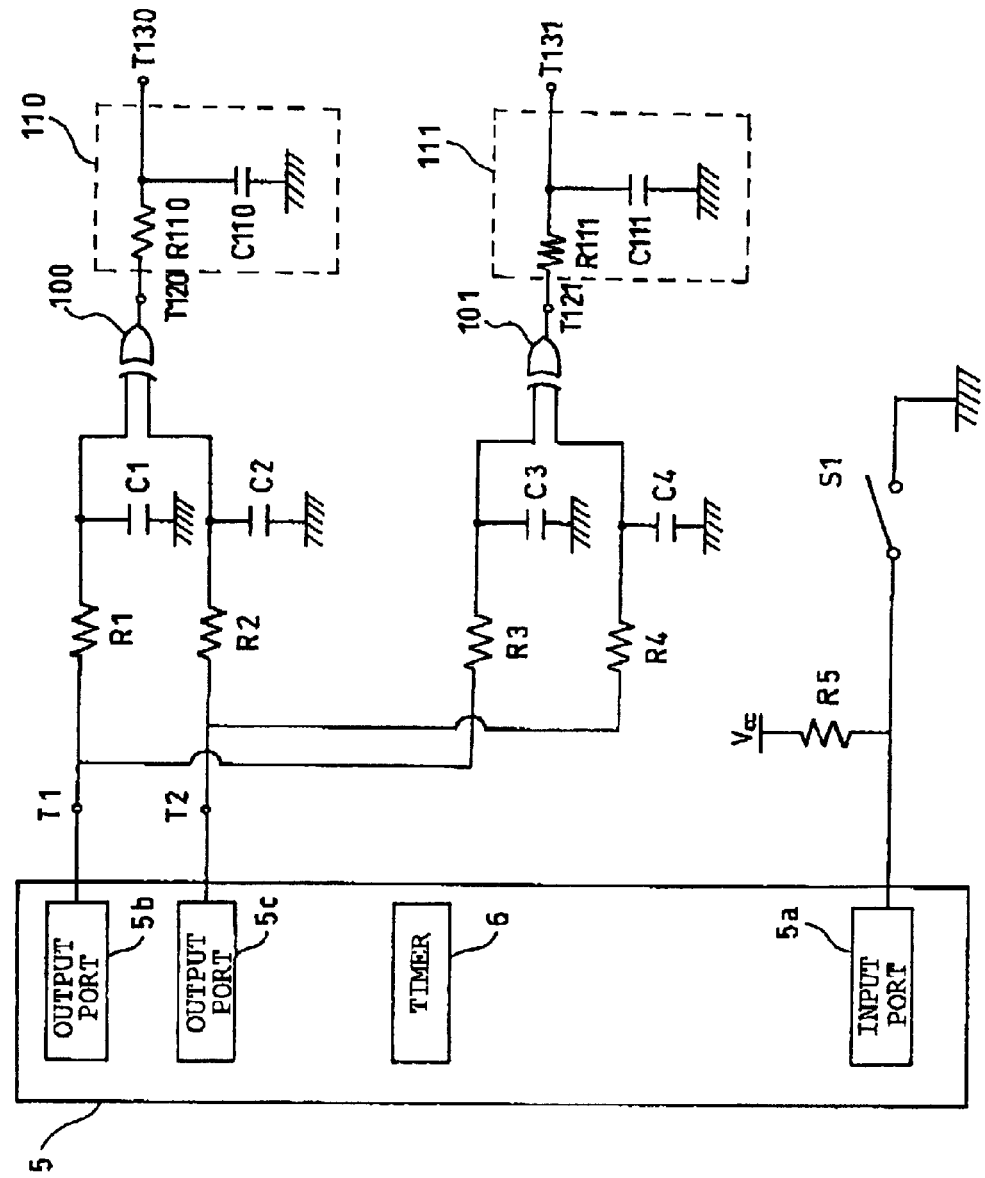
FIG. 12 is a circuit diagram showing a signal processing circuit of the capacitance type sensor of FIG. 1.

Furthermore, explanation is made in greater detail on a signal processing circuit for deriving output signals Vx, Vy, with reference to FIG. 12. Here, a microcomputer 5, provided on the substrate 20 of FIG. 1, has an input port 5a, output ports 5b, 5c and a timer 6.

The input port 5a is connected to the return-switch fixed electrode E31 thereby forming a return switch S1, and connected to the power voltage Vcc through a pull-up resistance element R5. The input port 5a is a digital input port. The input port 5a can only determine any one of a Hi-level at around the power voltage and a Lo-level at around the ground potential. The output ports 5b, 5c are respectively connected to the terminals T1, T2 coupled to the capacitance element electrodes E1–E4.

The timer 6 is to measure a lapse time from ending the immediately preceding operation to the detection button 30 in the usual mode. Namely, the timer 6 is started in operation simultaneously with turning of the return switch S1 from on to off, and stopped and reset when the direction button 30 is again operated. When ceased is the operation to the direction button 32 started at time t4 shown in FIG. 8, the timer 6 is again started for operation. Herein, it is assumed that previously set is the time (predetermined time) of up to automatic switching to the sleep mode in the case of no operation is made to the detection button 30 in the usual mode.

Note that, in the usual mode, the terminals T1, T2 are always fed with a cyclic signal, such as a clock signal at predetermined frequency from a cyclic signal oscillator (not shown).

When the return switch S1 is off as shown in FIG. 12, the input port 5a is maintained at a constant value of power voltage Vcc. In this state (sleep mode), no cyclic signal is supplied from the output ports 5b, 5c to the terminals T1, T2. Because there is no voltage variation on the terminals T1, T2, wasteful power consumption is suppressed.

When the return switch S1 turns on, the pull-up resistance element R5 and the input port 5a are grounded, a cyclic signal is supplied from the output ports 5b, 5c to the terminals T1, T2. Whether to supply a cyclic signal to the terminals T1, T2 or not (timing to supply a cyclic signal) is determined by the microcomputer 5. However, it is a general practice to supply a cyclic signal to the terminals T1, T2 nearly simultaneously with turning the return switch S1 from off to on.

The terminal T1 is connected with resistance elements R1, R3 while the terminal T2 is with resistance elements R2, R4. The output end of the resistance elements R1, R2 and the output end of the resistance elements R3, R4 are respectively connected with EX-OR elements 100, 101 as logic elements of exclusive-OR circuits (corresponding to the C/V converter circuit in FIG. 11), whose output ends are respectively connected to terminals T120, T121. Furthermore, the terminals T120, T121 are respectively connected with low-pass filters (smoothing circuits) 110, 111, whose output ends are respectively connected to terminals T130, T131.

Meanwhile, the other output ends of the resistance elements R1–R4 are respectively connected to the capacitance elements C1–C4 formed between the capacitance element electrodes E1–E4 and the displacement electrode 12 as shown in FIG. 7, Incidentally, of the two electrodes configuring the capacitance elements C1–C4, the electrode not connected to the resistance elements R1–R4, i.e., displacement electrode 12, is grounded through the reference electrodes E11, E12 as shown in FIG. 7.

As shown in FIG. 12, the low-pass filters 110, 111 are each configured by resistance elements R110, R111 and capacitance elements C110, C111, respectively. Of the two electrodes configuring the capacitance elements C110, C111, the electrode not connected to the resistance elements R110, R111 is grounded.

The output signals Vx, Vy outputted from the EX-OR elements 100, 101 are smoothened by being passed through the low-pass filters 110, 111, and then outputted as analog voltages Vx', Vy' to the terminals T130, T131. Namely, the low-pass filters 110, 111 are to convert the output signals Vx, Vy from the EX-OR elements 100, 101 into analog voltages Vx', Vy'.

More specifically, in the low-pass filters 110, 111, the capacitance value changes in the respective capacitance elements C1–C4 are detected as a duty ratio change in the waveform of output signals Vx, Vy, which duty ratio is converted into a voltage value. Accordingly, the values of analog voltages Vx', Vy' obtained from the low-pass filters 110, 111 vary in proportion to the duty ratio of the output signals Vx, Vy.

Figure 13:
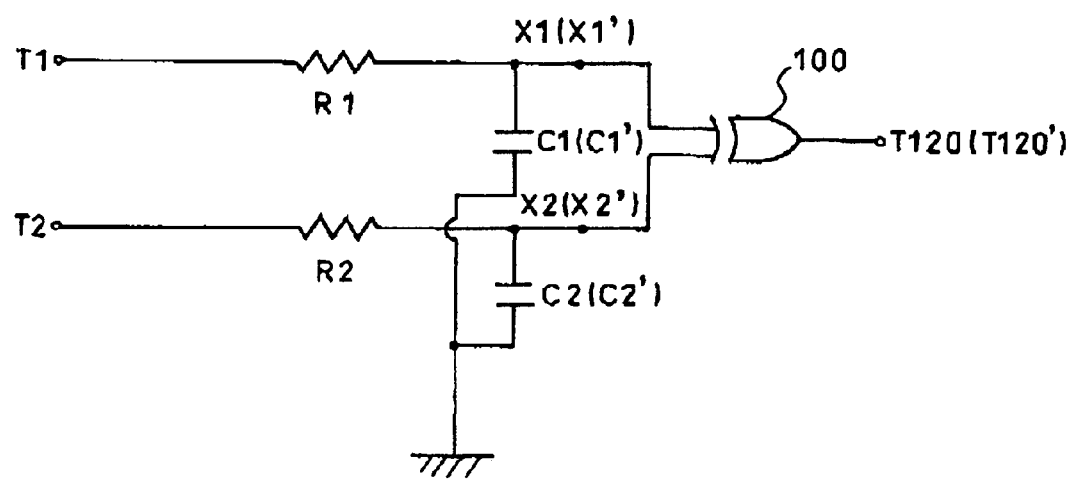
FIG. 13 is a circuit diagram fragmentally showing a signal processing circuit of X-axial component in FIG. 12.
Figure 14:
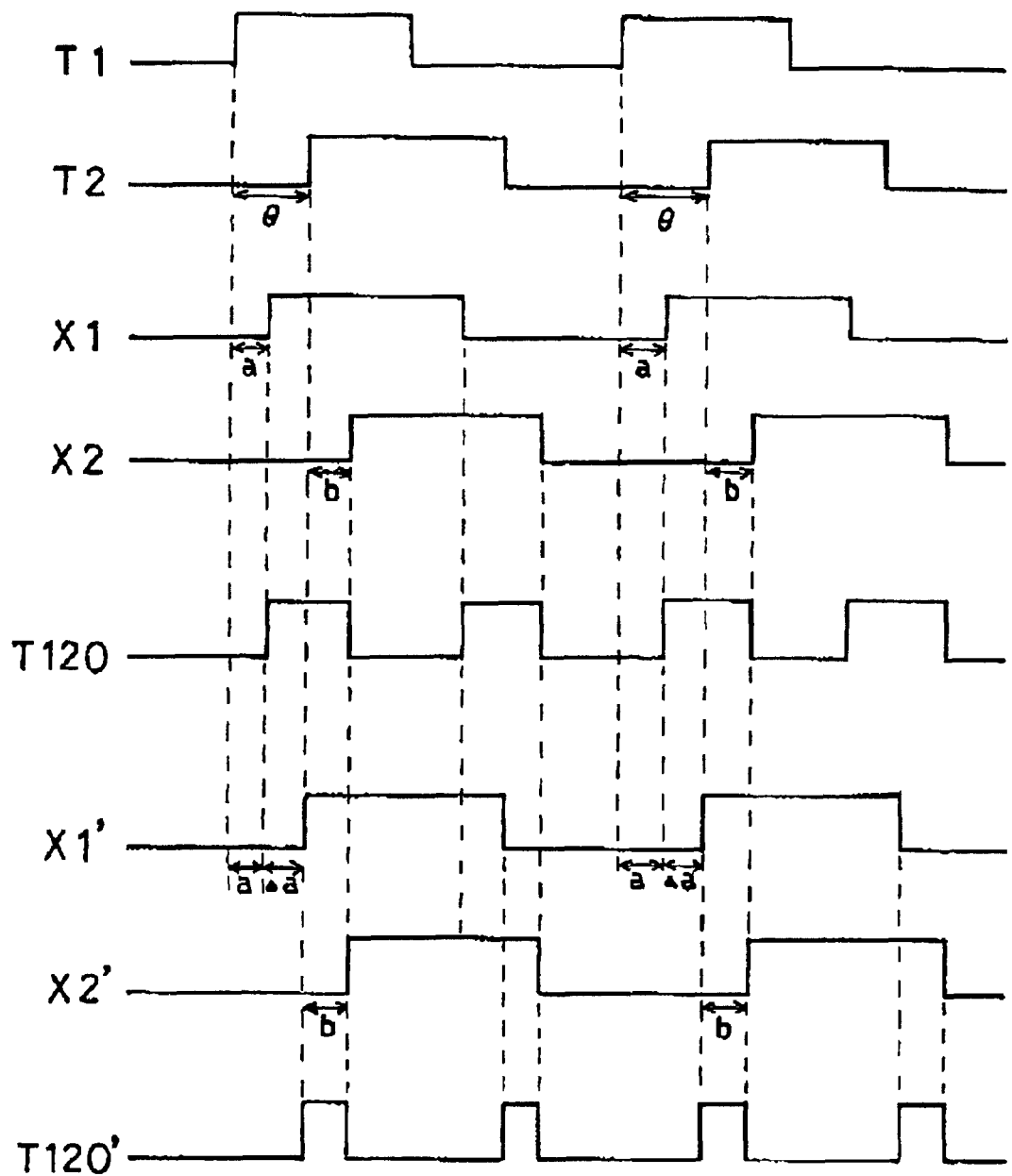
FIG. 14 is an explanatory chart showing a waveform of a cyclic signal at each terminal and node in the signal processing circuit of FIG. 13.

Now explanation is made on one example of a method of deriving an output signal Vx in an X-axial component, with reference to FIGS. 13 and 14. FIG. 13 is a fragmentary diagram on a signal processing circuit for X-axial component shown in FIG. 12. FIG. 14 is a chart showing a waveform of a cyclic signal at the terminal and nodes on the signal processing circuit shown in FIG. 13. In the signal processing circuit of FIG. 13, the capacitance element C1 and resistance element R1 and, the capacitance element C2 and resistance element R2 respectively form CR delay circuits.

It is herein assumed that, in the usual mode for example, a cyclic signal A (f($\phi$)) and a cyclic signal B (f($\phi+\theta$)), which is the same in period as but deviated by θ in phase from the cyclic signal A, are respectively inputted to the terminal T1 and the terminal T2 (see FIG. 14). The different-phased cyclic signals A (f(φ)), B (f(φ+θ)) are generated by separating a cyclic signal outputted from one cyclic signal oscillator into two routes wherein a not-shown CR delay circuit is provided on one route to thereby delay the phase in the cyclic signal passing the CR delay circuit.

The cyclic signal A (f(φ)) inputted to the terminal T1, as shown in FIG. 13, passes a CR delay circuit configured by a capacitance element C1 and a resistance element R1, to reach, a node X1. At this time, a delay of time-a is caused in the cyclic signal at the node X1, as shown in FIG. 14. Meanwhile, the cyclic signal B (f(φ+θ)) inputted to the terminal T2 is similarly has a delay of time-b caused upon passing a CR delay circuit configured by a capacitance element C2 and a resistance element R2 and reaching a node X2. The delay times a, b in the CR delay circuit are determined by each time constant of CR. In the case the resistance elements R1, R2 have the same resistance value, the values a, b are proportional to the capacitance value of the capacitance elements C1, C2.

The EX-OR element 100 is inputted by a signal having the same waveform as the cyclic signal at the nodes X1, X2. The phase deviation between the two signals inputted to the EX-OR element 100 is read out by exclusive logic operation. The signal obtained as a result is outputted as an output signal Vx onto the terminal T120. The signal outputted onto the terminal T120 is a rectangular wave signal having a predetermined duty ratio as shown in FIG. 14.

Herein, consideration is made on the waveform of a cyclic signal at each terminal and node in the case operation is made to the X-axis positive direction part 32X of direction button 32 as shown in FIG. 9. It is assumed that the capacitance elements constituted between the capacitance element electrodes E1, E2 and the displacement electrode 12 in the signal processing circuit in this case are C1', C2', and the nodes and terminal in the same position as the nodes X1, X2 and terminal T120 of the signal processing circuit when there is no operation to the direction button 32 are nodes X1', X2' and terminal T120' (see FIG. 13). At this time, in the signal processing circuit of FIG. 13, the terminals T1, T2 are respectively being inputted by a cyclic signal A (f(φ)) and a cyclic signal B (f(φ+θ)) that are similar to the above.

The cyclic signal A (f(φ)) inputted to the terminal T1 passes the CR delay circuit configured by a capacitance element C1' and a resistance element R1 and reaches a node X1'. At this time, a delay of time a+Δa is caused in the cyclic signal at the node X1', as shown in FIG. 14. The reason why a deviation (time Δa) occurs in signal phase between the case of no operation and the case of an operation is because of an increased time constant of the CR delay circuit by the increased capacitance value of the capacitance element C1' greater than that of the capacitance element C1.

Meanwhile, the cyclic signal B (f(φ+θ)) inputted to the terminal T2 passes the CR delay circuit configured by a capacitance element C2' and a resistance element R2 and reaches a node X2'. At this time, because no force is applied to the X-axis negative direction part of direction button 32, the cyclic signal at the node X2' has the same waveform as the cyclic signal at the node X2 no operation is made to the above-noted direction button 32.

Meanwhile, the EX-OR element 100 is inputted by a signal having the same waveform as the cyclic signal at the nodes X1', X2'. The phase deviation between the two signals inputted to the EX-OR element 100 is read out by exclusive logic operation. The signal obtained as a result is outputted onto the terminal T120'. The signal outputted onto the terminal T120' is a rectangular wave signal having a predetermined duty ratio as shown in FIG. 14.

Comparing the two signals of FIG. 14 outputted to the terminal T120 and to the terminal T120', it can be seen that the signal outputted to the terminal T120' in the case an operation is made to the direction button 32 is smaller in duty ratio than the signal outputted to the terminal T120 in the case no operation is made to the direction button 32. This is because the phase of the cyclic signal at the node X1' is deviated by a time Δa with respect to the phase of the cyclic signal at the node X1, as mentioned before.

In this manner, the obtained output signal Vx varies depending upon a presence and absence of an operation to the direction button 32. In the variation amount, the sign represents a direction of an X-axial component of an external force applied to the direction button 32 (positive direction or negative direction) while the absolute value represents a magnitude of the X-axial component of force.

The above is the case to derive output signal Vx of an X-axial component, it is also applicable for a case to derive output signal Vy of a Y-axial component. Incidentally, because there is almost no change in the spacing between the displacement electrode 12 and the capacitance element electrodes E2–E4 in the state shown in FIG. 9, the capacitance elements C2–C4 do not change in capacitance value. Thus, no phase deviation is caused by the passage through the delay circuit including the capacitance elements C2–C4.

According to the capacitance type sensor 1 of this embodiment, when the direction button 32 is operated, the displacement of the direction button 32 first causes the return-switch movable electrode 15 to displace into contact with the displacement electrode 12. Subsequently, the return-switch movable electrode 15 and the displacement electrode 12 displace while maintaining a contact thereof. Herein, the displacement electrode 12 is held at a ground potential through the reference electrodes E11, E12 while the return-switch movable electrode 15 is held at a potential different from the ground potential through the return-switch fixed electrode E31. Accordingly, in the course of a transit from a state the return-switch movable electrode 15 and the displacement electrode 12 are not in contact into a state of their contact, the output signal is switched from a Hi-level at around the potential the return-switch movable electrode 15 is held to a Lo-level at around the ground potential, or from the Lo-level to a Hi-level. Accordingly, when an operation is made, the output signal necessarily varies beyond a threshold voltage. By monitoring the output signal, it is possible to securely detect an operation to the direction button 32 of the capacitance type sensor 1. Due to this, when the direction button 32 is not operated for a predetermined time, switching is made to a sleep mode. When the operation is resumed, the sleep mode can be securely canceled. Therefore, the reduction of power consumption can be realized by suitably switching between the sleep and usual modes.

Figure 15:
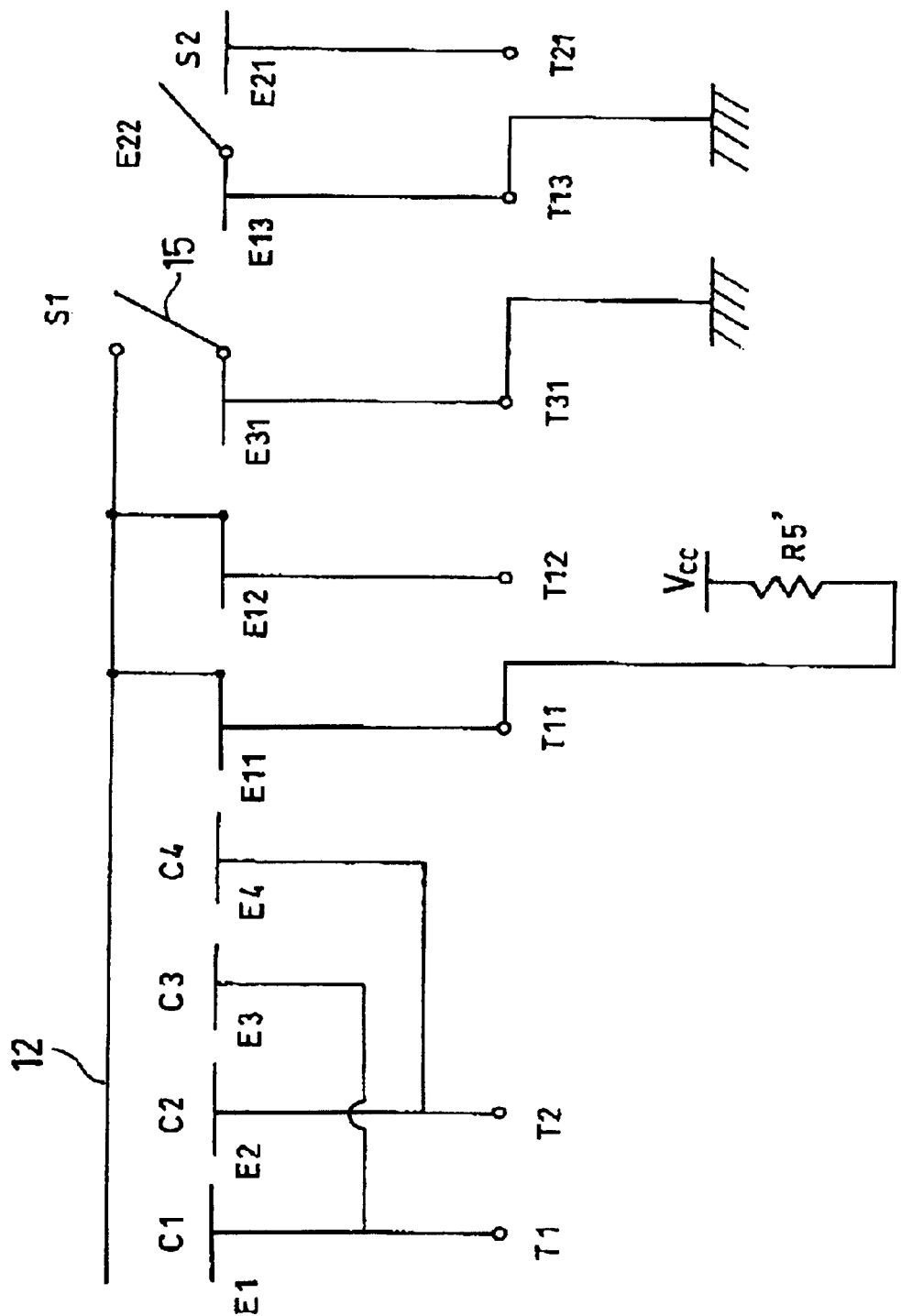
FIG. 15 is a circuit diagram showing a first modification to the equivalent circuit on the capacitance type sensor of rig. 1.

FIG. 15 shows a first modification to the equivalent circuit of the first embodiment. The difference between the equivalent circuit of FIG. 15 and the foregoing equivalent circuit of FIG. 7 lies in the following. Namely, in FIG. 7, the reference electrodes E11, E12 are grounded and the return-switch fixed electrode E31 is held at the power voltage Vcc through the pull-up resistance element R5 whereas, in FIG. 15, a reference electrode E11 is held at the power voltage Vcc through a pull-up resistance element R5', a reference electrode E12 is held in an insulation state and a return-switch fixed electrode E31 is grounded. The other configuration is similar to that shown in FIG. 7, hence omitting the detailed explanation thereof.

The terminal T11 connected to the reference electrode E11 is connected to the input port 5a of the microcomputer 5 of FIG. 12. In the case that no operation is made to the direction button 32, the displacement electrode 12 is assumably held at the power voltage Vcc.

Incidentally, although the reference electrode E11 in this modification is held at the power voltage Vcc, it is satisfactory that at least one of the reference electrodes E11, E12 is held at the power voltage Vcc.

In the case the capacitance type sensor 1 has an equivalent circuit of this modification, in the process of a transit from a state an operation is made to the direction button 32 and the return-switch movable electrode 15 and the displacement electrode 12 are not in contact to a state of their contact, the output signal necessarily varies beyond the threshold voltage similarly to the case having the equivalent circuit of FIG. 7. More specifically, in this modification, the output signal is switched from a Hi-level at around the potential the displacement electrode 12 is held to a Lo-level at around the ground potential, or from the Lo-level to a Hi-level. Accordingly, by monitoring the output signal, proper switching is available between the sleep and usual modes. This modification can obtain the effect of realizing the reduction of consumption power similarly to the foregoing embodiment having the equivalent circuit of FIG. 7.

Figure 16:
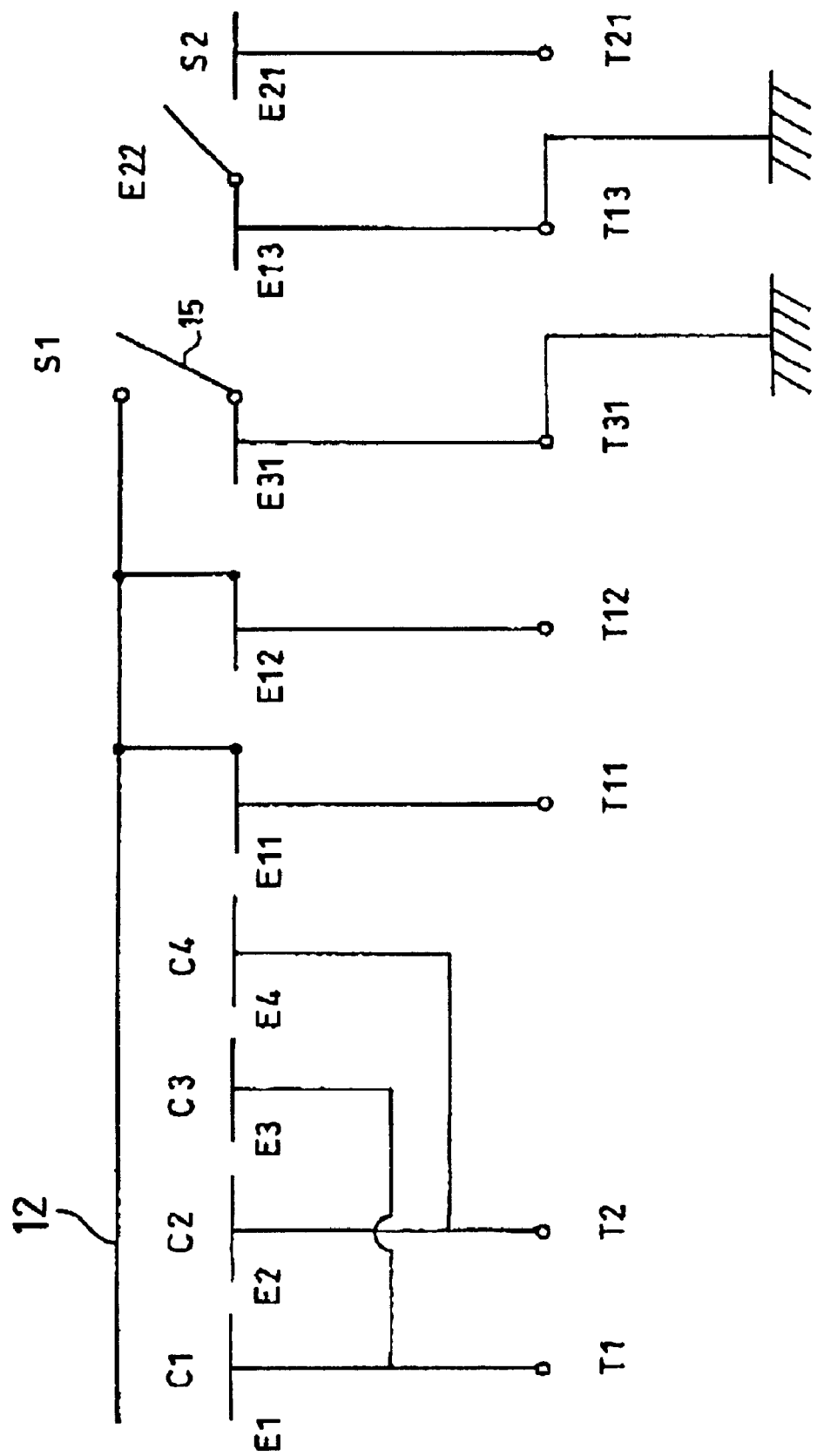
FIG. 16 is a circuit diagram showing a second modification to the equivalent circuit on the capacitance type sensor of FIG. 1.

FIG. 16 shows a second modification to the equivalent circuit of the first embodiment. The difference between the equivalent circuit of FIG. 16 and the foregoing equivalent circuit of FIG. 7 lies in the following. Namely, in FIG. 7, the reference electrodes E11, E12 are grounded and the return-switch fixed electrode E31 is held at the power voltage Vcc through the pull-up resistance element R5 whereas, in FIG. 16, reference electrodes E11, E12 are held in an insulation state and return-switch fixed electrode E31 is grounded. In addition, in the first modification, the reference electrode E11 is held at the power voltage Vcc whereas, in this modification, the two reference electrodes E11, E12 are both in an insulation state. This modification is similar, in respect of the other configuration, to those shown in FIGS. 7 and 15, and detailed explanation thereof is omitted.

Incidentally, in the equivalent circuit of this modification, the reference electrodes E11, E12 may be grounded and a non-conductive member (e.g. insulating film) be provided between the reference electrodes E11, E12 and the displacement electrode 12. In such a case, the displacement electrode 12 is to be held in an insulation state.

In this modification, when the return switch S1 is off, i.e., when the return-switch movable electrode 15 and the displacement electrode 12 are not in contact, the displacement electrode 12 is not connected to anywhere and hence kept in an insulated state (floated state) No voltage is applied to the capacitance elements C1–C4 formed between the displacement electrode 12 and the capacitance element electrodes E1–E4. Accordingly, the charge stored on the capacitance elements C1–C4 is negligibly small in amount, stabilizing the output signal at a constant level.

Meanwhile, in the case the direction button 32 is operated to turn on the return switch S1, i.e., when the displacement electrode 12 and the return-switch movable electrode 15 are placed into contact, the displacement electrode 12 has a ground potential thus applying a voltage to the capacitance elements C1–C4. At this time, the capacitance elements C1–C4 are allowed to store charges. Accordingly, in the course of a transit from a state the return-switch movable electrode 15 and the displacement electrode 12 are not in contact to a state of their contact, the charge to be stored on the capacitance elements C1–C4 abruptly varies in amount, to greatly vary the output signal correspondingly.

Herein, it can be considered that, even in the case the return-switch movable electrode 15 and/or the displacement electrode 12 somewhat deviate in position at around the operation, unless the return-switch movable electrode 15 and the displacement electrode 12 go into contact, the output signal of the capacitance type sensor 1 corresponding to the capacitance elements C1–C4 is almost the same. Due to this, in the case that the capacitance type sensor 1 has an equivalent circuit of this modification, it is possible to obtain the effect to reduce the hysteresis on the output signal corresponding to the capacitance elements C1–C4.

Figure 17:
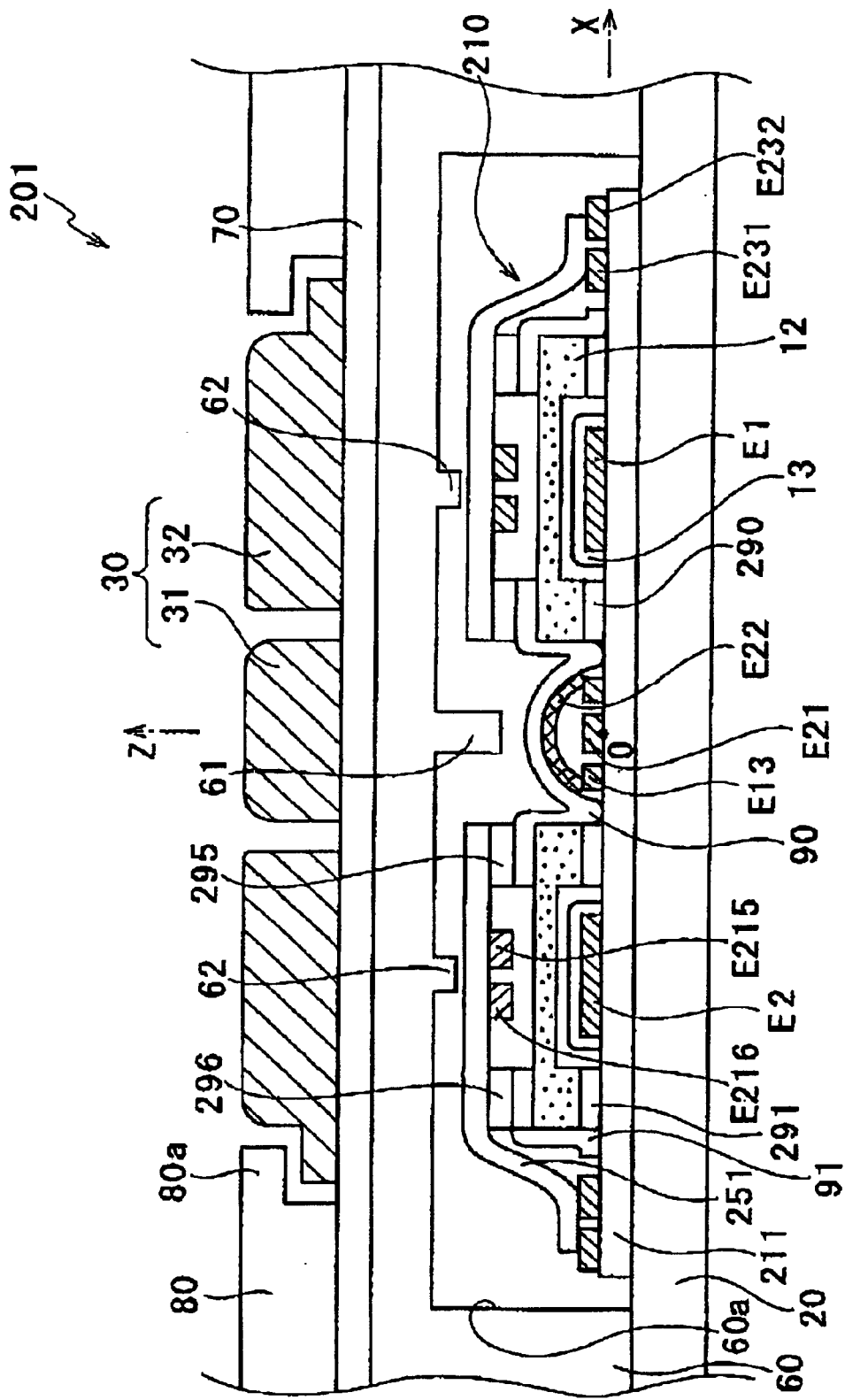
FIG. 17 is a cross sectional view showing a capacitance type sensor according to a second embodiment of the present invention.
Figure 18:
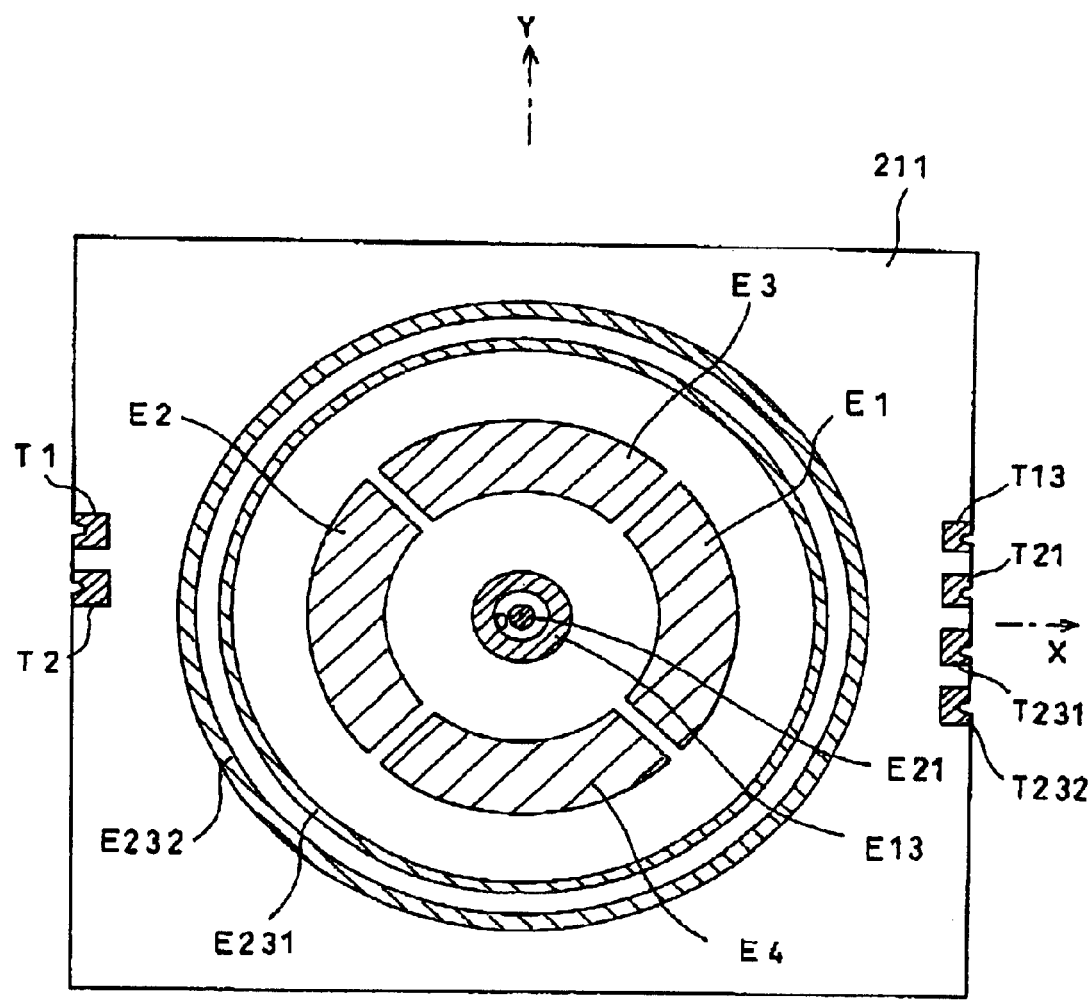
FIG. 18 is an arrangement view showing a plurality of electrodes formed on a first FPC of the capacitance type sensor of FIG. 17.
Figure 19:
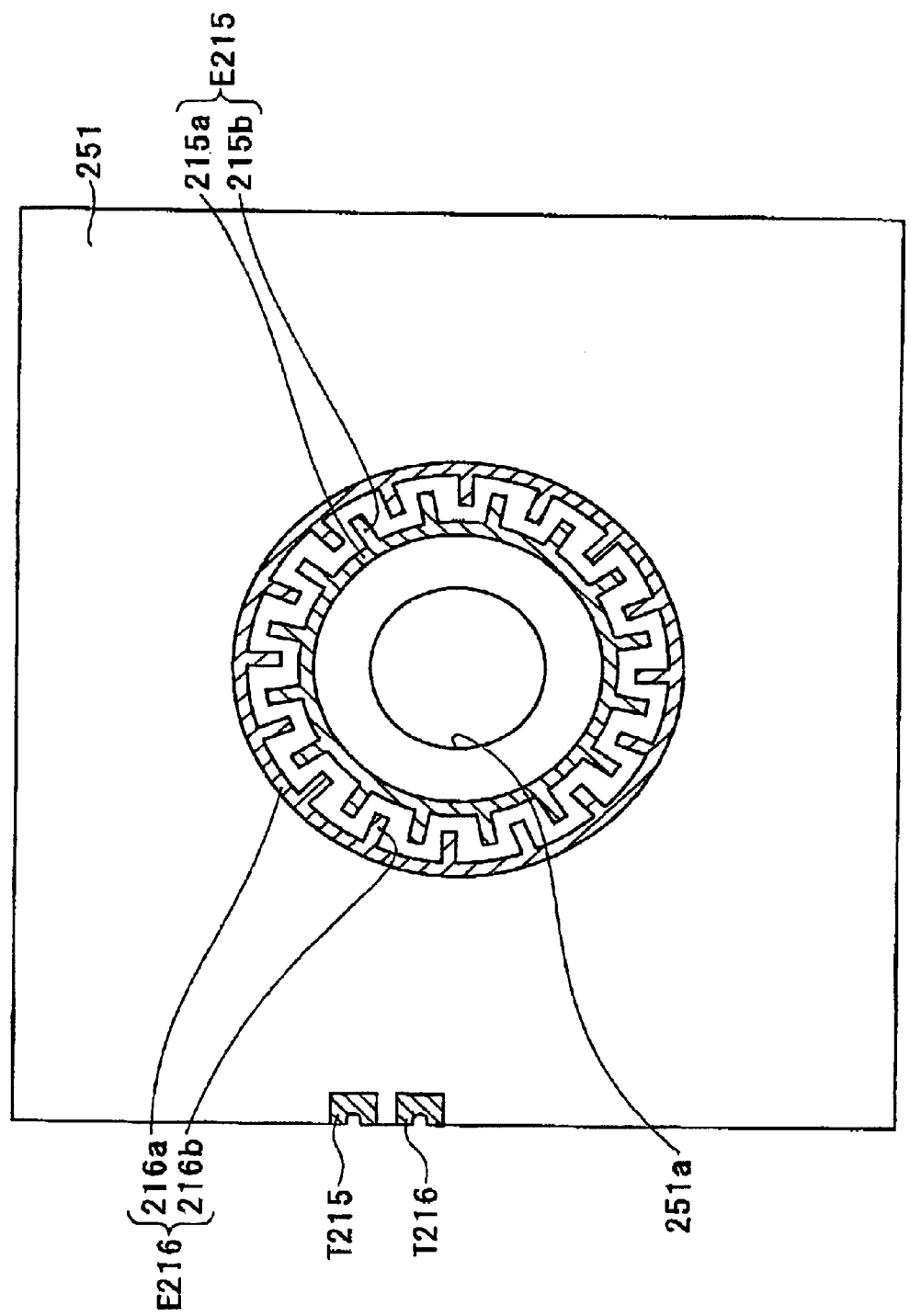
FIG. 19 is an arrangement view showing a plurality of electrodes formed on a second FPC of the capacitance type sensor of FIG. 17.

Now explanation is made on the structure of the capacitance type sensor 201 according to a second embodiment of the invention with reference to FIGS. 17 to 19.

FIG. 17 is a cross-sectional view of a capacitance type sensor according to this embodiment, being shown correspondingly to the first embodiment of FIG. 1. The difference in structure of the capacitance type sensor 201 of this embodiment from the capacitance type sensor 1 of the first embodiment of FIG. 1 lies in the following. Namely, the sensor unit 10 of the first embodiment has one return-switch movable electrode 15 whereas the sensor unit 210 of this embodiment has two return-switch movable electrodes E215, E216. Furthermore, the return-switch movable electrode 15 of the first embodiment is connected with the return-switch fixed electrode E31 whereas the two return-switch movable electrodes E215, E216 of this embodiment are respectively connected with separate return-switch fixed electrodes E231, E232. The other structure is nearly similar to that of the capacitance type sensor 1 of the first embodiment of FIG. 1, and omittedly explained in detail.

First explained is the structure of a sensor unit 210 included in the capacitance type sensor 201 of this embodiment. The sensor unit 210 has a first flexible printed-circuit substrate (first FPC) 211, a displacement electrode 12, capacitance element electrodes E1–E4 (only E1 and E2 shown in FIG. 17) formed on the first FPC 211, a reference electrode E13, a determining-switch fixed electrode E21, a determining-switch movable electrode E22, return-switch (wakeup-switch) fixed electrodes E231, E232, a second flexible printed-circuit substrate (second FPC) 251, return-switch movable electrodes E215, E216 formed on an underside of the second FPC 251 and an insulating film (resist film) 13 provided covering, in close contact with, the capacitance element electrodes E1–E4.

FIG. 18 shows an arrangement view of a plurality of electrodes formed on the first FPC 211. FIG. 19 shows an arrangement view of a plurality of electrodes formed on an underside of the second FPC 251, by vertically inverting the second FPC 251 of FIG. 17.

On the first FPC 211 generally rectangular shown in FIG. 18, there are provided a determining-button fixed electrode E21 in a circular form about an origin O, an annular reference electrode E13 arranged outer of the determining-button fixed electrode E21, capacitance element electrodes E1–E4 generally in a fan shape arranged outer of the reference electrode E13, an annular return-switch fixed electrodes E231 arranged outer of the capacitance element electrodes E1–E4, and an annular return-switch fixed electrode E232 arranged outer of the return-switch fixed electrode E231.

The first FPC 211 has four cutouts formed at around an X-axial positive end and two cutouts formed at around an X-axial negative end. At and around the cutouts, six terminals T1, T2, T13, T21, T231 and T232 are respectively provided that are structured by electrodes for use as connection lands. The capacitance element electrodes E1–E4, the reference electrode E13, the determining-switch fixed electrode E21 and the return-switch fixed electrodes E231, E232 are each connected to any of the terminals T1, T2, T13, T21, T231 and T232 through a lead wire (not shown) (see FIG. 20).

Meanwhile, the generally rectangular second FPC 251 shown in FIG. 19 has an opening 251a in the vicinity of a center thereof. In the underside of the second FPC 251, there are provided a return-switch movable electrode E215 configured by a circumferential part 215a in annular about its center and a plurality of projections 215b projecting outward from the circumferential part 215a and a return-switch movable electrode E216 configured by an annular circumferential part 216a arranged outer of the return-switch movable electrode E215 and a plurality of projections 216b projecting inward from the circumferential part 216a.

The respective circumferential parts 215a, 216a of the return-switch movable electrodes E215, E216 each have the same width throughout the entire periphery. The respective projecting parts 215b, 216b of the return-switch movable electrodes E215, E216 each have nearly the same width as the circumferential parts 215a, 216a and have a generally rectangular form shorter than the spacing between the circumferential part 215a and the circumferential part 216a. These are arranged alternately along the circumferential direction. In this manner, the return-switch movable electrode E215 at its outer periphery and the return-switch movable electrode E216 at its inner periphery are formed in respective comb forms. Incidentally, the projections 215b, 216b can be arbitrarily modified in the number and form. These are preferably arranged with a possible less spacing in a range not to contact each other.

Meanwhile, two cutouts are formed at around one end of the generally rectangular second FPC 251. At and around the cutouts, two terminals T215, T216 are respectively provided that are structured by electrodes for use as connection lands. The return-switch movable electrodes E215, E216 are respectively connected to the terminals T215, T216 by lead wires (not shown).

By integrally providing (as a unit) the first FPC 211 and second FPC 251 thus structured as shown in FIG. 17, structured is a sensor unit 210 according to this embodiment. More specifically, the first FPC 211 at its underside is bonded on the substrate 20 by an adhesive such that it is arranged within the recess 60a of the supporting member 60. In the above of the first FPC 211, a displacement electrode 12 is arranged which is similar to the displacement electrode 12 of the first embodiment shown in FIG. 5.

Incidentally, in this embodiment, adhesive materials 290, 291 are provided, instead of the reference electrodes E11, E12 shown in FIG. 1 in the first embodiment, between the respective ones of the convex part 12c formed in displacement electrode 12 close to the through-hole 12a and convex part 12d formed close to the outer periphery and the first FPC 211. These adhesive materials 290, 291 serve to fix the displacement electrode 12 on the first FPC 211 and adjust the gap between the capacitance electrodes E1–E4 and the bottom surface of the groove 12b of the displacement electrode 12.

Furthermore, resin sheets 90, 91 similar to those of the first embodiment of FIG. 1 are provided on the upper surface of the displacement electrode 12. On the upper surface or those, cover layers 295, 296 are provided. The cover layer 295 is an annular member having the same width and diameter as the convex part 12c of displacement electrode 12 formed close to the through-hole 12a while the cover layer 296 is an annular member having the same width and diameter as the convex part 12d of displacement electrode 12 formed close to the outer periphery. By arranging the cover layers 295, 296 correspondingly to the convex parts 12c, 12d of displacement electrode 12, a predetermined gap is formed between the return-switch movable electrodes E215, E216 provided on the underside of the second FPC 251 and the upper surface of the displacement electrode 12.

The second FPC 251 is arranged corresponding, at its opening 251a, to the through-hole 12a of displacement electrode 12 at above the first FPC 211 and covering over the entire upper surface of displacement electrode 12 and outer region thereof. Note that the second FPC 251 is provided with its underside having the return-switch movable electrodes E215, E216 shown in FIG. 19 positioned close to the first FPC 211.

The terminals T215, T216, at around the end of the second FPC 251 shown in FIG. 19 on the second FPC 251 thus arranged, are respectively connected to the return-switch fixed electrodes E231, E232 on the first FPC 211 by solder or conductive adhesive. This electrically connects between the return-switch movable electrode E215 and the return-switch fixed electrode E231 and between the return-switch movable electrode E216 and the return-switch fixed electrode E232.

On the substrate 20 in a region closer to the outer edge than the arrangement region of the sensor unit 210, a plurality of connection electrodes for use as connection lands are provided correspondingly to the respective terminals T1, T2, T13, T21, T231, T232 on the first FPC 211. Accordingly, the terminals T1, T2, T13, T21, T231, T232 on the first FPC 211, after arranging the sensor unit 210 on the substrate 20, are respectively electrically and mechanically connected to the corresponding connection electrodes through solder or conductive adhesive. In this manner, the capacitance element electrodes E1–E4, reference electrode E13, determining-switch fixed electrode E21 and return-switch fixed electrodes E231, E232 on the first FPC 211 are connected to the microcomputer 5 or the like provided on the substrate 20 through the respective terminals T1, T2, T13, T21, T231, T232.

Figure 20:
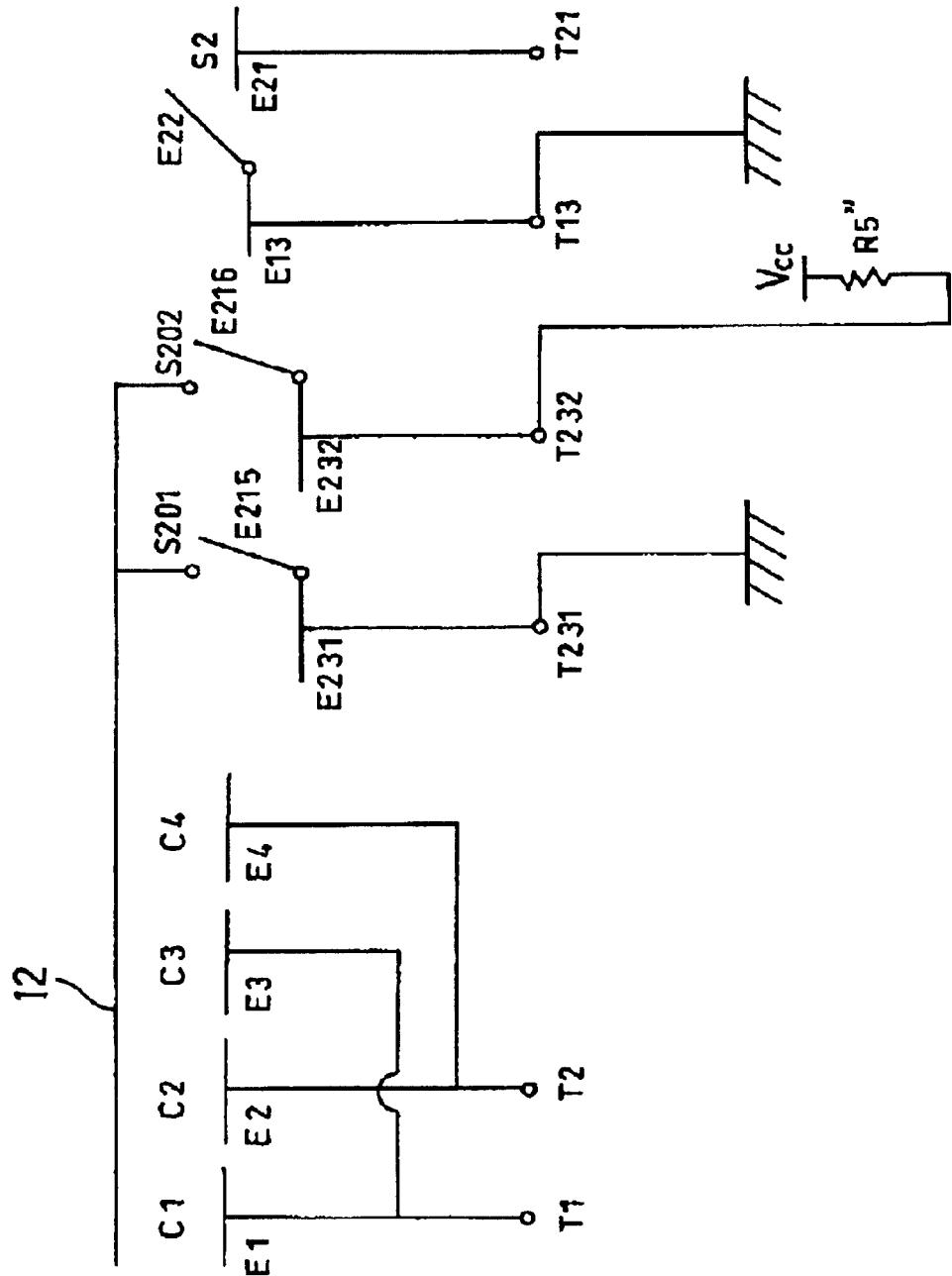
FIG. 20 is a circuit diagram showing an equivalent circuit on the capacitance type sensor of FIG. 17.

Now explanation is made on the circuit configuration of the capacitance type sensor 201 of this embodiment, with reference to FIG. 20.

In the capacitance type sensor 201 of this embodiment, capacitance elements C1–C4 are constituted between the displacement electrode 12 and the capacitance electrodes E1–E4 by the displacement electrode 12 as a displaceable common electrode and fixed, discrete capacitance electrodes E1–E4, respectively, similarly to the first embodiment shown in FIG. 7.

From the fact that the return-switch movable electrode E215 in contact with the return-switch fixed electrode E231 is to assume either a state contacted with the displacement electrode 12 (ON) or a state not contacted therewith (OFF), a return switch S201 is formed between the displacement electrode 12 and the return-switch fixed electrode E231. The return-switch fixed electrode E231 has the other end grounded through the terminal T231.

Meanwhile, from the fact that the return-switch movable electrode E216 in contact with the return-switch fixed electrode E232 is to assume either a state contacted with the displacement electrode 12 (ON) or a state not contacted therewith (OFF), a return switch S202 is formed between the displacement electrode 12 and the return-switch fixed electrode E232. Also, at the other end of the return-switch fixed electrode E232 configuring the return switch S202, connected is an input port 5a of microcomputer 5 held at the power voltage Vcc through a pull-up resistance element R5" that is similar to the one shown in FIG. 12. Consequently, in an off-state of the return switch S202, the input port 5a of microcomputer 5 and the return-switch fixed electrode E232 are maintained at the power voltage Vcc.

In this embodiment, when the direction button 32 is operated, the displacement electrode 12 contacts the return-switch movable electrodes E215, E216 nearly simultaneously because of the comb-formed provision of the return-switch movable electrodes E215, E216, as noted before. Accordingly, the return switches S201, S202 are always coincident in states, i.e., to take either the both on or the both off.

The respective capacitance values of the capacitance elements C1–C4 can be independently measured as capacitance values of between the terminal T1 or terminal T2 connected to the respective capacitance element electrodes E1–E4 and any of the terminal T231 connected to the return-switch fixed electrode E231 and the terminal T232 connected to the return-switch fixed electrode E232, in a state that the return-switch movable electrodes E215, E216 are in contact with the displacement electrode 12 (both return-switches S201 and S202 are on).

Incidentally, the reference electrode E13 is grounded through the terminal T13 and forms a determining switch S2 cooperatively with the determining-switch fixed electrode E21, similarly to the first embodiment.

Figure 21:
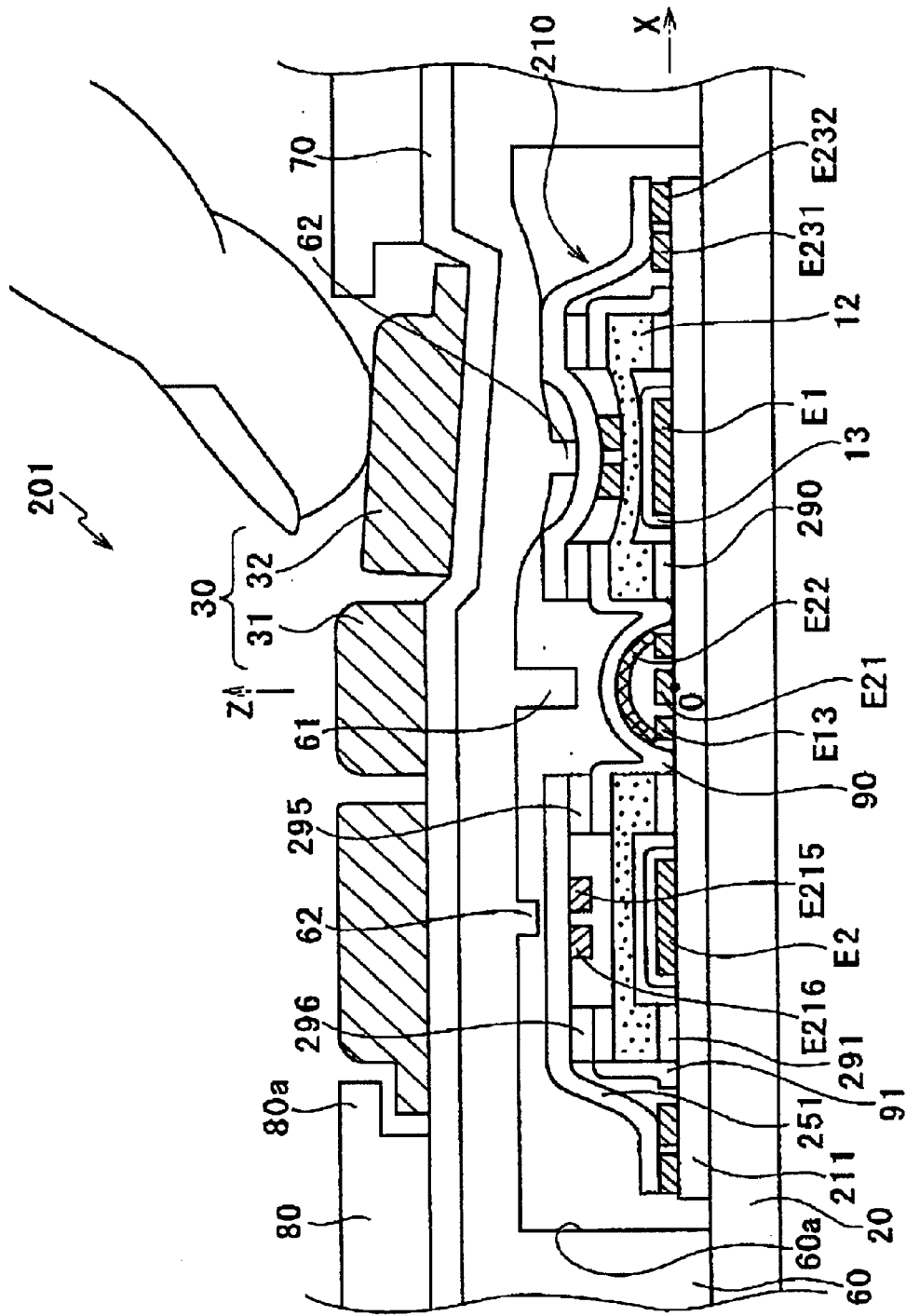
FIG. 21 is a cross sectional view showing a state that operated is the direction button at its X-axis positive direction part of the capacitance type sensor of FIG. 17.

Now explanation is made on the operation of the capacitance type sensor 201 of this embodiment, with reference to FIG. 21. FIG. 21 is a cross sectional view showing a state that operated is the X-axis positive direction part 32X of direction button on the capacitance type sensor of FIG. 17, which corresponds to FIG. 9 in the first embodiment.

When a push force is applied in the Z-axis negative direction to the X-axis positive direction part 32X of direction button 32, the X-axis positive direction part 32X is pushed down. This causes elastic deformation and deflection in the below-arranged resin sheet 70 and supporting member 60, thereby displacing downward the projection 62 of supporting member 60 in its X-axial positive part. The projection 62 at its tip abuts against the upper surface of the second FPC 251 and applies a force in a Z-axis negative direction to the second FPC 251 in a vicinity of a region abutted against by the projection 62.

Due to this, elastic deformation is caused with deflection in the relevant part of the second FPC 251, thereby pushing down the return-switch movable electrodes E215, E216 formed on the underside of the second FPC 251. When the return-switch movable electrodes E215, E216 are pushed down by a predetermined height, the two return-switch movable electrodes E215, E216 go into contact with the displacement electrode 12 nearly simultaneously. This switches the return switches S201, S202 nearly simultaneously from off to on.

Thereafter, in the case the X-axis positive direction part 32X of direction button 32 is pushed down furthermore, the return-switch movable electrodes E215, E216 and the displacement electrode 12 are further elastically deformed and deflected to displace downward while keeping the contact state thereof, i.e., while keeping the return switches S201, S202 on. This displacement reduces the spacing between the displacement electrode 12 in the vicinity of the relevant region and the capacitance element electrode E1. In the case that operated is only the X-axis positive direction part 32X of direction button 32 in this manner, changed is only the capacitance value of the capacitance element C1, of among the capacitance elements C1–C4, changed in the spacing between the displacement electrode 12 and, the capacitance element electrodes E1–E4.

At this time, the cyclic signal A (f($\phi$)), inputted to the terminal T1 connected to the capacitance element electrode E1 configuring the capacitance element C1, is caused by a phase deviation by passing through the delay circuit including the capacitance element C1. The phase deviation is read out in a manner similar to the first embodiment, whereby an output signal Vx is derived.

As described above, according to the capacitance sensor 201 of this embodiment, in the case the direction button 32 is operated, the two return-switch movable electrodes E215, E216 are first displaced by the displacement of the direction button 32 and placed into contact with the displacement electrode 12 nearly simultaneously. Subsequently, the return-switch movable electrodes E215, E216 and the displacement electrode 12 displace while keeping the contact state thereof. By varying the spacing between the displacement electrode 12 and the capacitance element electrodes E1–E4, the capacitance value of the capacitance elements C1–C4 is changed.

Herein, in the state the capacitance type sensor 201 is not operated, the return-switch movable electrode E215 is held at the ground potential through the return-switch fixed electrode E231 and the return-switch movable electrode 216 is held at the power voltage Vcc different from the ground potential through the return-switch fixed electrode E232. Due to this, in the course of a transit from a state the return-switch movable electrodes E215, E216 and the displacement electrode 12 are not in contact into a state of their contact, the output signals Vx, Vy are switched from a Hi-level at around the power voltage Vcc the return-switch movable electrode E216 is held to a Lo-level at around the ground potential, or from the Lo-level to a Hi-level, In this manner, the output signals Vx, Vy necessarily vary beyond the threshold voltage.

Namely, the capacitance type sensor 201 of this embodiment can securely detect an operation to the direction button 32 of the capacitance type sensor 201 by monitoring the output signals Vx, Vy, similarly to the foregoing first embodiment. This accordingly makes it possible to suitably carry out switching between the sleep mode and the usual mode. When no operation is made to the detection button 30 for a predetermined time, consumption power can be saved by a switching to the sleep mode.

Furthermore, according to the capacitance type sensor 201 of this embodiment, when the return switches S201, S202 are off, i.e., when the return-switch movable electrodes E215, E216 and the displacement electrode 12 are not in contact, the displacement electrode 12 is kept in an insulated state (floated state) without connected to anywhere. Thus, no voltage is applied to the capacitance elements C1–C4 constituted between the displacement electrode 12 and the capacitance element electrodes E1–E4. Accordingly, the charge stored on the capacitance elements C1–C4 is negligibly small in amount, stabilizing the output signal at a constant level.

Meanwhile, in the case the direction button 32 is operated to turn on the return switches S201, S202, i.e., in the case the return-switch movable electrodes E215, E216 and the displacement electrode 12 are placed into contact, the displacement electrode 12 is rendered at the ground potential through the terminal T231 shown in FIG. 20, to thereby apply a voltage to the capacitance elements C1–C4. Accordingly, in the course of a transit from a state the return-switch movable electrodes E215, E216 and the displacement electrode 12 are not in contact into a state of their contact, the charge stored on the capacitance elements C1–C4 abruptly varies in amount, to greatly vary the output signal correspondingly.

It can be considered that, even when the return-switch movable electrodes E215, E216 and/or the displacement electrode 12 somewhat deviate in position at around the operation, unless the return-switch movable electrode E215, E216 and the displacement electrode 12 go into contact, the output signal of the capacitance type sensor 201 corresponding to the capacitance elements C1–C4 is almost the same. This can reduce the hysteresis on the output signal of capacitance type sensor 201 corresponding to the capacitance elements C1–C4.

Figure 22:
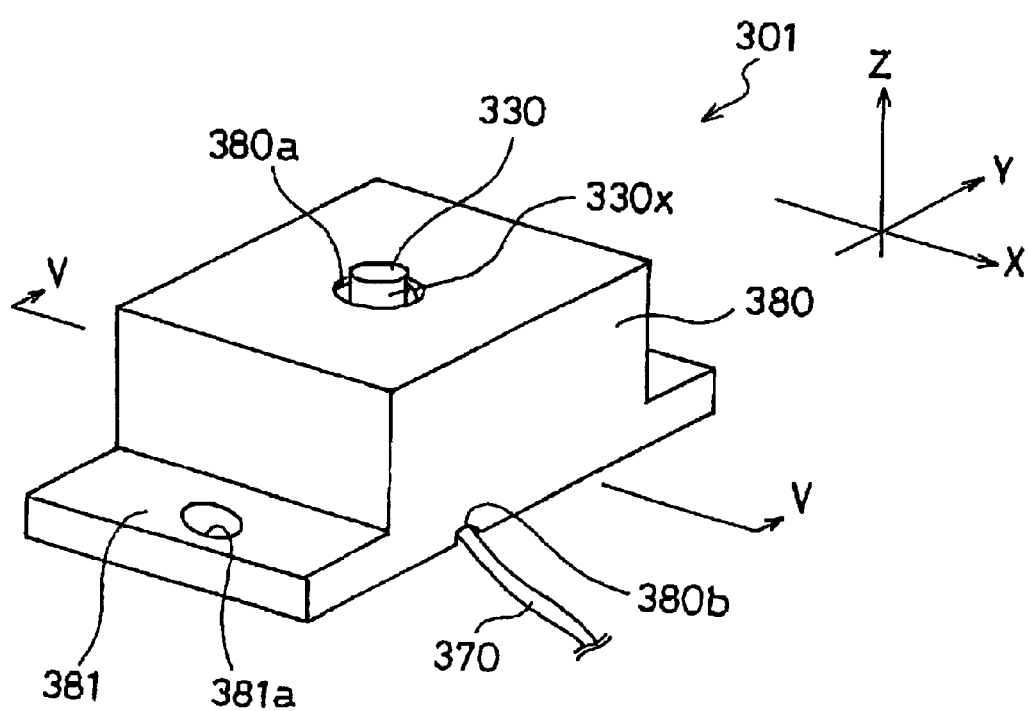
FIG. 22 is an external perspective view showing a capacitance type sensor according to a third embodiment of the invention.
Figure 23A:
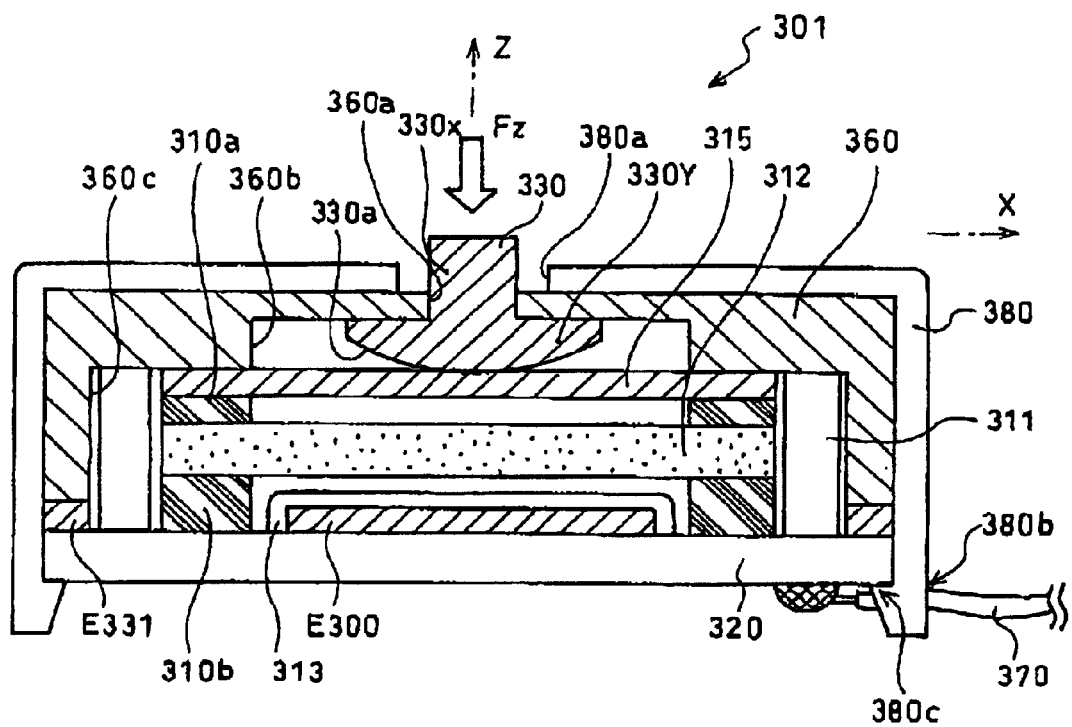
FIG. 23A is a cross sectional view on line V—V in the capacitance type sensor of FIG. 22.
Figure 23B:
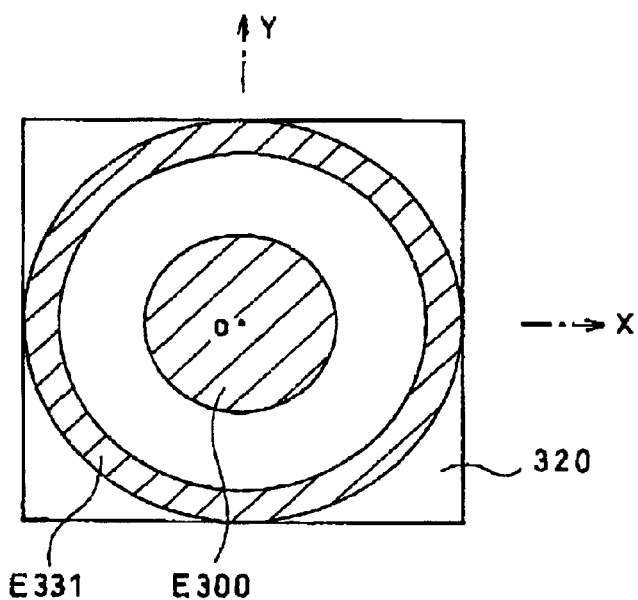
FIG. 23B is an arrangement view showing the electrodes on a substrate in the capacitance type sensor of FIG. 22.
Figure 24:
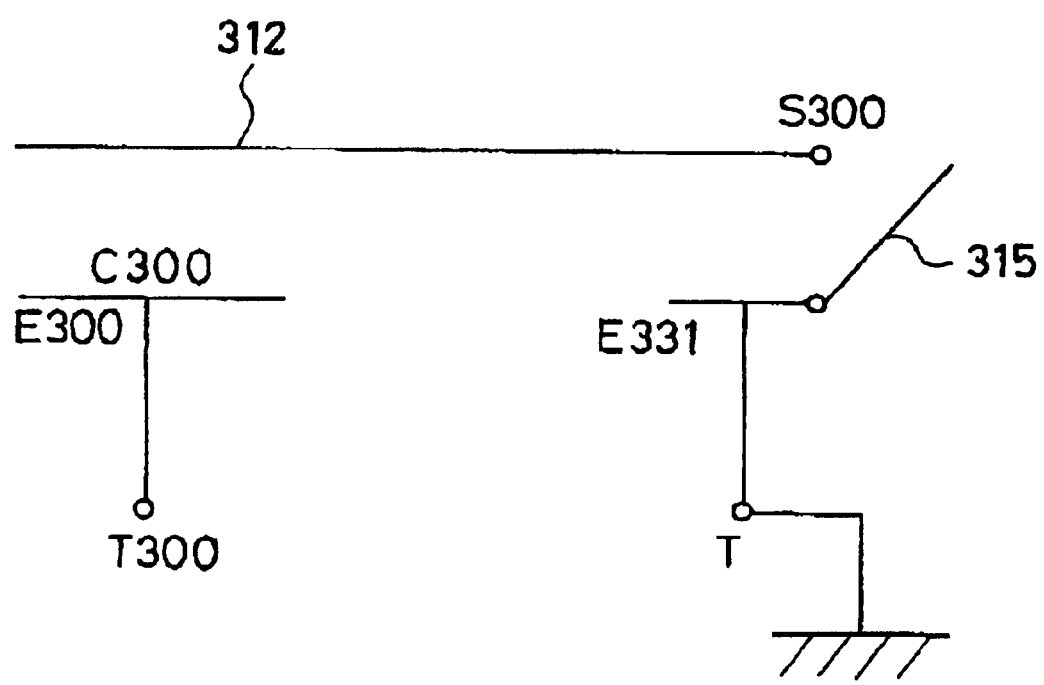
FIG. 24 is a circuit diagram showing an equivalent circuit on the capacitance type sensor of FIG. 22.

Now explanation is made on a capacitance type sensor according to a third embodiment of the invention, with reference to FIGS. 22, 23A, 23B and 24. FIG. 22 is an external perspective view of a capacitance type sensor 301 according to this embodiment, FIG. 23A is a cross-sectional view on line V—V of the capacitance type sensor 301 of FIG. 22, and FIG. 23B is an arrangement view showing the electrodes on a substrate of the capacitance type sensor 301 of FIG. 22. FIG. 24 is a circuit diagram showing an equivalent circuit concerning the capacitance type sensor 301 of FIG. 22.

Although the detection button 30 of the foregoing first and second embodiments is configured by a plurality of members, i.e., central button 31 and direction button 32, the detection button 330 in this embodiment is configured by a single member as suitably shown in FIG. 23A. The detection button 330 of this embodiment is accommodated, for play-fit, within a hollow housing of cover case 380, e.g., of resin. This has a projection 330X, hereinafter referred, projecting at only the summit and its vicinity through a center hole 380a formed in the cover case 380.

As shown in FIG. 22, the cover case 380 has fixing parts 381 having fixing holes 381a and protruding from the respective bottom ends with respect to the Y-axial direction, thus being structured for mounting on another member. The cover case 380 is formed with a cable hole 380b at a lower end of one side surface where the fixing part 381 is not extended. The cable 370 connected to the member within the case is drawn to the outside through the cable hole 380b.

Now explanation is made on the structure of the members accommodated in the cover case 380 and the equivalent circuit on the capacitance type sensor 301 of this embodiment, with reference to FIGS. 23A, 23B and 24.

As shown in FIG. 23A, the cover case 380 has a substrate 320 supported in a position closest to the bottom thereof not to be fallen toward the bottom by a pawl 380c of the cover case 380. The substrate 320 is arranged thereon with a capacity-element electrode E300 circular about an origin O and an annular fixed electrode E331 arranged outer of the capacitance element electrode E300, as shown in FIG. 23B. Beside these electrodes, on the substrate 320, arranged are an insulating spacer 310b and an insulating ring 311, e.g. of resin, both annular, between the capacitance element electrode E300 and the fixed electrode E331, as shown in FIG. 23A.

The insulating spacer 310b is formed higher than the capacitance element electrode E300 covered by an insulating film (resist film) 313, on which is provided a circular displacement electrode 312 having an outer diameter nearly equal to the outer diameter of the insulating spacer 310b in a manner spaced from the capacitance element electrode E300.

Between the displacement electrode 312 and the capacitance element electrode E300, configured is a variable capacitance element C300 having a capacitance value to vary resultingly from a displacement of the displacement electrode 312. The spacing between the displacement electrode 312 and the capacitance element electrode E300 narrows when the detection button 330 is pushed down and returns to the original state when the application force is released. Thus, the capacitance element C300 can be considered as a variable capacitance element configured to vary the capacitance value depending upon a displacement of the displacement electrode 312. Meanwhile, the capacitance element electrode 300E is connected to the terminal T300, thereby forming a delay circuit including the capacitance element C300.

Incidentally, because the capacitance element electrode E300 at its surface is covered with an insulating film (resist film) 313, the capacitance element electrode E300 and the displacement electrode 312, if contacted each other, are prevented from electrically short-circuiting. This can avoid the disadvantage of abnormal output in the capacitance type sensor 301.

On the displacement electrode 312, an insulating spacer 310a is provided oppositely to the insulating spacer 310b on the lower side, as shown in FIG. 23A. On the insulating spacer 310a, a circular movable electrode 315 having an outer diameter nearly equal to the outer diameter of the insulating spacer 310b is arranged spaced from the displacement electrode 312. The movable electrode 315, at its surface center, is contacted with a spherical bottom surface 330a of the detection button 330.

The detection button 330 is structured by a cylindrical projection 330X, to be acted upon by a force, having a summit projecting through the center hole 380a of the cover case 380 and a spherical seat 330Y including a spherical bottom surface 330a having a diameter greater than the projecting part 330X and contacted with the upper surface center of the movable electrode 315. The detection button 330 is supported, at its upper surface of the spherical seat 330Y and lower outer peripheral surface of the projection 330X, by a supporting member 360, e.g. of a silicone rubber having electrical conductivity.

The supporting member 360 is formed with a detection button hole 360a having a diameter nearly equal to the projection 33 of the detection button 330, a recess 360b communicated with the detection button hole 360a and having a depth nearly equal to the height of the spherical seat 330Y of the detection button 330 and a diameter nearly equal to the inner diameter of the insulating spacers 310a, 310b, and a recess 360c communicated with the recess 360b and having a depth subtracting a height of the fixed electrode E331 from the total height of the movable electrode 315, insulating spacer 310a, displacement electrode 312 and insulating spacer 310b and a diameter nearly equal to the inner diameter of the fixed electrode E331. The supporting member 360 is formed with a lower surface contacted with the fixed electrode E331 and an outer surface contacted with the inner surface of the cover case 380. Meanwhile, in the recess 360c of the supporting member 360, contact is provided between the bottom surface of the recess 360c, the upper surface of the insulating ring 311 and the upper surface periphery of the movable electrode 315.

By the supporting member 360 structured of an elastic material such as silicone rubber, the electrodes E300, E331, 312, 315, the insulating spacers 310a, 310b and the insulating ring 311 are held by pressure fit while the detection button 330 is held in a predetermined position while prevented from falling out of the cover case 380. Because the supporting member 360 is formed of an elastic material, the members can be compensated for dimensional error to a certain degree.

Incidentally, the reason why the detection button 330 is formed spherical in its bottom surface is because to concentrate the force acting on the detection button 330 to a center of the movable electrode 315 thereby stabilizing the output and improving the reproducibility.

Because the supporting member 360 has an electrical conductivity, the movable electrode 315 is electrically conductive with the fixed electrode E331 through the supporting member 360. Meanwhile, an insulating ring 311 is arranged between the supporting member 360 and the electrodes 312, 315 with respect to the X-axial direction shown in FIG. 23A, such that its upper and lower surfaces are in contact with the substrate 320 and supporting member 360. Thus, no electrical conduction is provided between the displacement electrode 312 and the supporting member 360.

In this embodiment, as shown in FIG. 24, the fixed electrode E331 is grounded and the movable electrode 315 is held at the ground potential through the supporting member 360 as mentioned above. A switch S300 is formed between the movable electrode 315 and the displacement electrode 312. In a state that the detection button 330 is not operated, the movable electrode 315 and the displacement electrode 312 are not in contact and hence the switch S300 is off. At this time, the displacement electrode 312 is not electrically connected to anywhere and hence kept in an insulated state (floated state). Even if a signal is provided to the capacitance element electrode E300, no voltage is applied to the capacitance elements C300 formed between the displacement electrode 312 and the capacitance element electrode E300. Accordingly, the charge stored on the capacitance element C300 is negligibly small in amount, stabilizing the output signal at a constant level.

Incidentally, in the usual mode, the terminal T300 is always inputted by a cyclic signal, such as a clock signal at a predetermined frequency, from a cyclic signal oscillator (not shown).

Now explanation is made on the operation of the capacitance type sensor 301 according to this embodiment. In the case the detection button 330 is applied by a force Fz in the Z-axis negative direction shown in FIG. 23A, the detection button 330 displaces in the Z-axis negative direction, to displace the movable electrode 315 goes into contact with the bottom surface 380a thereof. If the force Fz is equal to or greater than a predetermined magnitude Fo, the movable electrode 315 contacts the displacement electrode 312. At this time, the foregoing switch S300 turns on. In the case the switch S300 is on, the displacement electrode 312 having been in a floated state becomes a ground potential similarly to the movable electrode 315 and fixed electrode E331. Herein, in the case a signal is provided to the capacitance element electrode E300, charges are built up on the capacitance element C300.

In the case the force Fz increases furthermore, the displacement electrode 312 displaces in the Z-axis negative direction while maintaining the contact state with the movable electrode 315, wherein the capacitance element C300 configured with the capacitance element electrode E300 is increased in capacitance value. The capacitance value change is due to a magnitude change of the force Fz acted upon the detection button 330.

Now consideration is made on a method to derive an output signal by forming such C/V converter circuits as explained with reference to FIGS. 11–14 in the first embodiment, through utilizing capacitance element C300 of this embodiment. The present embodiment uses dummy, stable fixed capacitance elements besides the capacitance element C300. The C/V converter circuits are connected with the capacitance elements. Signals different in phase are inputted to the C/V converter circuits.

In the case the force Fz is in a value smaller than the predetermined value Fo, no charges are stored on the capacitance element C300. Phase deviation does not occur between the signals inputted to the C/V converter circuits. In this case, the output signal is determined by those having a constant value, such as dummy fixed capacitance element or fixed resistance, thus being maintained at a constant value Vo.

Meanwhile, when the force Fz becomes a value equal to or greater than the predetermined value Fo, the capacitance element C300 is allowed to store charges, resulting in a phase deviation caused between the signals inputted to the C/V converter circuits. By utilizing the signal phase deviation, it is possible to obtain a magnitude of the force Fz.

According to the capacitance type sensor 301 of this embodiment, when the detection button 330 is operated, the displacement of the detection button 330 first causes the movable electrode 315 to displace into contact with the displacement electrode 312. Subsequently, the movable electrode 315 and the displacement electrode 312 make a displacement while maintaining the contact state thereof. When the switch S300 is off, the displacement electrode 312 is held in an insulated state and the movable electrode 315 is held at the ground potential. At this time, because no voltage is applied to the capacitance element C300 constituted between the displacement electrode 312 and the capacitance element electrode E300, the amount of storage charge is negligibly small, stabilizing the output signal at a constant magnitude.

Meanwhile, when the detection button 330 is operated to turn on the switch S300, i.e., when the displacement electrode 312 is placed into contact with the movable electrode 315, the displacement electrode 312 has a ground potential, applying a voltage to the capacitance element C300. At this time, the capacitance element C300 is allowed to store charges. Consequently, in the course of a transit of the switch S300 from off to on, i.e., in the course of a transit from a state the movable electrode 315 is not in contact with the displacement electrode 312 into a state of contact thereof, the charge stored on the capacitance element C300 abruptly changes in amount, changing the output signal correspondingly.

Herein, even in the case the movable electrode 135 and/or displacement electrode 312 somewhat deviates in position at around the operation, it can be considered that the output signal of capacitance type sensor 301 corresponding to the capacitance element electrode E300 is nearly the same. Due to this, it is possible to obtain the effect to reduce the hysteresis on the output signal corresponding to the capacitance element C300.

Figure 25:
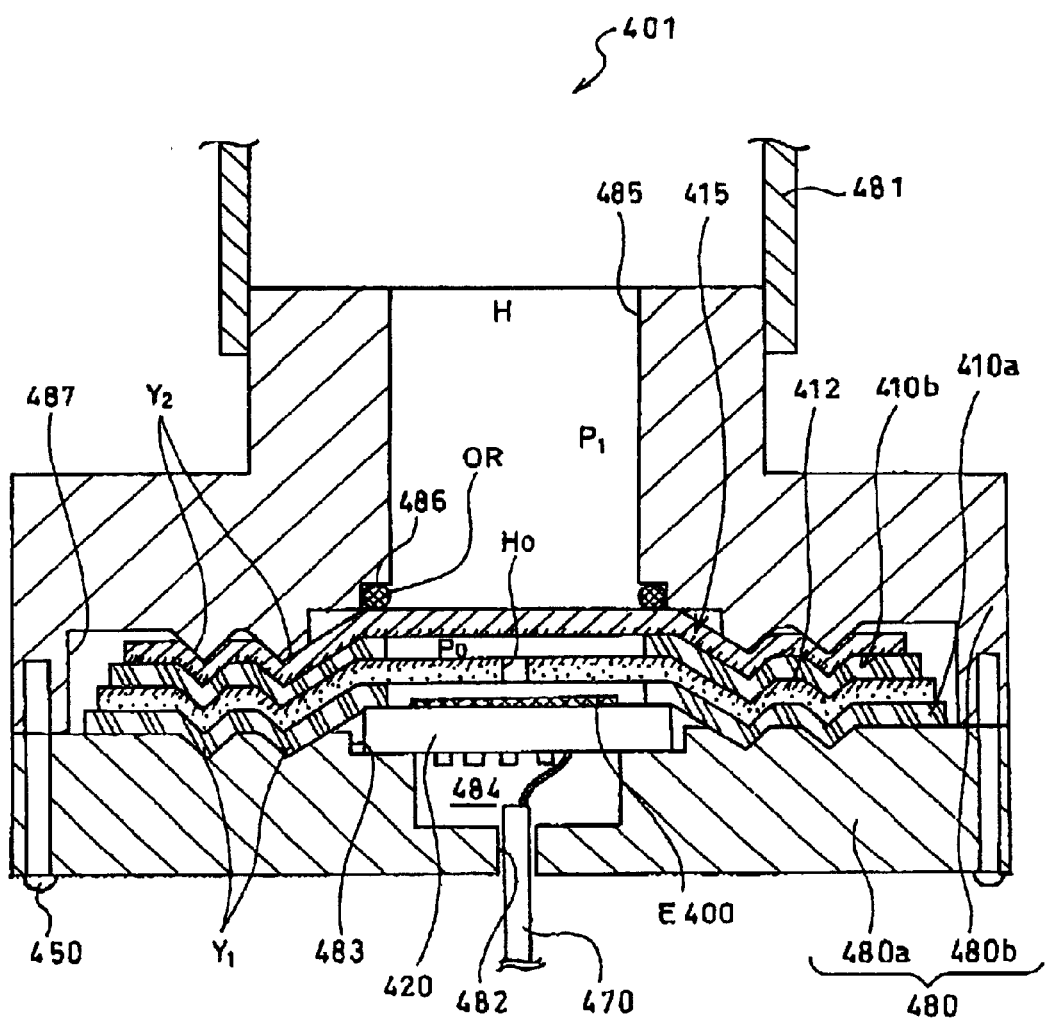
FIG. 25 is a cross sectional view showing a capacitance type sensor according to a fourth embodiment of the invention.

Now explanation is made on a capacitance type sensor of a fourth embodiment according to the invention, with reference to FIG. 25. The capacitance type sensor 401 of this embodiment is particularly suited as a pressure sensor.

The housing 480, hereinafter referred, formed e.g. of resin to accommodate the movable electrode 415, displacement electrode 412, capacitance element electrode E400 and the like, is structured by a lower housing 480a and an upper housing 480b. On a bottom center of the lower housing 480a, there are formed a step 483 for fitting a substrate 420 in a predetermined position, a recess 484 for accommodating the electronic parts, cables 470 and the like arranged on the lower surface of the substrate 420 in a position further lower than the step 483, and a cable hole 482 penetrated in a bottom of the lower housing 480a at a center of the recess 484. The cable 470 is extended to the outside through the cable hole 482. Two annular V-grooves Y1 are formed in the lower housing 480 in a position outer of the step 483.

Meanwhile, on a side of the upper housing 480b close to a contact with the lower housing 480a, formed is a recess 487 as a space to arrange the electrodes 415, 412 and the like including inverted-V projections Y2 corresponding to the V-grooves Y1 of the lower housing 480a. In the upper housing 480b in a region on a side opposite to the side contacting with the lower housing 480a with respect to the recess 487, formed are a step 486 for receiving an O-ring OR and a cylindrical cavity 485 communicating with the outside air. Meanwhile, the upper housing 480b, at a side in contact with the lower housing 480a, has an outer shape similar to the lower housing 480a. It, at a side opposite to that, i.e., at a side forming the cylindrical cavity 485, is reduced in diameter and fits with a tube 481.

The substrate 420, the electrodes 412, 415 and the like are arranged in the space formed between the lower housing 480a and the upper housing 480b as mentioned above. Now described is the procedure for arranging the substrate 420, the electrodes 412, 415 and so on.

At first, a substrate 420 on which a circular capacitance element electrode E400 is formed is arranged in the step 483 of the lower housing 480a. Then, an insulating spacer 410a in a film form formed, in a center, with a bore having an outer diameter greater than the capacitance element electrode E400 but smaller than the outer diameter of the substrate 420 is placed on the substrate 420 such that it is not contacted with the capacitance element electrode E400 but contacted on the substrate 420.

Then, a displacement electrode 412 formed for example by a vinyl or PET film and evaporated with a metal such as aluminum only on the hatched upper surface shown in FIG. 25 is arranged on the insulating spacer 410a. In this manner, because the displacement electrode 412 has an electric conductivity only in the upper surface thereof, the present embodiment is made in a structure the capacitance element electrode E400 at its surface is not covered by an insulating film (resist film) differently from the foregoing first to third embodiments.

The displacement electrode 412 is formed, at a center, with an air hole H0 quite small as compared to the outer diameter of the capacitance element electrode E400 so that the upper and lower spaces through the displacement electrode 412 have pressure kept generally equal. Although the air hole H0 in this embodiment is provided only one but it may be plurality in the number.

On the displacement electrode 412, an insulating spacer 410b similar to the foregoing insulating spacer 410a is arranged oppositely to it through the displacement electrode 412. On the insulating spacer 410b, arranged is a movable electrode 415 similar to the displacement electrode 412 formed for example by a vinyl or PET film and evaporated with a metal such as aluminum only at the hatched lower surface shown in FIG. 25.

After arranging the substrate 420, the electrodes 412, 415 and the like on the lower housing 480a, an O-ring OR is fit in the step 486 of the upper housing 480b. The upper housing 480b and the lower housing 480b are tightened together by screws 450. By thus tightening the upper housing 480b and the lower housing 480a by screws 450, the V-grooves Y1 and inverted-V projections Y2 formed on the housings 480a, 480b are neared in a fitting manner. At this time, the film-formed movable electrode 415, displacement electrode 412 and insulating spacers 410a, 410b arranged between them are provided with a suitable tensile force outward while being deformed into a V-form similar to the V-groove Y1 and inverted-V projection Y2, Incidentally, the upper and lower housings 480a, 480b may be tightened by thermal fusion after assembled by inserting a boss provided on either one of them to the other, instead of tightening by the screws 450. Besides, various methods may be employed, e.g. forming a pawl in either the upper or lower housings 480a, 480b and engaging the pawl with the other thereby carrying out assembling.

The O-ring OR is crushed between the step 486 and the movable electrode 415 by tightening the both housings 480a, 480b, and placed into close contact with them. This has a function to prevent the gas or liquid intruded through the pressure introducing hole H formed on a side fitting with the tube 481 from passing a gap between the upper housing 480b and the movable electrode 415.

In this embodiment, the movable electrode 415 is grounded and the displacement electrode 412 is not electrically connected to anywhere and hence in an insulated state (floated state), Meanwhile, similarly to the first to third embodiments, the capacity-element electrode E400 in the usual mode is assumably inputted, at all times, by a cyclic signal, such as a clock signal at a predetermined frequency, from the cyclic signal oscillator (not shown).

Now explanation is made on the operation of the capacitance type sensor 401 according to this embodiment. It is first assumed that P1 is the pressure, on the movable electrode 415 at a side close to the pressure introducing hole H, varying due to the intrusion of a gas or liquid through the pressure introducing hole H. The space formed between the movable electrode 415 and the displacement electrode 412 communicates with the outside air through a not-shown hole, being at a pressure nearly equal to the atmospheric pressure P0. Meanwhile, because the displacement electrode 412 is formed with the air hole H0, the space formed between the displacement electrode 412 and the substrate 420 is at a pressure nearly equal to the atmospheric pressure P0, similarly to the space formed between the movable electrode 415 and the displacement electrode 412.

It is herein assumed that the pressure P1 at the side of the pressure introducing hole H, when the movable electrode 415 and the displacement electrode are contacted, has a value Pa (>P0). When P1 is lower than Pa, the movable electrode 415 and the displacement electrode 412 do not go into contact. In the case a signal is provided to the capacitance element electrode E400, no voltage is applied. At this time, the charge stored on the capacitance element constituted between the capacitance element electrode E400 and the displacement electrode 412 is negligibly small in amount, stabilizing the output signal at a constant level.

When the pressure P1 at the side of pressure introducing hole H reaches a predetermined value Pa, the both electrodes 415, 412 go into contact, i.e., the both electrodes 415, 412 are placed in contact at their conductive surfaces. The displacement electrode 412, having been in an insulated state (floated state), has a ground potential similar to the potential of the movable electrode 415. At this time, voltage becomes applied to the capacitance element constituted between the displacement electrode 412 and the capacitance element electrode E400, enabling charge storage.

When further increased is the pressure P1 at the side close to the pressure introducing hole H, the both electrodes 415, 412 displace downward while maintaining the contact state thereof and the capacitance element constituted by the displacement electrode 412 and the capacitance element electrode E400 increases in capacitance value. The capacitance value change results from a change of the pressure P1 at the side close to the pressure introducing hole H. By obtaining the capacitance value change as a signal phase deviation similarly to the foregoing third embodiment, the pressure P1 can be measured.

As described above, according to the capacitance type sensor 401 of this embodiment, the movable electrode 415 under pressure is displaced into contact with the displacement electrode 412 and thereafter the both electrodes 415, 412 make a displacement while maintaining the contact state thereof. In the course of a transit from a state the movable electrode 415 and the displacement electrode 412 are not in contact into a state of contact thereof, there is a change from a state the capacitance element is not applied by a voltage not to store charge into a state a voltage is applied to store charge. The amount of charge abruptly changes to greatly change the output signal. Accordingly, even in the case the movable electrode 415 and/or the displacement electrode 412 somewhat deviates in position at around the operation, unless there is no contact between the movable electrode 415 and the displacement electrode 412, the output signal corresponding to the capacitance element constituted between the displacement electrode 412 and the capacitance element electrode E400 can be considered almost the same. Namely, the capacitance type sensor 401 of this embodiment can obtain an effect to reduce the hysteresis on the output signal.

Meanwhile, the amount of the charge to be stored on the capacitance element during non-contact between the movable electrode 415 and the displacement electrode 412 is negligibly small as compared to the amount of charge to be stored during contact between the both. Accordingly, the capacitance type sensor 401 of this embodiment can be used as a pressure sensor quite small in hysteresis that measurement is possible only when the pressure P1 at the side close to the pressure introducing hole H is equal to or greater than a certain value.

By structuring both the movable electrode 415 and displacement electrode 412 by a film that is ready to displace upon being applied by a comparatively small force, the use as a pressure sensor is possible as in this embodiment.

Because the displacement electrode 412 is formed with an air hole H0, almost no pressure difference is caused in between the both spaces separated through the displacement electrode 412. Accordingly, it is possible to prevent the displacement electrode 412 from displacing, and hence the capacitive value from changing, under the influence of the pressure other than the pressure to be measured.

Furthermore, the movable electrode 415 and displacement electrode 412, in a region not opposed to the capacitance element electrode E400, are deformed by the V-grooves Y1 and inverted-V projections Y2 formed on the housing 480, thereby being given by a tensile force. De to this, there is no possibility that the movable electrode 415 and displacement electrode 412 formed by a film deform to lower measuring accuracy. Thus, favorable measuring accuracy can be exhibited.

Now explanation is made on a capacitance type sensor 501 according to a fifth embodiment of the invention, with reference to FIGS. 26–34.

Figure 26:
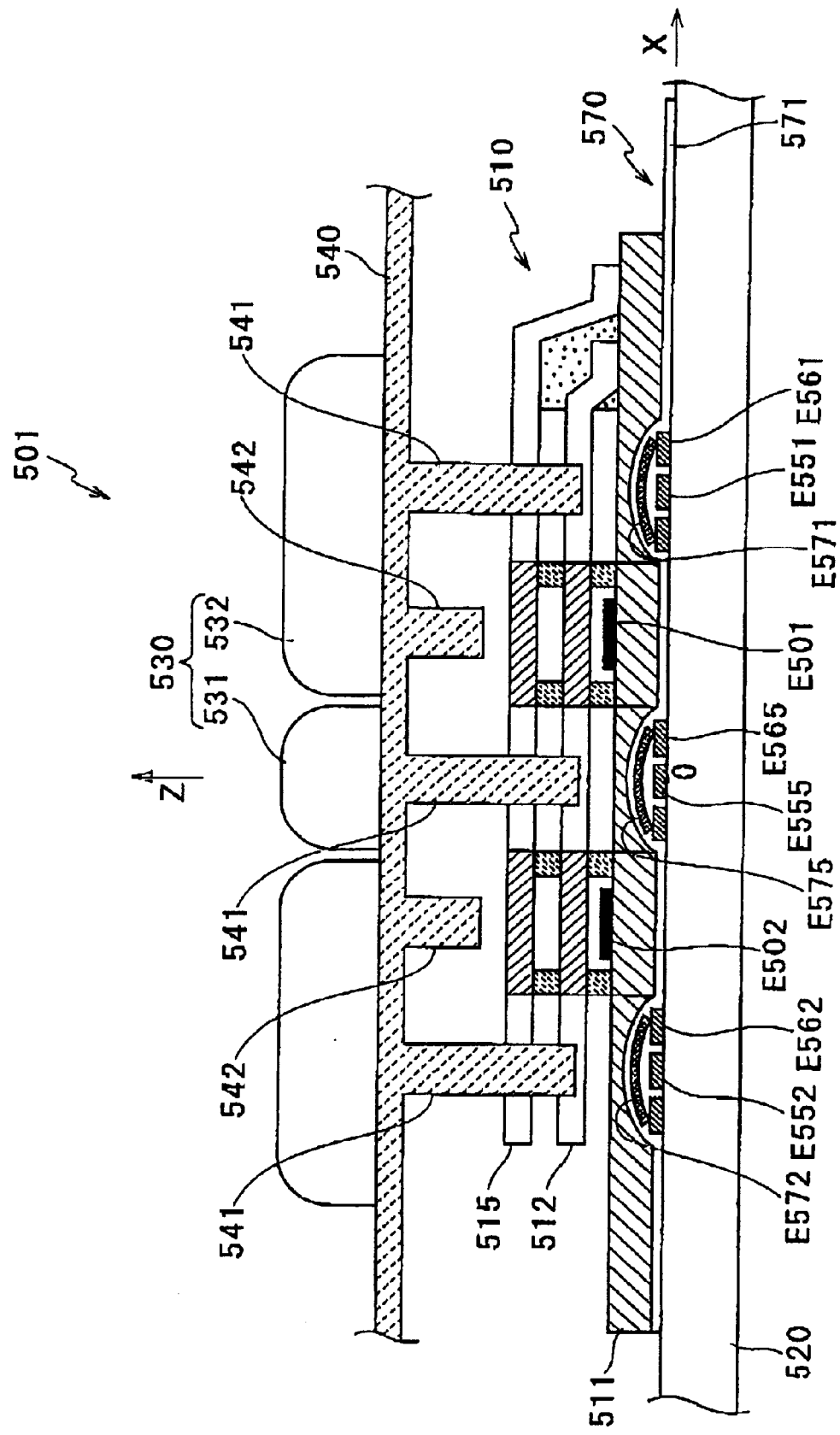
FIG. 26 is a cross sectional view showing a capacitance type sensor according to a fifth embodiment of the invention.

FIG. 26 is a cross sectional view of a capacitance type sensor of this embodiment, showing correspondingly to the first embodiment shown in FIG. 1. The major difference in structure of the capacitance type sensor 501 of this embodiment from the capacitance type sensor 1 of the first embodiment is as follows. Namely, in the capacitance type sensor 1 of the first embodiment, the sensor unit 10 includes both the capacitance element electrodes E1–E4 for configuring the capacitance elements C1–C4 and the determining-switch fixed electrode E21 and reference electrode E13 for configuring the determining switch S2, all of which are provided on one FPC 11. On the contrary, in the capacitance type sensor 501 of this embodiment, the sensor unit 510 includes capacitance element electrodes E501–E504 for configuring capacitance elements C501–C504 but does not include membrane switches S501–S505, wherein the sensor unit 510 is overlaid a membrane switch sheet 570 having the membrane switches S501–S505.

Explanation is first made on the structure of the capacitance type sensor 501 of this embodiment, with reference to FIGS. 26–33.

The capacitance type sensor 501 has a mother substrate 520, a membrane switch sheet (hereinafter, referred merely to as "switch sheet") 570 arranged on the mother substrate 520, a sensor unit 510 arranged on the switch sheet 570, a switch button 530 for detecting external force, and a supporting member 540 for fixingly supporting the switch button 530 on the mother substrate 520.

Figure 27:
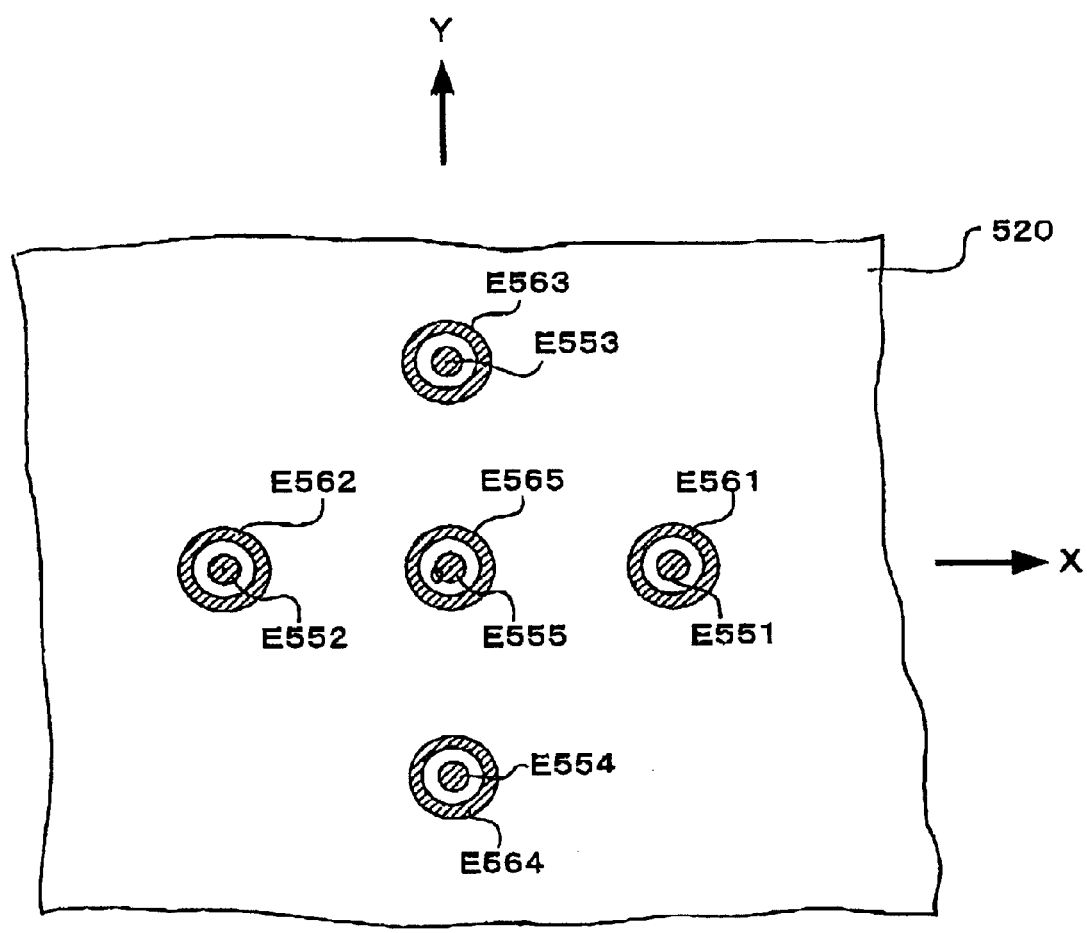
FIG. 27 is an arrangement view showing a plurality of electrodes formed on a mother substrate of the capacitance type sensor of FIG. 26.
Figure 28:
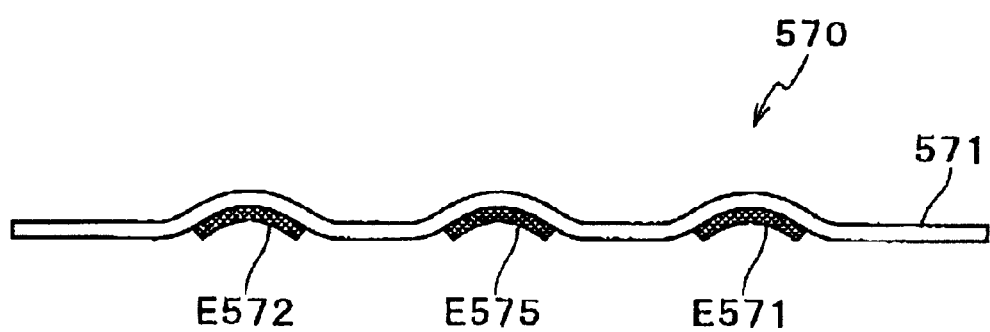
FIG. 28 is a schematic structural view showing a membrane switch sheet of the capacitance type sensor of FIG. 26.

The mother substrate 520 is a printed circuit substrate for a general electronic circuit similarly to the substrate 20 of the first embodiment. This embodiment uses a glass-epoxy substrate. FIG. 27 is an arrangement view showing a plurality of electrodes formed on the mother substrate 520 while FIG. 28 is a schematic structural view showing a switch sheet 570. On the mother substrate 520, there is formed a pattern, e.g. by a copper foil, to be made into the conductive contact lands for membrane switches (hereinafter, referred merely to as "switches") S501–S505 as shown in FIG. 27.

More specifically, on the mother substrate 520, there are provided circular switch fixed electrodes E551–E554 arranged corresponding respectively to X-axis positive direction, X-axis negative direction, Y-axis positive direction and Y-axis negative direction, annular reference electrodes E561–E564 arranged respectively outer of the switch fixed electrodes E551–E554, a determining-switch fixed electrode E555 circular about an origin O, and an annular reference electrode E565 arranged outer of the determining-switch fixed electrode E555. Herein, the switch fixed electrodes E551–E554 are arranged respectively spaced by a predetermined distance from the origin in the X-axis positive direction, X-axis negative direction, Y-axis positive direction and Y-axis negative direction.

The switch sheet 570, as shown in FIGS. 26 and 28, has a thin resin sheet 571, a switch movable electrodes E571–E574 and a determining-switch movable electrode E575, being made entirely in an extreme-thin sheet member. Note that there are shown, in FIGS. 26 and 28, only switch movable electrodes E571, E572 arranged in X-axis positive direction and X-axis negative direction, and a determining-switch movable electrode E571 arranged at the origin.

Meanwhile, FIGS. 26 and 27 depict a form that only the electrodes for configuring switches S501–S505 are included in the switch sheet 570 on the mother substrate 520. However, in configuring a device including the capacitance type sensor 501, if the switch sheet 570 on the mother substrate 520 similarly includes the electrodes for configuring the other switches required for the other than the capacitance type sensor 501 as a device, the manufacturing process for the device can be simplified and the manufacturing cost can be reduced.

The switch movable electrodes E571–E574 and determining-switch movable electrodes E575 are to be made into respective movable contacts for the switches S501–S505, which are respectively dome-formed members having an outer diameter somewhat smaller than the reference electrodes E561–E565. The switch movable electrodes E571–E574 and determining-switch movable electrode E575, at respective arcuate portions in outer surfaces, are fixed in contact with the resin sheet 571 by adhesive. In this case, the switch movable electrodes E571–E574 and determining-switch movable electrode E575 are arranged spaced (at a pitch) corresponding respectively to the switch fixed electrodes E551–E554 and determining-switch fixed electrode E555 on the mother substrate 520.

Bonding is made by utilizing an adhesive or the like such that the surface of the resin sheet 571 arranging the switch movable electrodes E571–E574 and determining-switch movable electrode E575 are on a side close to the mother substrate 520 while positioning the switch sheet 570 correctly on the mother substrate 520. Thereupon, as shown in FIG. 26, the switch movable electrodes E571–E574 are arranged respectively placed in contact with the reference electrodes E561–E564 and covering, with spacing, the switch fixed electrodes E551–E554. Also, the determining-switch movable electrode E575 is arranged in contact with the reference electrode E565 and covering, with spacing, the determining-switch fixed electrode E555. In this manner, switches S501–S505 can be easily formed. Incidentally, the switches S501–S505 are to function as mutually independent switches (see FIG. 34).

Figure 31:
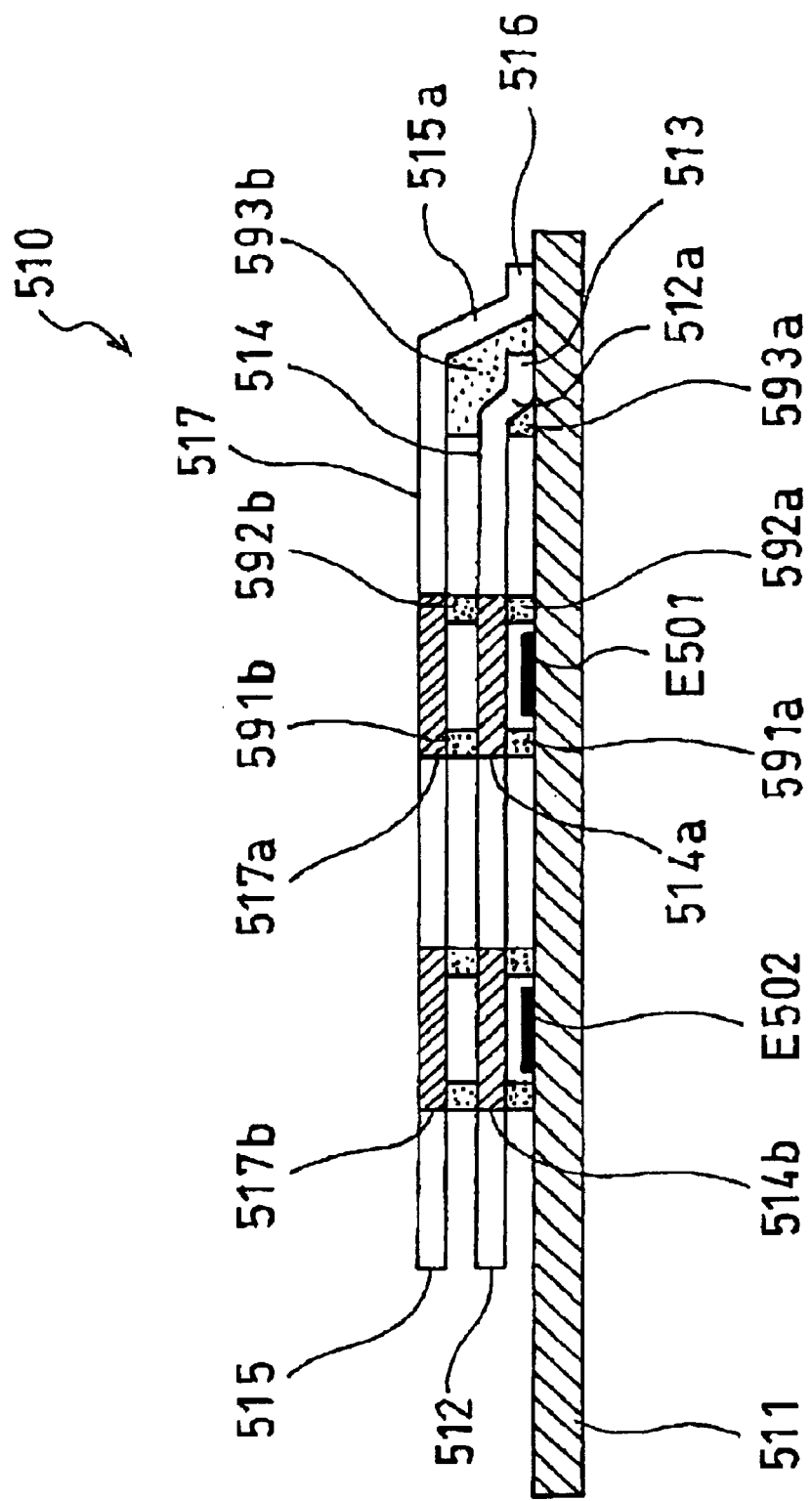
FIG. 31 is a schematic structural view showing a sensor unit of the capacitance type sensor of FIG. 26.

Meanwhile, FIG. 31 shows a schematic structural view showing the sensor unit 510. The sensor unit 510, as shown in FIGS. 26 and 31, has a sensor substrate 511, capacitance element electrodes E501–E504 formed on the sensor substrate 511 (only capacitance element electrodes E501, E502 shown in FIGS. 26 and 31), spacers 591a, 592a, 593a arranged on the sensor substrate 511, a sensor electrode 512 arranged oppositely to and above the capacitance element electrodes E501–E504, spacers 591b, 592b, 593b arranged on the sensor electrode 512, and a reference electrode 515 arranged oppositely to and above the sensor electrode 512.

Figure 29:
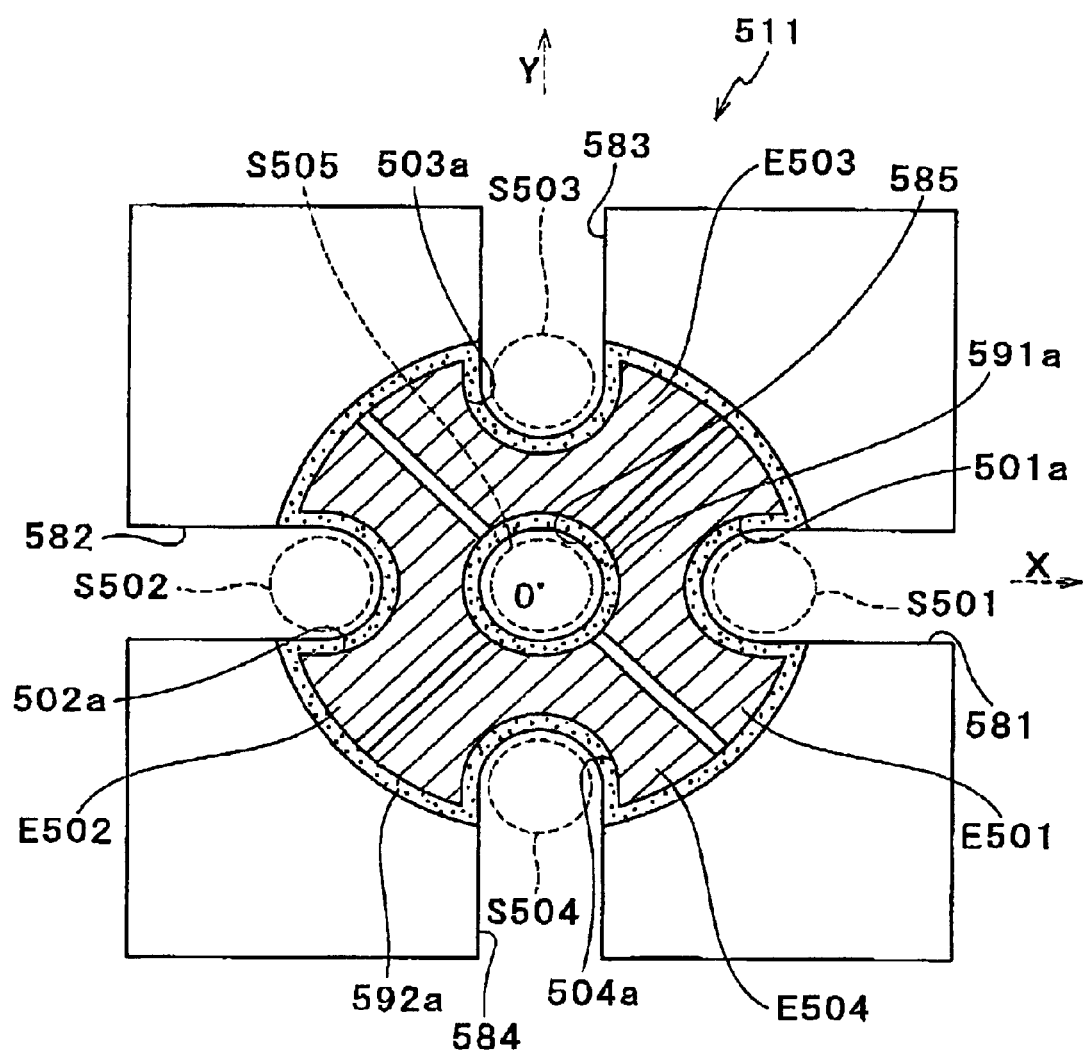
FIG. 29 is an arrangement view showing a plurality of electrodes formed on a sensor substrate of the capacitance type sensor of FIG. 26.

FIG. 29 shows an arrangement view showing a plurality of electrodes formed on the sensor substrate 511. The sensor substrate 511 is a rectangular plate member as shown in FIG. 29, which is a printed substrate having a reduced thickness or a flexible polyimide substrate. The sensor substrate 511 has cutouts 581–584 formed correspondingly to X-axis positive direction, X-axis negative direction, Y-axis positive direction, and Y-axis negative direction. An opening 585 is formed in a vicinity of a center of the same. This is for the sensor substrate 511 not to be superposed on the switches S501–S505 when fixingly arrange the sensor unit 501 on the switch sheet 570 over the mother substrate 520.

The cutouts 581–584 are generally ellipse having a size greater than the outer diameter of the reference electrodes E561–E564 on the mother substrate 520. Meanwhile, the opening 585 is generally circular having an outer diameter greater than the outer diameter of the reference electrode E565 on the mother substrate 520. Accordingly, when the sensor unit 501 is fixingly arranged on the switch sheet 570 over the mother substrate 520, the switches S501–S504 are respectively arranged in the cutouts 581–584 of the sensor substrate 511 while the switch S505 is in the opening 585. Incidentally, in FIG. 29, the position of the switches S501–S505 is shown by a broken line.

The capacitance element electrodes E501–E504 are electrodes generally arranged in a fan shape arranged outer of the opening 585 on the sensor substrate 511. Herein, the capacitance element electrodes E501–E504 have inner peripheries arranged spaced from an edge of the opening 585. The capacitance element electrodes E501–E504 have outer peripheries formed with recesses 501a–504a corresponding respectively to the cutouts 581–584 of the sensor substrate 511. The capacitance element electrodes E501–E504 are arranged spaced also from an outer periphery (including the portions corresponding to the cutouts 581–584) of the sensor substrate 511.

The capacitance element electrode E501 and the capacitance element electrode E502 are arranged, in respective positions on the positive and the negative side of X axis, in linear-symmetry about the Y axis with a spacing in the X-axial direction, in order for utilization in detecting an X-axial component of external force. Also, the capacitance element electrode E503 and the capacitance element electrode E504 are arranged, in respective positions on the positive and the negative side of Y axis, in linear-symmetry about the X axis with a spacing in the Y-axial direction, in order for utilization in detecting a Y-axial component of external force.

The spacers 591a–593a are to hold the sensor electrode 512 with a slight spacing kept from the capacitance element electrodes E501–E504 on the sensor substrate 511. The spacer 591a, an annular member as shown in FIG. 29, is arranged between an edge of the opening 585 on the sensor substrate 511 and the capacitance element electrodes E501–E504. The spacer 592a is arranged around the capacitance element electrodes E501–E504 on the sensor substrate 511 in a manner surrounding these. Also, the spacer 591c is arranged between the sensor substrate 511 and the step 512a of the sensor electrode 512, in the vicinity of an end of the sensor substrate 511, as shown in FIG. 31.

Note that, in this embodiment, the spacers 591a–593a are structured by double-sided adhesive films or an adhesive. Namely, the double-sided adhesive films or adhesive serve as spacers for separating the capacitance element electrodes E501–E504 on the sensor substrate 511 and the sensor electrode 512 with a slight distance.

Figure 30:
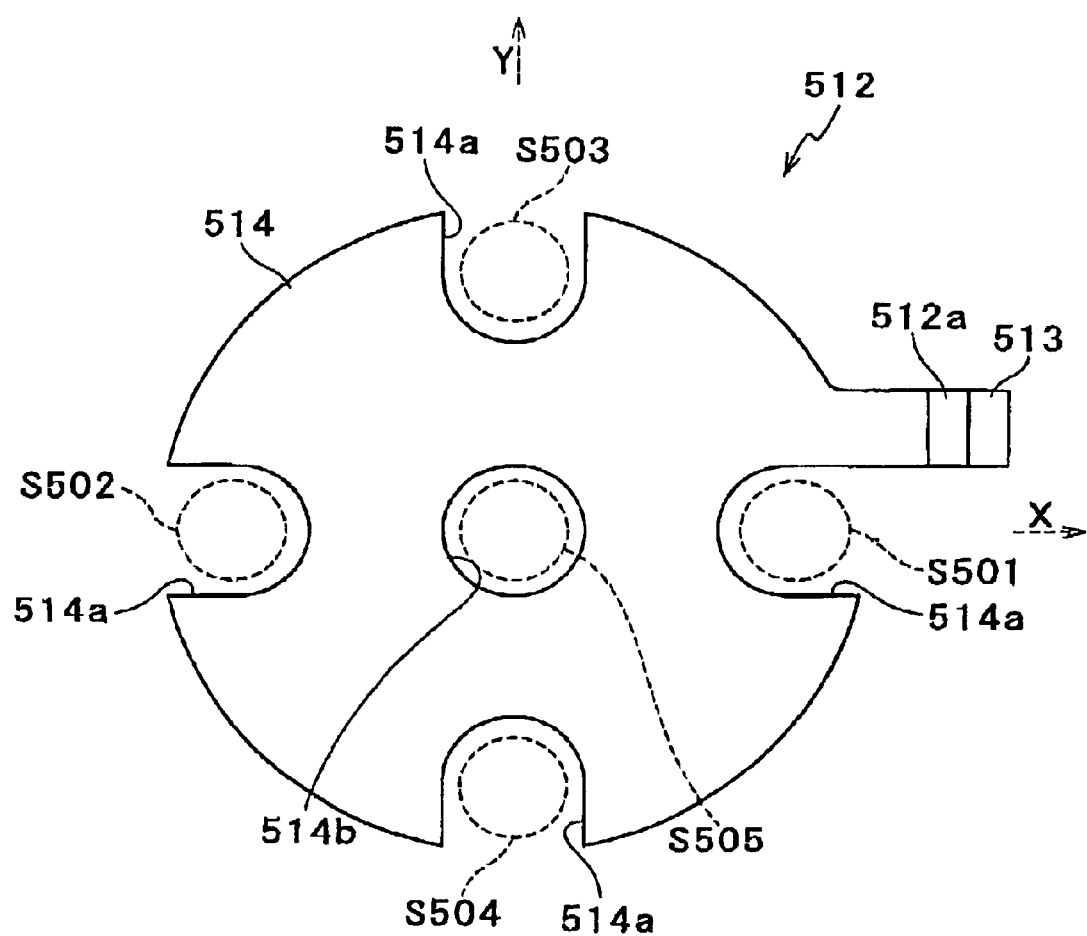
FIG. 30 is a schematic structural view showing a sensor electrode of the capacitance type sensor of FIG. 26.

FIG. 30 shows a schematic structural view of the sensor electrode 512. The sensor electrode 512 is a plate member generally circular, e.g. a phosphor bronze or stainless steel plate, as shown in FIG. 30. An outwardly extending lead 513 generally rectangular is provided at one end of the sensor electrode 512. A step 512a is provided in the lead 513 in a position close to the base thereof. Accordingly, the lead 513 of the sensor electrode 512 and the upper stage 514, a part opposite to the lead 513 with respect to the step 512a, are not on the same plane but on the planes parallel with each other, as shown in FIGS. 26 and 31.

In the upper stage 514 of the sensor electrode 512, formed are four cutouts 514a and an opening 514b. The four cutouts 514*a* are in positions on the positive side of X axis, on the negative side of X axis, on the positive side of Y axis and on the negative side of Y axis. The one opening 514*b* is directed in the Z-axis direction. Accordingly, the switches S501–S504 provided on the mother substrate 520 are respectively arranged in the cutouts 514*a* of the sensor electrode 512 while the switch S505 is arranged in the opening 514*b* of the sensor electrode 512. Note that, in FIG. 30, the switches S501–S505 are shown in their positions by broken lines.

The cutouts 514*a* are each nearly semi-circular while the opening 514*b* is generally circular. The cutout 514*a* and opening 514*b* are greater than the outer diameter of a projection 541 of a hereinafter-referred supporting member 540. The projection 541 can be inserted in the cutout 514*a* and opening 514*b*.

Meanwhile, the sensor electrode 512 is arranged such that the underside of the lead 513 thereof abuts against the sensor substrate 511 at between the capacitance element electrode E501 on the sensor substrate E501 and the nearby end thereof. In the case the lead 513 at its underside of the sensor electrode 512 is arranged abutting against the sensor substrate 511 in this manner, the upper stage 514 is arranged spaced a predetermined distance from and nearly parallel with the sensor substrate 511. Accordingly, the sensor electrode 512 is fixedly arranged in a manner spaced from and covering the capacitance element electrodes E501–E504 on the sensor substrate E501.

As noted before, the spacers 591*a*–593*a* are arranged between the sensor substrate 511 and the sensor electrode 512. Consequently, on the sensor substrate 511, the capacitance element electrodes E501–E504 and the sensor electrode 512 are spaced by a predetermined distance (distance corresponding to the height of the spacers 291*a*, 292*a*) so that capacitance elements C501–C504 are structured between the both. Incidentally, in order to prevent the malfunction of the capacitance type sensor 501, it is preferred to carry out an insulation process to at least one of the opposed surfaces of the capacitance element electrodes E501–E504 and the sensor electrode 512.

Meanwhile, spacers 591*b*–593*c* are arranged on the upper surface of the sensor electrode 512. The spacers 591*b*, 592*b* are members respectively having nearly the same shape as the spacers 591*a*, 592*a*. The spacer 591*b* is arranged superposed on the spacer 591*a*, sandwiching the sensor electrode 512 while the spacer 592*b* is arranged superposed on the spacer 592*a*, sandwiching the sensor electrode 512. The spacer 593*b* is arranged on the upper surface nearby the lead 513 of the sensor electrode 512.

In this embodiment, the spacers 591*b*–593*b* are structured by both-sided adhesive films or adhesive, similarly to the spacers 591*a*–593*a*. Namely, the double-sided adhesive film or adhesive for fixingly arranging the reference electrode 515 on the sensor electrode 512 serves as a spacer to separate the sensor electrode 512 and the reference electrode 515 with a slight distance held.

The spacers 591*a*–593*a* and the spacers 591*b*–593*b* must not be both-sided adhesive films or adhesive but may be structured by other member provided having the similar function to the present embodiment.

The reference electrode 515 is a plate member generally circular, e.g. a phosphor bronze or stainless steel plate. Because the structure of the reference electrode 515 is similar to the structure of the sensor electrode 512 and hence detailed explanation thereof is omitted herein, an outwardly extending lead 516 is provided in a vicinity of one end and further the upper stage 517, a part opposite to the lead 516 with respect to the step 515*a*, is formed with four cutouts 517*a* and an opening 517*b*. The reference electrode 515 is fixedly arranged spaced from and covering the sensor electrode 512 on the sensor substrate 511.

Herein, as described above, the spacers 591*b*–593*b* are arranged between the sensor electrode 512 and the reference electrode 515. Consequently, the sensor electrode 512 and the reference electrode 515 are spaced from each other by a predetermined distance (distance corresponding to the height of the spacers 291*b*, 292*b*). Incidentally, the respective opposed surfaces of the sensor electrode 512 and reference electrode 515 are not insulation-processed.

The sensor unit 510 thus structured is applied by an adhesive at its back surface of the sensor substrate 511 and fixingly arranged on the upper surface of the switch sheet 570 over the mother substrate 520. At this time, as noted before, arrangement is made such that the cutouts 581–584 in the sensor substrate 511 of the sensor unit 510 correspond to the switches S501–S504 and the opening 585 to the switch S505.

Also, the lead terminals (not shown) connected to the capacitance element electrodes E501–E504 included in the sensor unit 510, the lead 513 of the sensor electrode 512 and the lead 516 of the reference electrode 515 are electrically connected to the mother substrate 520 by lead wires (not shown) for example.

Figure 32:
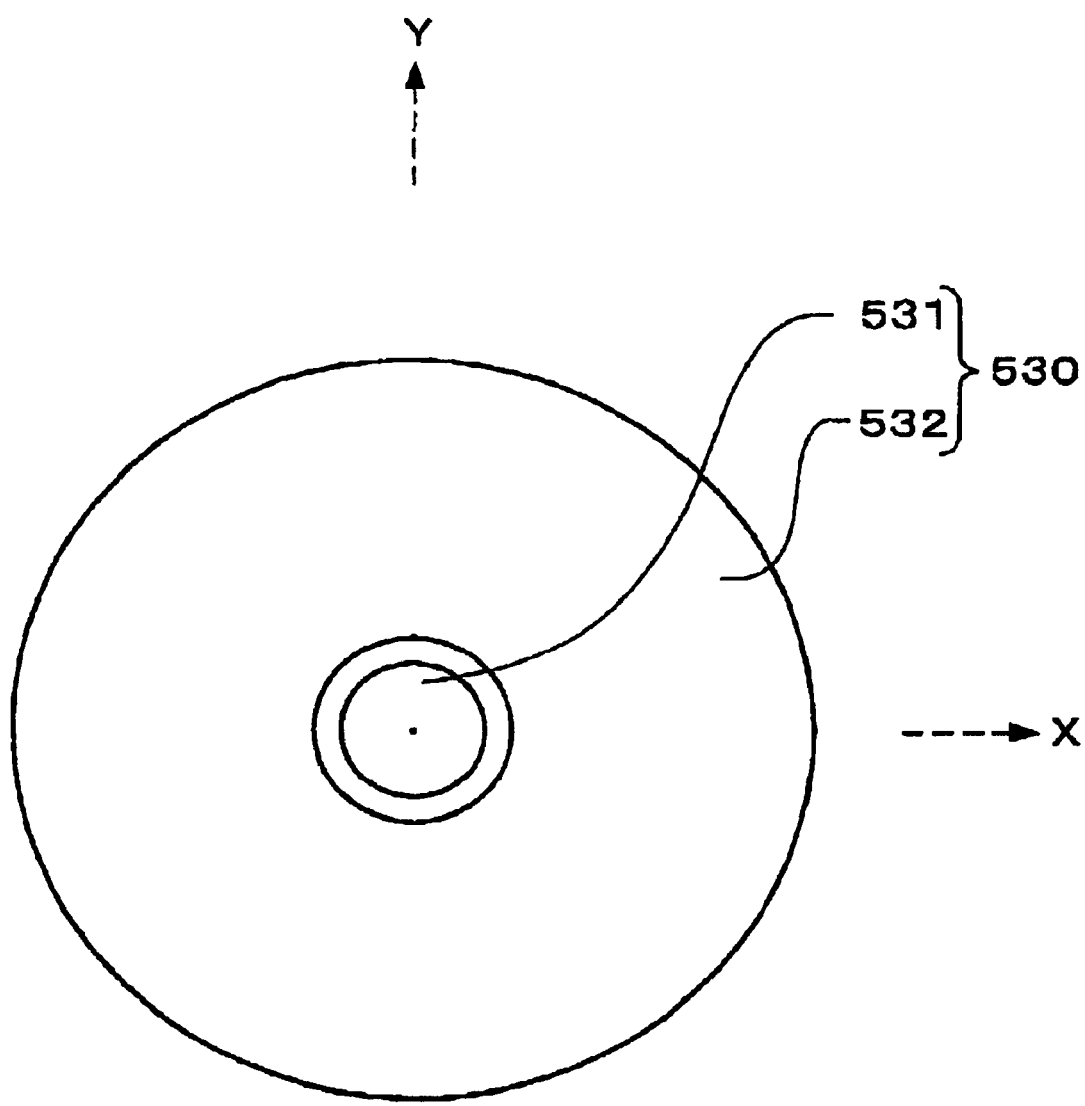
FIG. 32 is a top view showing a switch button of the capacitance type sensor of FIG. 26.

FIG. 32 shows a top view of the switch button 530. The switch button 530 is structured with a circular center switch button 531 having an outer diameter nearly equal to the outer diameter of the reference electrode E531 configuring the switch S505, and an annular side switch button 532 arranged outer of the center switch button 531.

The side switch button 532 has an inner diameter nearly equal to the opening 585 of the sensor substrate 511 and an outer diameter greater than the diameter of a circle to be given by connecting the respective outer curves of the capacitance element electrodes E501–E504 on the sensor substrate 511. Consequently, the side switch button 532 corresponds to any of the capacitance elements C501–C504 configured between the capacitance element electrodes E501–E504 and the sensor electrode 512 as well as the switches S501–S504 configured by the switch movable electrodes E571–E574 and the switch fixed electrodes E551–E554.

As shown in FIG. 26, the center switch button 531 and the side switch button 532 are supported on the mother substrate 520 by the supporting member 540. Note that in FIG. 26 the region where the supporting member 540 abuts against the mother substrate 520 is omitted.

The center switch button 531 is bonded on the upper surface of the supporting member 540 correspondingly to the switch S505 while the side switch button 532 is bonded correspondingly to the switches S501–S504 and capacitance elements C501–C504. Incidentally, the center switch button 531 and side switch button 532 must not be bonded on the upper surface of the supporting member 580, but may be structured not to largely deviate in their positions.

Figure 33:
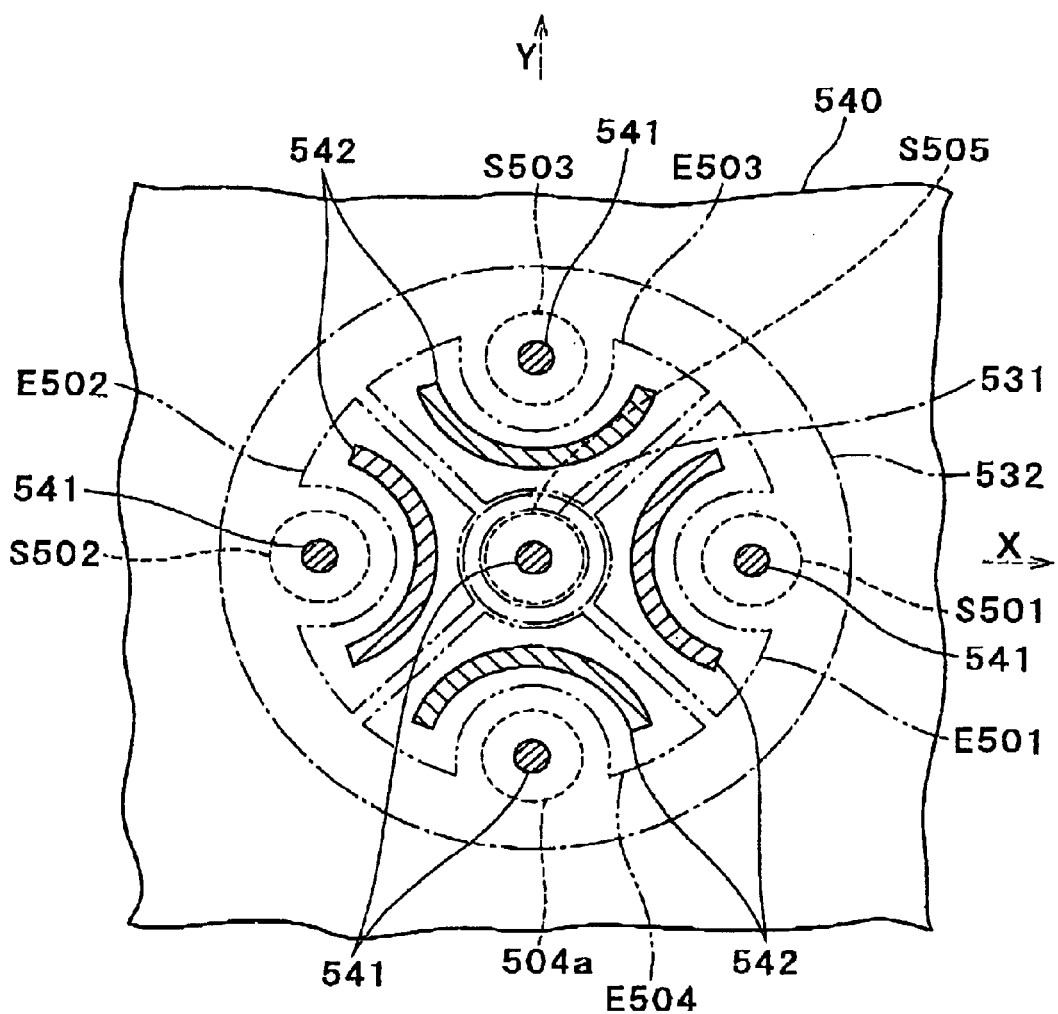
FIG. 33 is an arrangement view showing the projections formed on the supporting member of the capacitance type sensor of FIG. 26.

The supporting member 540 is formed of an elastic material, e.g. silicone rubber sheet. FIG. 33 shows an arrangement of the projections 541, 542 formed on the supporting member 540. On the opposite surface of supporting member 540 to the surface arranging the center switch button 531 and side switch button 532, there are provided five projections 541 and four projections 542. In FIG. 33, the structure is shown of the projections 541, 542 formed on the supporting member 540 of FIG. 26. Note that FIG. 33 is a view of the supporting member 540 as viewed from the below (in the Z-axis negative direction). In FIG. 33, the positions of the switches S501–S505 positions are shown by broken lines, so that the positional relationship between the projections 541, 542 can be seen. The center switch button 531 and the side switch button 532 are shown by one-dot chain lines while the capacitance element electrodes E501–E504 on the sensor substrate 511 are shown by two-dot chain lines.

The five projections 541, each having a generally cylindrical form, include one projection 541 corresponding to the center switch button 531 and four projections 541 corresponding to the side switch button 532. The four projections 541 corresponding to the side switch button 532 are respectively arranged corresponding to the switches S501–S504. Herein, the projection 541 is inserted through, from above to below, the opening 515b of the reference electrode 515 and the opening 512b of the sensor electrode 512 in this order. Meanwhile, the projection 541, having a predetermined length, is not contacted at its tip with the sensor substrate 511 in a state no external force is applied to the switch button 530, as can be seen from FIG. 26.

The four projections 542, each having a horse's hoof form, are arranged respectively corresponding to the capacitance element electrodes E501–E504 on the sensor substrate 511, between the one projection 541 corresponding to the center switch button 531 and the four projections 541 corresponding to the side switch button 532. Thus, the four projections 542 are arranged along the circumference of the recesses 501a–504a of the capacitance element electrodes E501–E504. Also, the projection 542, having a predetermined length, is not contacted at its tip with the reference electrode 515 in a state no external force is applied to the switch button 530, as can be seen from FIG. 26.

Figure 34:
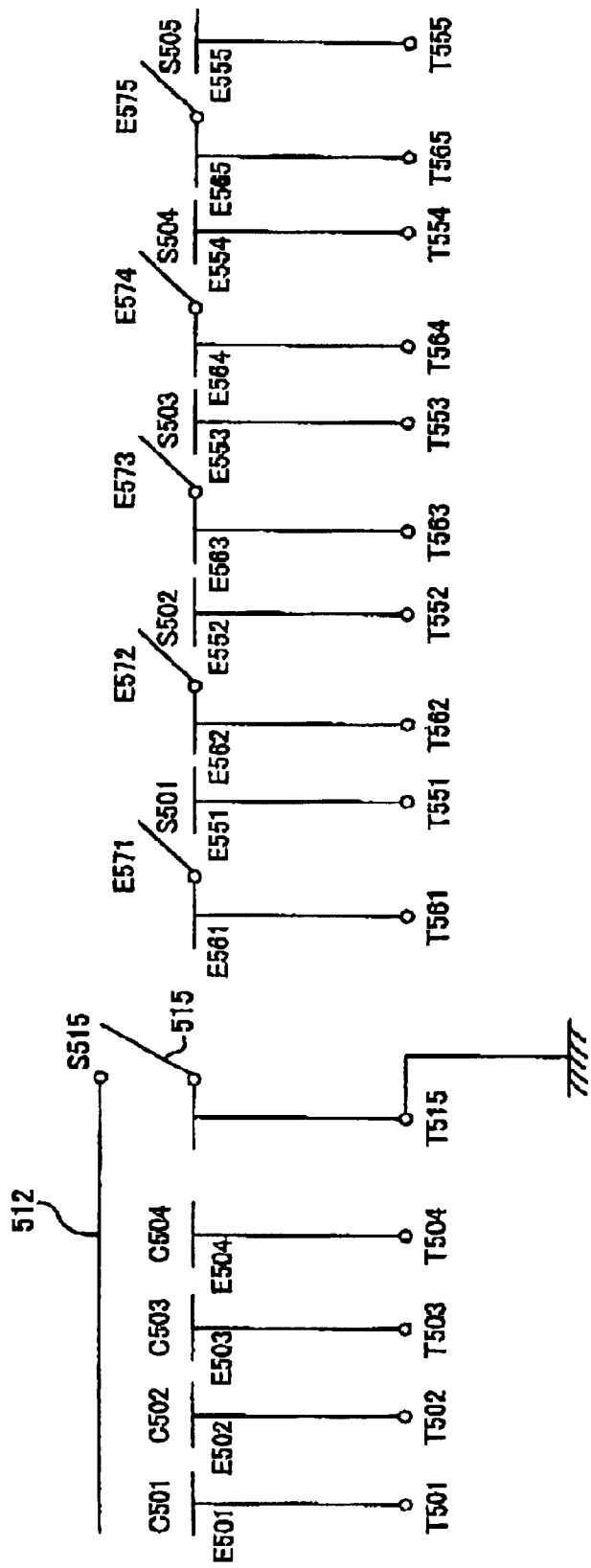
FIG. 34 is a circuit diagram showing an equivalent circuit on the capacitance type sensor of FIG. 26.

Now explanation is made on the circuit configuration of the capacitance type sensor 501 of this embodiment, with reference to FIG. 34.

In the capacitance type sensor 501 of this embodiment, variable capacitance elements C501–C504, variable in capacitance value resulting from a displacement of the sensor electrode 512, are configured between a displaceable sensor electrode 512 as a common electrode shown in FIG. 26 and discrete capacitance element electrodes E501–E504. The sensor electrode 512, when no external force is applied to the switch button 530, is held in an insulated state. Meanwhile, the capacitance element electrodes E501–E504 are respectively connected to the terminals T501–T504, configuring a delay circuit including the capacitance elements C501–C504.

Meanwhile, the reference electrode 515 is grounded through the terminal T515. The reference electrode 515 is spaced from the sensor electrode 512 when no external force is applied to the switch button 530. When a predetermined force is externally applied to the switch button 530, the reference electrode 515 goes into contact with the sensor electrode 512. Accordingly, because the reference electrode 515 can take either a state contacted with the sensor electrode 512 (on) or a state not contacted therewith (off), a switch S515 is formed between the sensor electrode 512 and the reference electrode 515.

Meanwhile, from the fact that the reference electrodes E561–E565 are grounded through the terminals T561–T565 and wherein the switch movable electrodes E571–E574 in contact with the reference electrodes E561 E565 and the determining-switch movable electrode E575 can take either a state contacted with the switch fixed electrodes E551–E554 and determining-switch fixed electrode E555 (on) or a state not contacted therewith (off), switches S501–5505 are respectively formed between those. Incidentally, the switch fixed electrodes E551–E554 and determining-switch fixed electrode E555 are connected to the terminals T551–T555.

Now explanation is made on the operation in the case the center switch button 531 is operated. When the center switch button 531 is pushed down, the below-arranged supporting member 540 elastically deforms and deflects so that the projection 541 of supporting member 540 in the Z-axis direction pushes down the determining-switch movable electrode E575. Thereupon, the determining-switch movable electrode E575 elastically deforms with a click feeling, going into contact with the determining-switch fixed electrode E555. In this manner, when there is a contact between the determine-switch movable electrode E575 and the determining-switch fixed electrode E555, the determining-switch fixed electrode E555 and the reference electrode E565 electrically connect through the determining-switch movable electrode E575. By detecting a presence or absence of an electrical connection between the both, utilization is possible as a switch. At this time, the operator can get a clear operation feeling by a click feeling upon elastic deformation of the determining-switch movable electrode E575.

Subsequently, explanation is made on the operation when the side switch button 532 at its X-axis positive direction part is operated. In the case the side switch button 532 in its X-axis positive direction part (particularly a vicinity of its outer periphery) is pushed down, the below-arranged supporting member 540 elastically deforms and deflects. The projection 541 at a positive side of X axis of the supporting member 540 pushes down the switch movable electrode E571. Thereupon, the switch movable electrode E571 elastically deforms with a click feeling, into contact with the switch fixed electrode E551. In this manner, when there is a contact between the switch movable electrode E571 and the switch fixed electrode E551, the switch fixed electrode E551 and the reference electrode E561 are electrically connected through the switch movable electrode E571. By detecting a presence or absence of an electrical connection between the both, utilization is possible as a switch. At this time, the operator can get a clear operation feeling due to a click feeling upon elastic deformation of the determining-switch movable electrode E571.

Meanwhile, in the case the side switch button 532 at its X-axial positive side (particularly a vicinity of its inner periphery) is pushed down, the below-arranged supporting member 540 elastically deforms and deflects to displace downward the projection 542 of the supporting member 540. The projection 542 at its tip abuts against the reference electrode 515, and a force in the Z-axis negative direction acts upon a vicinity of the region of the reference electrode 515 the projection 542 abuts against. Due to this force, elastic deformation and deflection are caused in the vicinity of the relevant part of the reference electrode 515. When it is pushed down by a predetermined height, the sensor electrode 512 comes into contact therewith. This turns the switch S515 from off to on. At this time, because the sensor electrode 512 contacts the grounded reference electrode 515, the sensor electrode 512 having been in an insulated state goes into the same potential as the reference electrode 515, i.e., ground potential, in the instance the both come into contact.

Thereafter, when the side switch button 532 at its positive side of X axis is further pushed down, the sensor electrode 512 in a vicinity of contact with the reference electrode 515 elastically deforms and deflects into a downward displacement while the switch S515 is keeping its on state. Due to this displacement, the spacing decreases between the vicinity of the relevant part of sensor electrode 512 and the capacitance element electrode E501. This increases the capacitance value of the capacitance element C501 between the sensor electrode 512 and the capacitance element electrode E501. The change of the capacitance C501 corresponds to a magnitude (intensity) of the force of pushing down the side switch button 532. Incidentally, when the side switch button 532 in a part other than the positive part of X axis is pushed down, the capacitance value of the capacitance elements C502–C504 changes by the operation similar to the foregoing.

By detecting a capacitance value change of the capacitance elements C501–C504, it is possible to detect a direction (X-axis direction and Y-axis direction) and magnitude of a force applied to the side switch button 532. Accordingly, because the force in every direction of 360 degrees applied to the side switch button 532 can be detected together with its magnitude, application is possible to a joy stick for controlling the cursor position in XY-planar direction.

Incidentally, when the side switch button 532 is pushed down, the switches S501–S504 switch from an off state to an on state responsive to a pushed position and magnitude (intensity) of force, thereby changing the capacitance value of the capacitance elements C501–C504. Accordingly, there is no apparent relevance between the operation of the switches S501–S504 and the capacitance value change of the capacitance elements C501–C504, i.e., these operate independently.

The sensor unit 511 of this embodiment is unitized (integrated) with the electrodes required in detecting an externally applied force, e.g. can be easily incorporated in a device capable of obtaining only a switch output.

As described above, according to the capacitance type sensor 501 of this embodiment, when the switch S515 is off, i.e., when the sensor electrode 512 and the sensor electrode 515 are not in contact, the sensor electrode 512 is maintained in an insulated state (floated state) without electrical connection to anywhere. No voltage is applied to the capacitance elements C501–C504 constituted between the sensor electrode 512 and the capacitance element electrodes E501–E504. Accordingly, the amount of the charge stored on the capacitance elements C501–C504 is negligibly small, stabilizing the output signal at a constant magnitude.

Meanwhile, in the case the side switch button 532 is operated to turn on the switch S515, i.e., in the case the sensor electrode 512 and the sensor electrode 515 are placed into contact, the sensor electrode 512 has a ground potential, applying a voltage to the capacitance elements C501–C504. Consequently, in the course of a transit from a state the sensor electrode 512 and the reference electrode 515 are not in contact into a state of their contact, the charge stored on the capacitance elements C501–C504 abruptly varies in amount, to greatly vary the output signal correspondingly.

Accordingly, even in the case the sensor electrode 512 and/or the reference electrode 515 somewhat deviate in position at around the operation, unless the sensor electrode 512 and the reference electrode 515 come into contact, the output signal of capacitance type sensor 501 corresponding to the capacitance elements C501–C504 can be considered almost the same. This can reduce the hysteresis on the output signal corresponding to the capacitance elements C501–C504.

Meanwhile, by detecting a change of capacitance value of the capacitance element C501–C504 resulting from a change in the spacing between the sensor electrode 512 and the capacitance element electrodes E501–E504, it is possible to recognize a magnitude of a force externally applied to the side switch button 532, and a presence or absence of a contact with the switches S501–S504 constituted by the switch movable electrodes E571–E574 and switch fixed electrodes E551–E554. Consequently, these can be utilized as a switch function corresponding to the X-axis positive direction, X-axis negative direction, Y-axis positive direction and Y-axis negative direction. Accordingly, the capacitance type sensor of the invention can be utilized as a device having a function to output as a signal (analog signal) a magnitude of a force externally applied to the side switch button 532 and/or a device having a switch function corresponding to mutually different four directions. Due to this, the capacitance type sensor 501 has a function as a composite device to be utilized as any of the above devices, eliminating the necessity to re-manufacture according to the above both applications.

Meanwhile, the capacitance element electrodes E501–E504 for constituting the capacitance elements C501–C504 are provided on the sensor substrate 511 of the sensor unit 510. The electrodes configuring the switches S501–S505 are not provided on the sensor substrate 511 but in the switch sheet 570 on the mother substrate 520. In this manner, because the sensor unit 510 and the switch sheet 570 on the mother substrate 520 are separated in mechanism, the sensor is easy to assemble. Also, because the circuit of switches S501–S504 and the circuit of capacitance elements C501–C504 (sensor section) are separated, the capacitance type sensor 501 of this embodiment is reduced in the number of signal lines as compared to the case a switch circuit is incorporated on a sensor substrate. As a result, because of reduced contact points to the mother substrate 520, the sensor is improved in reliability.

Figure 35:
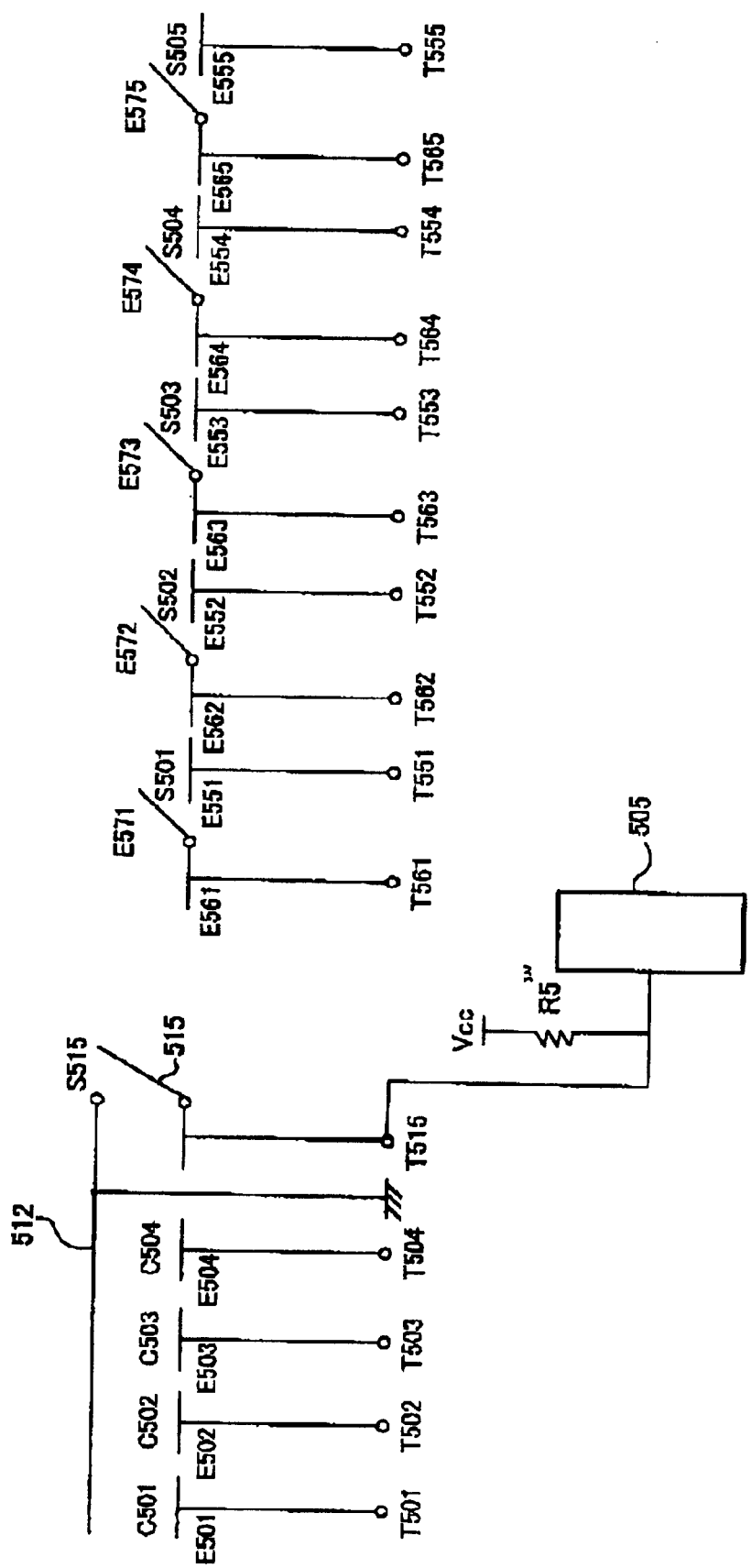
FIG. 35 is a circuit diagram showing a modification to the equivalent circuit on the capacitance type sensor of FIG. 26.

FIG. 35 shows a first modification to the equivalent circuit of the foregoing fifth embodiment. The difference between the equivalent circuit of FIG. 35 and the equivalent circuit of FIG. 34 is as follows. Namely, in FIG. 34, the sensor electrode 512 is held in an insulated state and the reference electrode 515 is grounded. On the contrary, in FIG. 35, the sensor electrode 512 is grounded and the reference electrode 515 is kept at, the power voltage Vcc through a pull-up resistance element R5'". The other configuration is similar to the one shown in FIG. 34 and the detailed explanation thereof is omitted.

Meanwhile, the terminal T515 connected to the reference electrode 515 is connected to an input port of a microcomputer 505. In the case the side switch button 532 is not operated, the reference electrode 515 is assumably kept at the power voltage Vcc.

Accordingly, in the case the side switch button 532 is operated, due to the displacement of the side switch button 532 the reference electrode 515 first displaces into contact with the sensor electrode 512. Subsequently, the reference electrode 515 and the sensor electrode 512 displace while maintaining a contact state thereof. Herein, the sensor electrode 512 is held at the ground potential while the reference electrode 515 is held at a potential different from the ground potential. Accordingly, in the course of a transit from a state the sensor electrode 512 and the reference electrode 515 are not in contact into a state of their contact, the output signal is switched from a Hi-level at around the potential the reference electrode 515 is held to a Lo-level at around the ground potential, or from the Lo-level to a Hi-level.

Accordingly, when an operation is made, the output signal necessarily varies beyond the threshold voltage. By monitoring the output signal, it is possible to securely detect an operation to the side switch button 532 of the capacitance type sensor. Due to this, when the side switch button 532 is not operated for a predetermined time, switching is made to a sleep mode. When the operation is resumed, the sleep mode can be securely canceled. Therefore, the reduction of power consumption can be realized by suitably switching between the sleep and usual modes.

Figure 36:
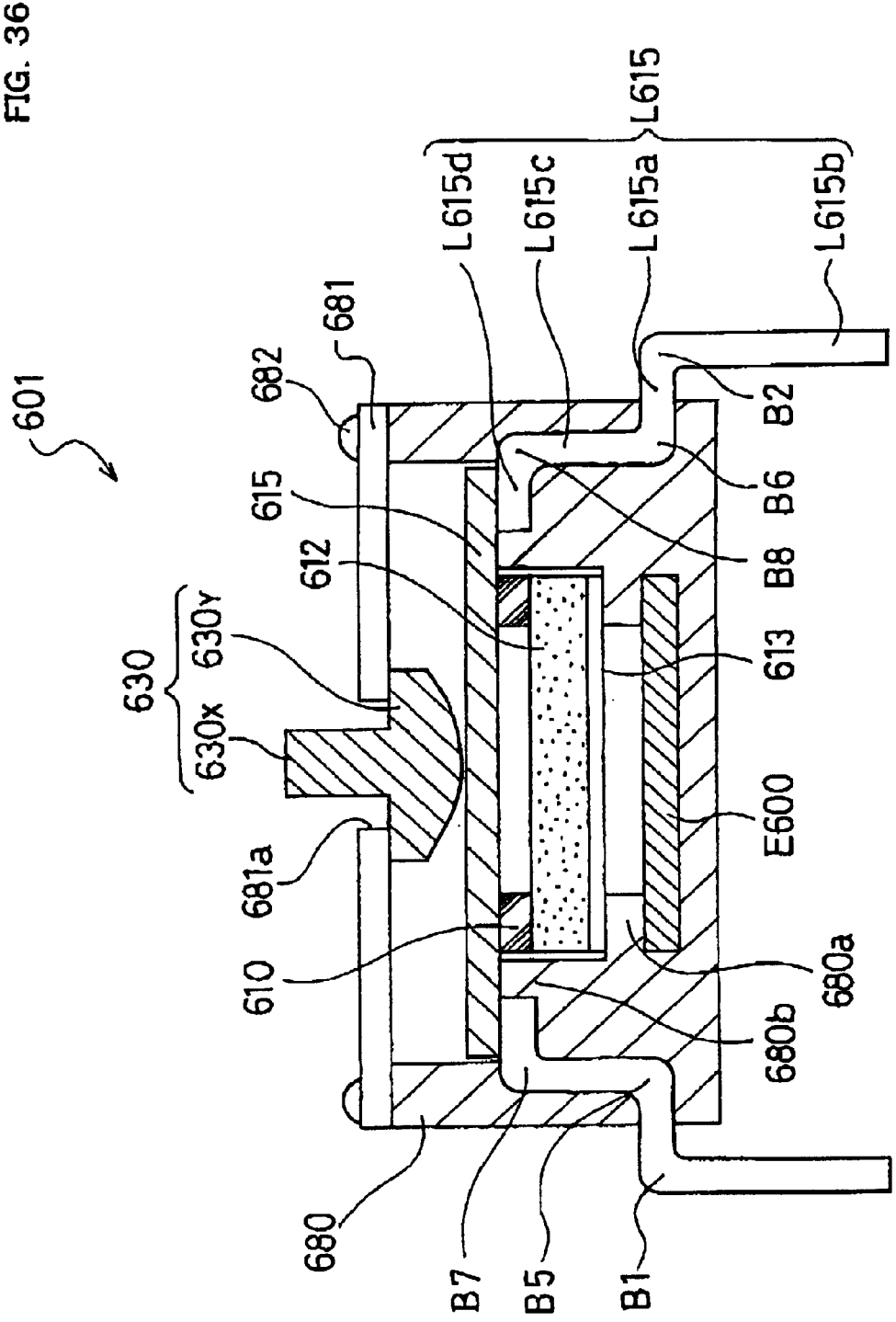
FIG. 36 is a cross sectional view showing a capacitance type sensor fabricated by a manufacturing method for a capacitance type sensor according to one embodiment of the invention.
Figure 37:
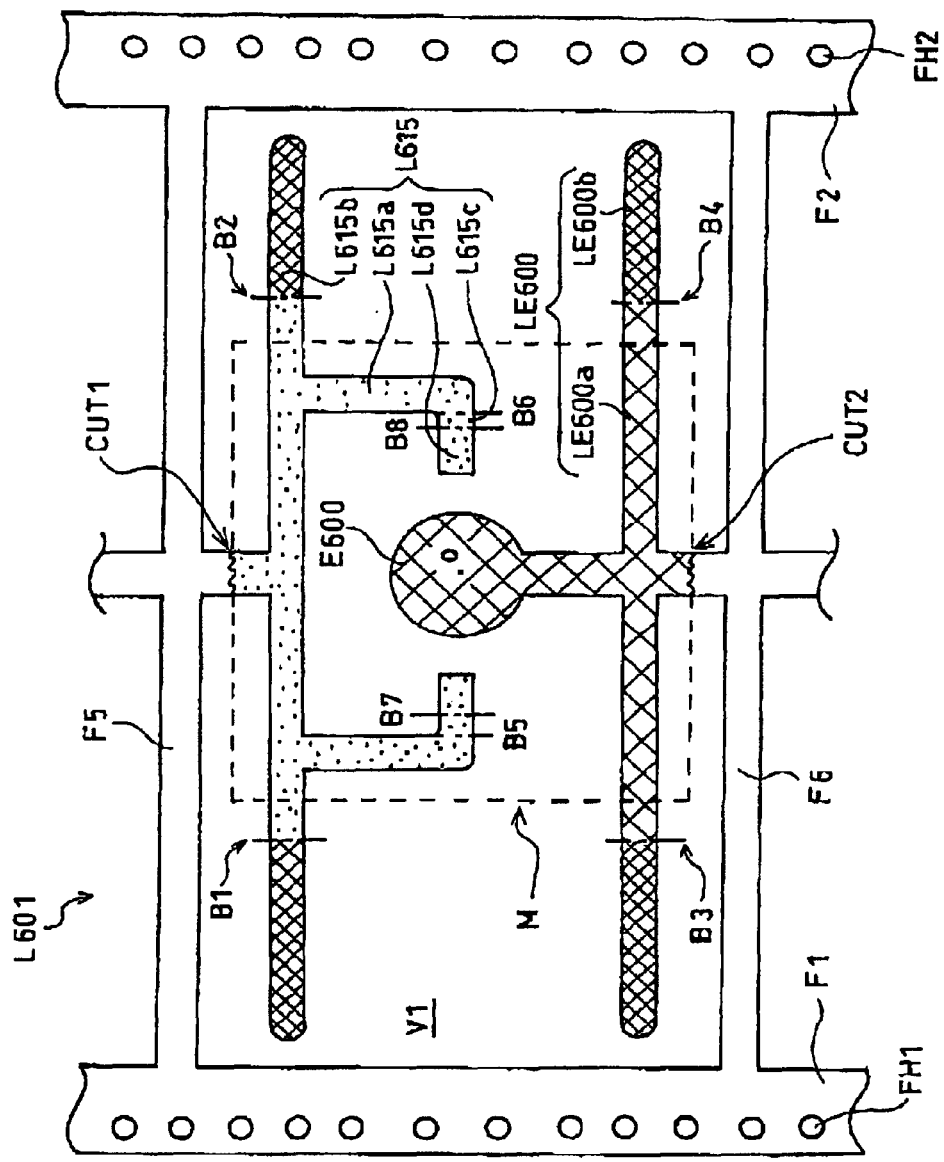
FIG. 37 is a plan view showing a part of a leadframe for use in manufacturing a capacitance type sensor of FIG. 36.
Figure 38A:
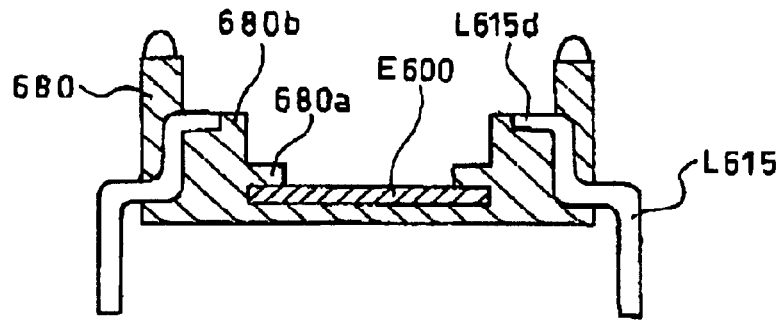
FIG. 38 is an explanatory view showing, by stages, a manufacturing method according to one embodiment of the invention.
Figure 38B:
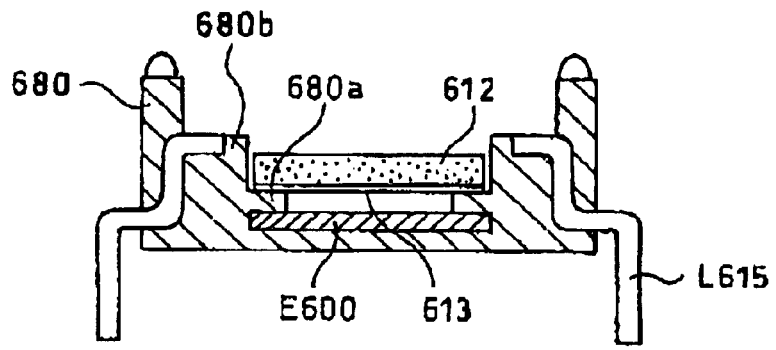
Figure 38C:
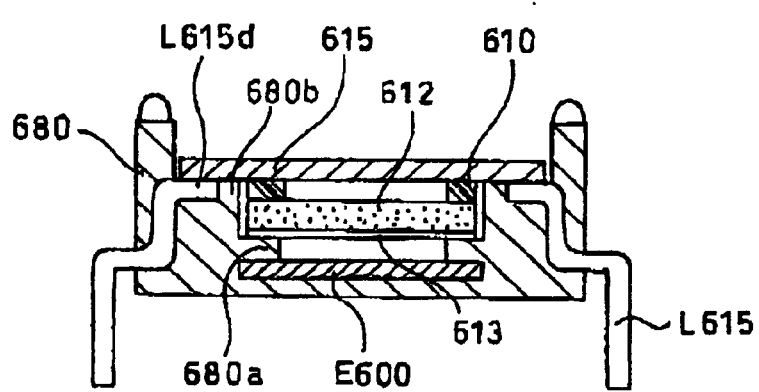
Figure 39:
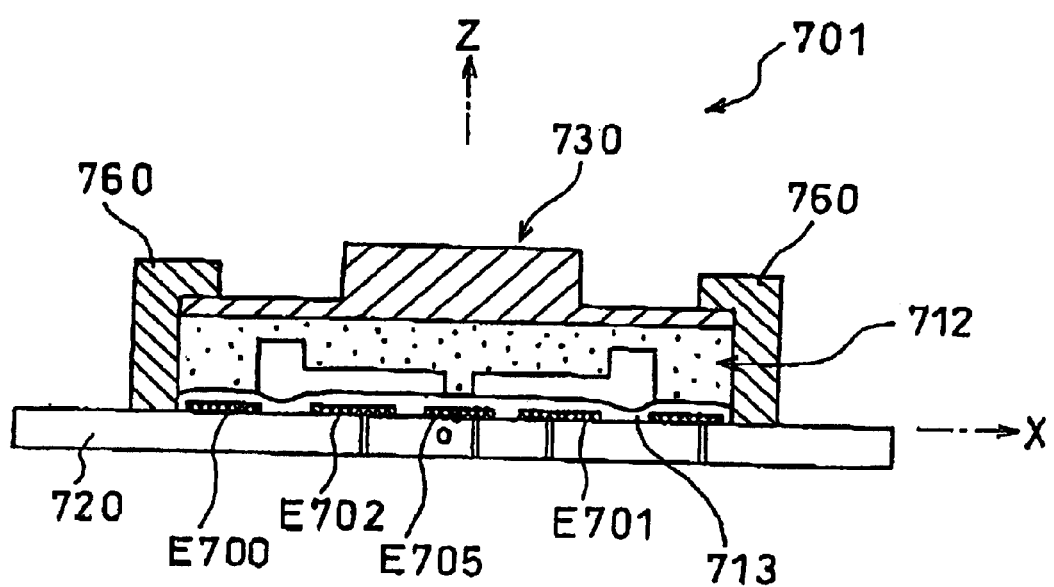
FIG. 39 is a cross sectional view showing a conventional capacitance type sensor.
Figure 40:
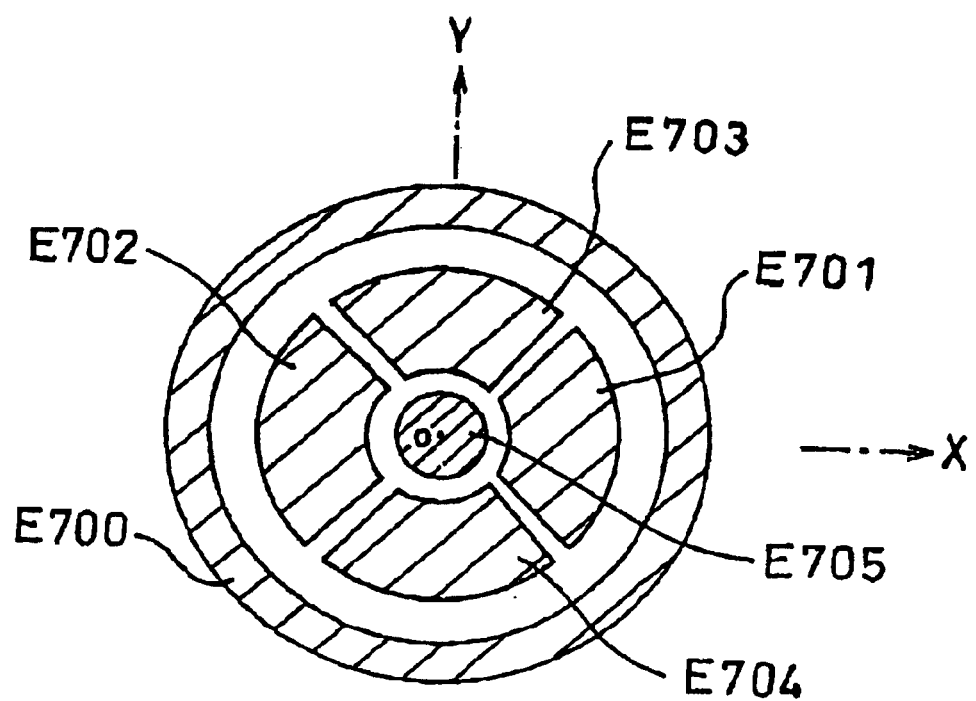
FIG. 40 is an arrangement view showing a plurality of electrodes formed on the substrate of the capacitance type sensor of FIG. 39.

Now explanation is made on a method for manufacturing a capacitance type sensor according to one embodiment of the invention, with reference to FIGS. 36–38. FIG. 36 is a cross sectional view showing a capacitance type sensor manufactured by a manufacturing method of this embodiment. FIG. 37 is a plan view showing a part of a leadframe to be used in manufacturing a capacitance type sensor of FIG. 36. FIGS. 38A, 38B and 38C are explanatory views showing, in stage, the process in the manufacturing method of this embodiment.

At first, the capacitance type sensor 601 shown in FIG. 36 has a detection button 630 structured by a cylindrical projection 630X and spherical seat 630Y similar to the third embodiment shown in FIG. 23A, a movable electrode 615 arranged to be contacted with a bottom surface of the spherical seat 630Y of the detection button 630, a displacement electrode 6212 arranged beneath and spaced from the movable electrode 615 through a ring-formed insulating spacer 610, and a capacitance element electrode E600 arranged beneath and spaced from the displacement electrode 612 and configuring a capacitance element cooperatively with the displacement electrode 612. The electrodes 615, 612, E600, respectively metal-made disks, are provided at the steps formed in a housing 680 formed of resin and having a generally cuboid outer shape.

The housing 680 has an open top surface covered by a square metal plate 681. The detection button 630 is supported at a predetermined position while being prevented from falling out by the arrangement of its projection 630X to project through a center hole 681a of the metal plate 681 and the spherical seat 630Y between the metal plate 681 and the movable electrode 615. Hub holes (not shown) are formed in the four corners of the metal plate 681. The holes are inserted by the hubs 682 provided at four corners in the upper surface of the housing 680 and caulked by heating, whereby the metal plate 681 and the housing 680 are assembled into one body.

Now explanation is made on the manufacturing process for the capacitance type sensor 601.

In a first process, a leadframe L601 as partially shown in FIG. 37 is made, for example, by press working. The leadframe L601 has a multiplicity of pilot holes FH1, FH2 formed along the lengthwise direction, and support frames F1, F2 spaced from and parallel with each other. Bar members (two bar members F5, F6 in FIG. 37) are arranged orthogonal to the support frames F1, F2, at a predetermined interval along the lengthwise direction of the support frames F1, F2 in a manner connecting between these. The spaces V1 defined by these bar members are formed at a predetermined interval.

FIG. 37 shows only one part including a space V1 in the leadframe L601. In the space V1, the capacitance element electrode E600 of the capacitance sensor 601 shown in FIG. 36 and its lead wire LE600 as well as the movable electrode lead wire L615 are formed in a predetermined pattern integrally with the leadframe L601.

More specifically, the capacitance element electrode E600 is arranged at a center O of the space V1, the lead wire LE600 is formed continuous with the capacitance element electrode E600 and one end of the lead wire LE600 is connected to the bar member F6. On the other hand, above the page of the capacitance element electrode E600, a movable electrode lead wire L615 is formed not continuous with the capacitance element electrode E600. The lead wire L615 has one end connected to the other bar member F5.

Although FIG. 37 is a plan view of the leadframe L601 made by the first process, the lead wires LE600, LE615 are bent in inverted-V-form along the one-dot chain lines B1, B2, B3, B4, B7 and B8, and in V-form along the two-dot chain lines B5 and B6, thus worked in a three-dimensional fashion.

In FIG. 36, there is shown a movable-electrode lead wire L615 worked by bending. The movable-electrode lead wire L615 of FIG. 37, in parts close to the support frames FH1, FH2 than the one-dot chain lines B1, B2, is extended in a rectangular direction to the below of the capacitance element electrode E600 as shown in FIG. 36, thus forming legs 615b. Also, the movable-electrode lead wire L615 of FIG. 37, in the part L615c sandwiched by the chain lines B5, B7 and the chain lines B6, B8 is extended in a rectangular direction to the above of the capacitance element electrode E600. Furthermore, the movable-electrode lead wire L615, in the part L615d of from the chain lines B7, B8 to the end, is formed in the above of and parallel with the capacitance element electrode E600.

Incidentally, FIG. 36 only shows the bending of the movable-electrode lead wire L615. However, the capacitance element electrode lead wire LE600, in a part LE600b close to the support frame FH1, FH2 than the one-dot chain lines B3, B4 shown in FIG. 37, is extended in the rectangular direction to the below of the capacitance element electrode E600 by bending similarly to the leg L615b of the movable-electrode lead wire L615 of FIG. 36. As shown in FIG. 37, because these two lead wires LE600, L615 are formed nearly equal in length in the direction of the bar members F5, F6, the legs LE600b, L615b are nearly in the equal length. As a result of bending as in the above, formed on the same plane as the capacitance element electrode E600 are a part L615a of capacitance element electrode E600 inner of the one-dot chain lines B1, B2 but outer of the two-dot chain lines B5, B6 as well as a part LE600a of capacitance element electrode lead wire LE600 closer to the electrode than the one-dot chain lines B3, B4.

In the second process, insert-molded with resin are a part of the capacitance element electrode lead wire LE600 and a part of the movable-electrode lead wire L615 as well as a range including the capacitance element electrode E600 (range M shown by the dotted line in FIG. 37), of the leadframe L601 made in the first process. In a center of the range M, arranged is the capacitance element electrode E600. A housing 680 as a mold product obtained by this process is shown in FIG. 38A.

The housing 680 in FIG. 38R supports the bottom surface of the capacitance element electrode E600, and opens a surface center thereof and covers its surface outer periphery by a step 680a. The step 680a is to support the displacement member 612, as hereinafter referred. The movable-electrode lead wire L615 in the range M shown in FIG. 37 and the capacitance element electrode lead wire LE600 not shown in FIG. 38A are buried in the housing 680 into one body. Also, of the bent movable-electrode lead wire L615, the part L615d formed in parallel with the capacitance element electrode E600 thereabove has an upper surface which is nearly in the same height as the upper surface of a step 680*b* formed in the housing 680 and for supporting the movable electrode 615, as hereinafter referred.

In a third process, a displacement electrode 612 is arranged on a step 680*a* formed in the housing 680, as shown in FIG. 38B. At this time, the displacement electrode 612 is spaced from the capacitance element electrode E600 through the step 680*a*. Incidentally, the displacement electrode 612 at its underside is covered by an insulating film (resist film) 613 as shown also in FIG. 36, thus being electrically insulated from the capacitance element electrode E600 even if placed close thereto.

In a fourth process, a movable electrode 615 is arranged as shown in FIG. 38C. Herein, after first arranging on the displaying electrode 612 an insulating spacer 610 having an outer diameter nearly equal to the outer diameter of the displacement electrode 612, a movable electrode 615 is arranged on the insulating spacer 610 such that it is contacted with the contact part L615*d* of a movable-electrode lead wire L615. Namely, the movable electrode 615 is spaced from the displacement electrode 612 by interposing the insulating spacer 610. Also, by making the height of the upper surface of the insulating spacer 610 equal to the upper surfaces of the contact part L615*d* of movable-electrode lead wire L615 and the step 680*b* and by making the diameter of the movable electrode 615 greater than those of the displaying electrode 612 and insulating spacer 610, is the movable electrode 615 is greater so as to be in contact with the contact part L615*d* of the movable-electrode lead wire L615.

In the fifth process, arranged are a detection button 630 and a metal plate 681. After completing this process, the state is as shown in FIG. 36. First, the spherical seat 630Y bottom surface of a detection button 630 is contacted with a center of the movable electrode 615, and a projection 630X is inserted through a center hole 681*a* of the metal plate 681. While inserting the hubs 682 formed on the upper surface of the housing 680 in the hub holes (not shown), the metal plate 681 is arranged on the upper surface of the housing 680. After arranging the metal plate 681 in this manner, the hubs 682 are caulked by heating whereby the metal plate 681 and the housing 680 are assembled disengageably.

In a sixth process, the lead wires LE500, L615 projecting outward of the housing 680, at their legs LE500*b*, L615*b*, are desirably bent for mount onto a printed substrate.

In the final process, cutting is done at the wave-lined points CUT1, CUT2 shown in FIG. 37. This cuts the lead wires LE600, L615 off the leadframe L601, obtaining a capacitance type sensor 601 formed by the first to sixth processes.

According to the manufacture of a capacitance type sensor according to the present embodiment, by applying a leadframe L601 generally used in IC (integrated circuit) assembly and an insert-molding process (the foregoing second process), it is possible to efficiently manufacture a capacitance type sensor 601 comparatively small in output signal hysteresis.

By providing the process to arrange a movable electrode 615 spaced from the displacement electrode 612 (the foregoing fourth process), switching can be suitably done between the sleep mode and the usual mode. It is therefore possible to manufacture a capacitance type sensor 601 capable of realizing the reduction of power consumption.

In the course of conducting the insert-molding process (the foregoing second process), steps 680*a*, 680*b* for respectively supporting the displacement electrode 612 and the movable electrode 615 are formed in the housing 680. Accordingly, in the process for arranging the displacement electrode 612 (the foregoing third process), it is possible to omit the labor and time for arranging especially members to support the displacement electrode 612 and the like. Therefore, mass production is to be realized based on the more efficient manufacturing method.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

For example, the first embodiment explained the case that the return-switch movable electrode 15 and the return-switch fixed electrode E31 are provided each one in the number while the second embodiment the case that the return-switch movable electrodes E215, E216 and the return-switch fixed electrodes E231, E232 are provided each two in the number. Notwithstanding them, the return-switch movable electrodes and the return-switch fixed electrodes may be provided each three or more in the number.

Although the first and second embodiments explained the case the determining switch S2 is provided, the determining switch S2 must not be provided. In this case, the center switch 31, the determining-switch fixed electrode E21, the determining-switch fixed electrode E22 and the reference electrode E13 may be omitted. Also, although the fifth embodiment had five switches S501–S505 of X-axis positive direction, X-axis negative direction, Y-axis positive direction, Y-axis negative direction and Z-axis direction, these in part may be provided.

Although the first embodiment explained the case the two reference electrodes E11, E12 are provided on the FPC 11 in order to ground the displacement electrode 12, either one of the reference electrodes E11, E12 may only be provided.

Although the first and second embodiment explained the capacitance type sensor 1 capable of detecting two of X-axis and Y-axis components of a force externally applied to the direction button 32, it may be one capable of detecting a required one of the two components without limited to the above.

Although the first embodiment explained the case of a sensor unit 10 that a multiplicity of electrodes including capacity-element electrodes E1–E4, displacement electrode 12 and return-switch movable electrode 15 are integrally provided on the upper surface of the FPC 11, these must not be provided in one body. This is true for the second embodiment.

In the first embodiment, the return-switch movable electrode 15 is arranged to contact the return-switch fixed electrode E31 on the FPC 11. However, not limited thereto, both the return-switch movable electrode 15 and the return-switch fixed electrode E31 may be provided on the FPC 11 so that the both can be opposed by bending the FPC 11.

In the first embodiment, the displacement electrode 12, the determining-switch movable electrode E22 and the return-switch movable electrode 15 are fixed on the FPC 11 by the resin sheets 90-92 applied with adhesive. However, not limited thereto, i.e., these may be fixed by a conductive adhesive. This is true for the second embodiment.

Although the first embodiment used the solder 18 in connecting between the terminals on the FPC 11 and the connection electrodes on the substrate 20, a conductive adhesive, for example, may be employed instead thereof.

The FPCs 11, 211 of the first and second embodiments have flexibility and the sensor units 10, 210 are easy to handle. However, it may be replaced with a substrate without having flexibility.

Although the direction button 32 in the first and second embodiments is not fixed on the upper surface of the resin sheet 70, it may be fixed by an adhesive on the upper surface of the resin sheet 70 or the central button 31 and the resin sheet 70 may be integrally formed. Also, the central button 31 and the direction button 32, although preferably separate members, may be of the same member.

In the first embodiment, the projections 61, 62 can efficiently displace a predetermined part of the underlying determining-switch movable electrode E22, return-button movable electrode 15 and displacement electrode 12 placed underneath. However, the projections 61, 62 may be omitted. This is true for the second embodiment.

In the first and second embodiment, the capacitance element electrodes E1–E4 at their surfaces are covered with an insulating film (resist film) 13 in order to prevent malfunction due to a direct contact between the capacitance element electrodes E1–E4 and the displacement electrode 12. Gold plating may be made in place of the insulating film 13.

Although the second embodiment explained the case that, when the direction button 32 is operated, the return-switch movable electrodes E215, E216 contact the displacement electrode 12 nearly simultaneously, this is not limited to the above, i.e., the return-switch movable electrodes E215, E216 may not contact the displacement electrode 12 nearly simultaneously. However, in the case that the displacement electrode 12 does not contact the both E215, E216 nearly simultaneously, the displacement electrode 12 preferably first contacts the return-switch movable electrode E215 connected to the return-switch fixed electrode E213 being grounded and thereafter contacts the return-switch movable electrode E216 connected to the return-switch fixed electrode E232 held at the power voltage Vcc through the pull-up resistance element R5".

The second embodiment explained the case that the return-switch fixed electrode E231 is grounded while the return-switch fixed electrode E232 is held at the power voltage Vcc through the pull-up resistance element R5". However, this is not limited to the above, i.e., the return-switch fixed electrode E231 may be held at the power voltage Vcc through the pull-up resistance element while the return-switch fixed electrode E232 be grounded.

Although the second embodiment explained the case that the annular return-switch movable electrodes E215, E216 are provided in a comb form, this is not limited to the case, i.e., the return-switch movable electrodes E215, E216 can be desirably changed in form. Also, the return-switch fixed electrodes E231, E232 may not be annular but can be desirably changed in form provided that they are electrically connected respectively to the return-switch movable electrodes E215, E216.

Although the capacitance type sensors 1, 201 in the first and second embodiments are to be suitably utilized as an input device (joy stick) for a cellular phone, personal digital assistant (PDA), personal computer or game unit, it may be used as another sensor, e.g. acceleration sensor, without limited to the case used as a force sensor. In this case, the effect similar to the foregoing can be obtained.

Although the first and second embodiments explained the case that the microcomputer 5 and electronic circuit were provided on the substrate 20, this is not limited to the case, i.e., the microcomputer 5 and electronic circuit may be provided on the FPC 11, the first FPC 211 or the second FPC 251.

Although the first and second embodiment explained the case using a signal processing circuit including an EX-OR element, this is not limited to, i.e., the signal processing circuit can be desirably changed in configuration. Accordingly, in place of the EX-OR element for exclusive-OR operation, used may be a signal processing circuit including any of an OR element for OR operation, an AND element for AND operation and a NAND element for AND and NOT operations. In this case, in the case that the members of the capacitance type sensor are made of a material greatly improving sensitivity, the sensitivity of the capacitance type sensor can be adjusted (herein, sensitivity be reduced) by the configuration of the signal processing circuit.

The method for generating different-phased cyclic signals is not limited to the method using a CR delay circuit explained in the first and second embodiments, i.e., any other method may be applicable, e.g. to use two cyclic signal oscillators.

In the third embodiment, in the case the displacement electrode 312 is securely spaced and electrically insulated from any of conductive supporting member 360 and movable electrode 315, the insulating ring 311 may be omitted. Furthermore, in the foregoing capacitance type sensor 601 as one manufactured by one embodiment of a manufacturing method for a capacitance type sensor, in the case the displacement electrode 612 is stably fixed and the displacement electrode 612 can be electrically insulated from both of the movable electrode 615 and the lead wires LE600, L615, the insulating spacer 610 can be omitted.

In the third embodiment, the supporting member 360 was for example of silicone rubber. However, this is not limited to the above, provided that the movable electrode 315 can be held at the ground potential. For example, the supporting member 360 may be structured of conductive thermoplastic resin (PPT, elastomer), insulative resin or the like.

In the capacitance type sensors 1, 201, 301 in the foregoing first to third embodiments and the capacitance type sensor 601 manufactured by one embodiment of the manufacturing method, the material of the displacement electrodes 12, 312, return-switch movable electrode 15, movable electrodes 315, 615 and return-switch movable electrodes E215, E216 is not limited to a metal material provided that there is conductivity at both surfaces. For example, used may be conductive rubber such as conductive plastic, silicone rubber, conductive thermoplastic resin (PPT, elastomer) or the like. Particularly, the displacement electrode 12 in the first and second embodiments may be formed by a lamination of a plurality of annular metal plates or dome-formed pressing of a thin metal plate, or may be formed of a flexible FPC. Particularly, the return-switch movable electrode 15 in the first embodiment can use a resin film evaporated with a metal, such as aluminum, a resin film applied with conductive ink or the like. In this case, there is a need of metal evaporation or conductive ink application in order for electrical connection between the opposed region of return-switch movable electrode 15 to the displacement electrode 12 and the return-switch fixed electrode E31. Otherwise, the movable electrode 315 and supporting member 360 in the third embodiment may be in an integral structure of a conductive material.

The movable electrode 415 and displacement electrode 412 of the fourth embodiment are not conductive at both surfaces, e.g. formed by a vinyl or PET film evaporated with a metal, such as aluminum, on one surface only to have conductivity at the one surface. However, not limited thereto. These, if in a film form, may be structured, for example, of metal foil, conductive plastic, conductive rubber such as silicone rubber, conductive thermoplastic resin (PPT, elastomer) or the like. Incidentally, in the case these is made conductive at both surfaces, the capacitance element electrode E400, at its surface, is preferably covered with an insulating film (resist film).

The fourth embodiment is in a structure that both of the film-formed movable electrode 415 and the displacement electrode 412 are deformed convex-concavo in a region not opposed to the capacitance element electrode E400 so that a tensile force can be provided to those. However, this is not limited to the above. Provided that a required tensile force is provided during pressure measurement, a planar form may be kept without deformation into convex-concavo.

Explaining the third embodiment as an example, the range of force measurement can be set by changing the material or thickness of the movable electrode 315 and displacement electrode 312. Meanwhile, from the viewpoint of broadening the force measuring range, the rigidity of the movable electrode 315 is preferably smaller than the rigidity of the displacement electrode 312. These are true for all the foregoing embodiments. In the case of a pressure sensor described in the fourth embodiment, the range of pressure measurement can be broadened by structuring the movable electrode 415 of a possible more flexible and displaceable material.

The substrates 20, 320, 420 in the first to fourth embodiments, the detection buttons 30, 330 in the first to third embodiment, the reference electrodes E11–E13 and return-switch fixed electrode E31 in the first embodiment, and the return-switch fixed electrodes E231, E232 in the second embodiment are not essential elements for the present invention. Namely, it is satisfactory for the first embodiment to have the display electrode 12, return-switch movable electrode 15 and capacitance element electrodes E1–E4, for the second embodiment to have the displacement electrode 12, return-switch movable electrodes E215, E216 and capacitance element electrodes E1–E4 and for the third embodiment to have the displacement electrodes 312, 412, movable electrode 315, 415 and capacitance element electrodes E300, E400, wherein the foregoing nonessential members may be omitted. Incidentally, the above is true for a capacitance type sensor 601 manufactured according to one embodiment of the manufacturing method.

In the modification to fifth embodiment, the sensor electrode 512 is grounded and the reference electrode 515 is kept at the power voltage Vcc through the pull-up resistance element R5'''. However, the similar effect to the above can be obtained by keeping the sensor electrode 512 at the power voltage Vcc through a pull-up resistance element R5''' and grounding the reference electrode 515, to monitor the potential on the sensor electrode 512 at the microcomputer input port.

Concerning the manufacturing method for a capacitance type sensor of the invention, although the foregoing embodiment formed the steps 680a, 680b for respectively supporting the displacement electrode 612 and the movable electrode 615 in the insert molding process (the foregoing second process), one or both of these may not be formed. In this case, when arranging the displacement electrode 612 and/or the movable electrode 615 in the housing 680, there is required an operation to set up other members, such as insulating spacers.

Although the above manufacturing method provides a process to arrange the movable electrode 615 (the foregoing fourth process), this process may be omitted. Namely, although the capacitance type sensor 601 has the movable electrode 615 spaced from and above of the displacement electrode 612 thereby enabling suitable switching between the sleep mode and the usual mode, a conventionally-structured sensor may be manufactured without having a movable electrode 615.

What is claimed is:

1. A capacitance type sensor comprising:
   a conductive member;
   a capacitance element electrode constituting a capacitance element with the conductive member; and
   at least one movable electrode disposed on the side opposite to the capacitance element electrode at a distance from the conductive member, wherein, when a force is applied to the movable electrode, the movable electrode moves so as to come into contact with and displace the conductive member, and
   wherein the force applied to the movable electrode is identified on the basis of a detection, using a signal input to the capacitance element electrode, of a change in capacitance of the capacitance element caused by a change in distance between the conductive member and the capacitance element electrode.

2. The capacitance type sensor according to claim 1, wherein the movable electrode and the conductive member are formed of a conductive film, and the conductive member is formed with a hole.

3. The capacitance type sensor according to claim 2, further comprising a mechanism for deforming into concavo-convex the movable electrode and the conductive member in a region not facing the capacitance element electrode so as to apply a tensile force thereto.

4. A capacitance type sensor comprising:
   a substrate;
   a detective member facing the substrate;
   a conductive member disposed between the substrate and the detective member and displaceable in a displacement direction of the detective member as the detective member is displaced in a direction normal to the substrate;
   a capacitance element electrode disposed on the substrate and constituting a capacitance element with the conductive member;
   at least one fixed electrode disposed on the substrate; and
   at least one movable electrode disposed between the detective member and the conductive member at a distance from the conductive member, and electrically connected to the fixed electrode, wherein the movable electrode moves so as to comes into contact with and displace the conductive member, and
   wherein the displacement of the detective member is identified on the basis of a detection, using a signal input to the capacitance element electrode, of a change in capacitance of the capacitance element caused by a change in distance between the conductive member and the capacitance element electrode.

5. A capacitance type sensor comprising:
   a substrate;
   a detective member facing the substrate;
   a conductive member disposed between the substrate and the detective member and displaceable in a displacement direction of the detective member as the detective member is displaced in a direction normal to the substrate;

a capacitance element electrode disposed on the substrate and constituting a capacitance element with the conductive member;

a reference electrode disposed on the substrate and electrically connected to the conductive member and grounded;

a fixed electrode disposed on the substrate and kept at a different potential from a ground potential; and a movable electrode disposed between the detective member and the conductive member at a distance from the conductive member, and electrically connected to the fixed electrode, wherein the movable electrode moves so as to come into contact with and displace the conductive member, and wherein the displacement of the detective member is identified on the basis of a detection, using a signal input to the capacitance element electrode, of a change in capacitance value of the capacitance element caused by a change in distance between the conductive member and the capacitance element electrode.

6. A capacitance type sensor comprising:

a substrate;

a detective member facing the substrate;

a conductive member disposed between the substrate and the detective member and displaceable in a displacement direction of the detective member as the detective member is displaced in a direction normal to the substrate;

a capacitance element electrode formed on the substrate and constituting a capacitance element with the conductive member;

a reference electrode formed on the substrate and electrically connected to the conductive member, and kept at a different potential from a ground potential;

a fixed electrode formed on the substrate and grounded; and a movable electrode disposed between the detective member and the conductive member at a distance from the conductive member, and electrically connected to the fixed electrode, wherein the movable electrode moves so as to come into contact with and displace the conductive member, and wherein the displacement of the detective member is identified on the basis of a detection, using a signal input to the capacitance element electrode, of a change in capacitance of the capacitance element caused by a change in distance between the conductive member and the capacitance element electrode.

7. A capacitance type sensor comprising:

a substrate;

a detective member facing the substrate;

a conductive member disposed between the substrate and the detective member and displaceable in a displacement direction of the detective member as the detective member is displaced in a direction normal to the substrate, wherein the conductive member is in electrically insulated;

a capacitance element electrode formed on the substrate and constituting a capacitance element with the conductive member;

a fixed electrode formed on the substrate and grounded; and a movable electrode disposed between the detective member and the conductive member at a distance from the conductive member, and electrically connected to the fixed electrode, wherein the movable electrode moves so as to come into contact with and displace the conductive member, and wherein the displacement of the detective member is identified on the basis of a detection, using a signal input to the capacitance element electrode, of a change in capacitance of the capacitance element caused by a change in distance between the conductive member and the capacitance element electrode.

8. A capacitance type sensor comprising:

a substrate;

a detective member facing the substrate;

a conductive member disposed between the substrate and the detective member and displaceable in a displacement direction of the detective member as the detective member is displaced in a direction normal to the substrate, wherein the conductive member is electrically insulated;

a capacitance element electrode formed on the substrate and constituting a capacitance element with the conductive member;

a first fixed electrode formed on the substrate;

a second fixed electrode formed on the substrate;

a first movable electrode disposed between the detective member and the conductive member at a distance from the conductive member, and electrically connected to the first fixed electrode; and a second movable electrode disposed between the detective member and the conductive member at a distance from the conductive member, and electrically connected to the second fixed electrode, wherein the first fixed electrode is grounded and the second fixed electrode is kept at a different potential from a ground potential, and the first and second movable electrodes move so as to come into contact with and displace the conductive member, and wherein the displacement of the detective member is identified on the basis of a detection, using a signal input to the capacitance element electrode, of a change in capacitance of the capacitance element caused by a change in distance between the conductive member and the capacitance element electrode.

9. A capacitance type sensor comprising:

a detective member;

a substrate facing the detective member;

a conductive member disposed between the detective member and the substrate and displaceable in a displacement direction of the detective member as the detective member is displaced in a direction normal to the substrate;

a capacitance element electrode formed on the substrate and constituting a capacitance element with the conductive member;

at least one movable electrode disposed between the detective member and the conductive member at a distance from the conductive member, wherein the movable electrode moves so as to come into contact with and displace the conductive member;

a switch substrate;

a first switch electrode formed on the switch substrate; and a second switch electrode kept at a predetermined potential and disposed at a distance from the first switch electrode, wherein the second switch electrode moves so as to come into contact with the first switch electrode, and wherein the displacement of the detective member is identified on the basis of a detection, using a signal input to the capacitance element electrode, of a change in capacitance of the capacitance element caused by a change in distance between the conductive member and the capacitance element electrode, and whether or not the first and the second switch electrodes are in contact with each other is judged, by using a signal input to the first switch electrode.

* * * * *